United States Patent
Goodnight et al.

(10) Patent No.: US 9,665,405 B1
(45) Date of Patent: May 30, 2017

(54) DISTRIBUTED SYSTEMS AND METHODS FOR STATE GENERATION BASED ON MULTI-DIMENSIONAL DATA

(71) Applicant: SAS Institute Inc., Cary, NC (US)

(72) Inventors: James Howard Goodnight, Cary, NC (US); Steve Krueger, Raleigh, NC (US); Oliver Schabenberger, Cary, NC (US); Christopher D. Bailey, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 15/386,870

(22) Filed: Dec. 21, 2016

Related U.S. Application Data

(63) Continuation-in-part of application No. 14/543,340, filed on Nov. 17, 2014, which is a continuation of application No. 12/705,204, filed on Feb. 12, 2010, now abandoned.

(51) Int. Cl.
*G06F 9/50* (2006.01)

(52) U.S. Cl.
CPC .... *G06F 9/5072* (2013.01); *G06F 2209/5017* (2013.01)

(58) Field of Classification Search
None
See application file for complete search history.

(56) References Cited

U.S. PATENT DOCUMENTS

| | | | |
|---|---|---|---|
| 2007/0100961 A1 | 5/2007 | Moore | |
| 2007/0118839 A1* | 5/2007 | Berstis | G06F 9/5072 718/105 |
| 2009/0138670 A1 | 5/2009 | Mutlu et al. | |
| 2009/0248375 A1* | 10/2009 | Billiotte | G05B 17/02 703/2 |

(Continued)

FOREIGN PATENT DOCUMENTS

| | | |
|---|---|---|
| EP | 2 534 579 | 12/2012 |
| WO | 2003/048961 A1 | 6/2003 |

(Continued)

OTHER PUBLICATIONS

Yu et al., "Stochastic Programming Models in Financial Optimization: A Survey," Advanced Modeling and Optimization, vol. 5 No. 1, 2003.*

(Continued)

*Primary Examiner* — Eric C Wai
(74) *Attorney, Agent, or Firm* — Kilpatrick Townsend & Stockton LLP

(57) ABSTRACT

Systems and methods are provided for generating multiple system state projections using a grid computing environment. A central coordinator software component executes on a root data processor and provides commands and data to a plurality of node coordinator software components. A node coordinator software component manages threads which execute on its associated node data processor and which perform a set of matrix operations. Stochastic simulations use results of the matrix operations to generate multiple state (Continued)

projections. Additional processing can be performed by the grid computing environment based upon the generated state projections, such as to develop possible change information for users.

30 Claims, 54 Drawing Sheets

(56) References Cited

U.S. PATENT DOCUMENTS

| | | | |
|---|---|---|---|
| 2011/0202329 | A1 | 8/2011 | Goodnight et al. |
| 2015/0149241 | A1 | 5/2015 | Goodnight et al. |
| 2016/0299507 | A1* | 10/2016 | Shah .................. G05D 1/0088 |

FOREIGN PATENT DOCUMENTS

| | | |
|---|---|---|
| WO | 2009/143073 A1 | 11/2009 |
| WO | 2011/100557 A1 | 8/2011 |

OTHER PUBLICATIONS

Islam et al., "An Empirical Distributed Matrix Multiplication Algorithm to Reduce Time Complexity", Proceedings of the International MultiConference of Engineers and Computer Scientists, vol. 2, 2009.*

Srinivasan et al., "Stochastic linear solvers," Proceedings of the SIAM Conference on Applied Linear Algebra, vol. 12, 2003.*

SAS, Grid Computing in SAS® 9.4 Second Edition, retrieved on May 12, 2014 from support.sas.com/documentation/cdl/en/gridref/66793/PDF/default/gridref.pdf 142 pages.

Srinivasan, "Stochastic Linear Solvers" Society for Industrial and Applied Mathematics Proceedings, (Aug. 8, 2003) www.siam.org/meetings/la03/proceedings/srinivaa.pdf 12 pages.

Yu, "Stochastic Programming Models in Financial Optimization: A Survey" Advanced Modeling and Optimization, vol. 5, No. 1 (2003) camo.iciro/journal/vol5/v5a1.pdf 26 pages.

Aljebaly "Multi-Core Computing" Western Michigan University, (Sep. 15, 2005) www.cs.wmich.edu/elise/courses/cs6800/Multi-Core-Computing-03.ppt 43 pages.

Islam Nazrul et al., "An Empirical Distributed Matrix Multiplication Algorithm to Reduce Time Complexity" Proceedings of the International MultiConference of Engineers and Computer Scientists 2009 vol. II, IMEC 2009, (Mar. 18-20, 2009) Hong Kong, pp. 2171-2173.

Bekas C. et al., Low Cost High Performance Uncertainty Quantification: WHPCF 09 Portland Oregon, (Nov. 15, 2009) 8 pages.

Hesterberg, Tim et al.,"Least Angle Regression" abridged version of an SBIR Phase II proposal to NIH, (Apr. 3, 2006) 28 pages.

International Search Report and Written Opinion dated Jul. 4, 2011 for PCT Application No. PCT/US2011/024540, 10 pages.

International Preliminary Report on Patentability, dated Jun. 12, 2012 for PCT Application No. PCT/US2011/024540, 9 pages.

Communication pursuant to Article 94(3) EPC dated Oct. 23, 2014 for European Application No. 11 706 387.5, 9 pages.

Pawel Plaszczak "Performance and scalability of in-memory databases", Internet Article, (May 18, 2009), Retrieved from the Internet: URL://bigdatamatters.com/bigdatamatters/2009/05/performance-and-scalability-of-inmemory-databases.html[retrieved on Oct. 13, 2014] 2 pages.

Silviu-Marius Moldovan: "Scaling Distributed Database Management Systems by using a Grid-based Storage Service Master Thesis", Internet Article , Jun. 30, 2008 (Jun. 30, 2008), XP055146486, Retrieved from the Internet: URL:ftp.irisa.fr/local/caps/DEPOTS/RapportsStages2008/Moldovan_Silviu-Marius.pdf [retrieved on Oct. 14, 2014] 30 pages.

Responsive dated Mar. 25, 2013 to the Communication pursuant Rule 161(1) EPC dated Sep. 25, 2012 for European Application No. 11 706 387.5, 17 pages.

Responsive dated Mar. 27, 2015 to the Communication dated Oct. 23, 2014 for European Application No. 11 706 387.5, 8 pages.

Communication pursuant to Article 94(3) EPC dated Aug. 25, 2015 for European Application No. 11706 387.5, 4 pages.

Office Action dated Mar. 27, 2014 for Canadian Application No. 2,789,632, 3 pages.

Response dated Aug. 28, 2014 to the Office Action dated Mar. 27, 2014 for Canadian Application No. 2,789,632, 13 pages.

Office Action dated Apr. 29, 2015 for Canadian Application No. 2,789,632, 4 pages.

Response dated Oct. 15, 2015 to the Office Action dated Apr. 29, 2015 for Canadian Application No. 2,789,632, 15 pages.

Notice of Allowance dated Mar. 29, 2016 for Canadian Application No. 2,789,632, 1 page.

Non-Final Office Action of May 24, 2013 for U.S. Appl. No. 12/705,204, 16 pages.

Final Office Action of Jun. 20, 2014 for U.S. Appl. No. 12/705,204, 19 pages.

Non-Final Office Action of Oct. 6, 2016 for U.S. Appl. No. 14/543,340, 7 pages.

* cited by examiner

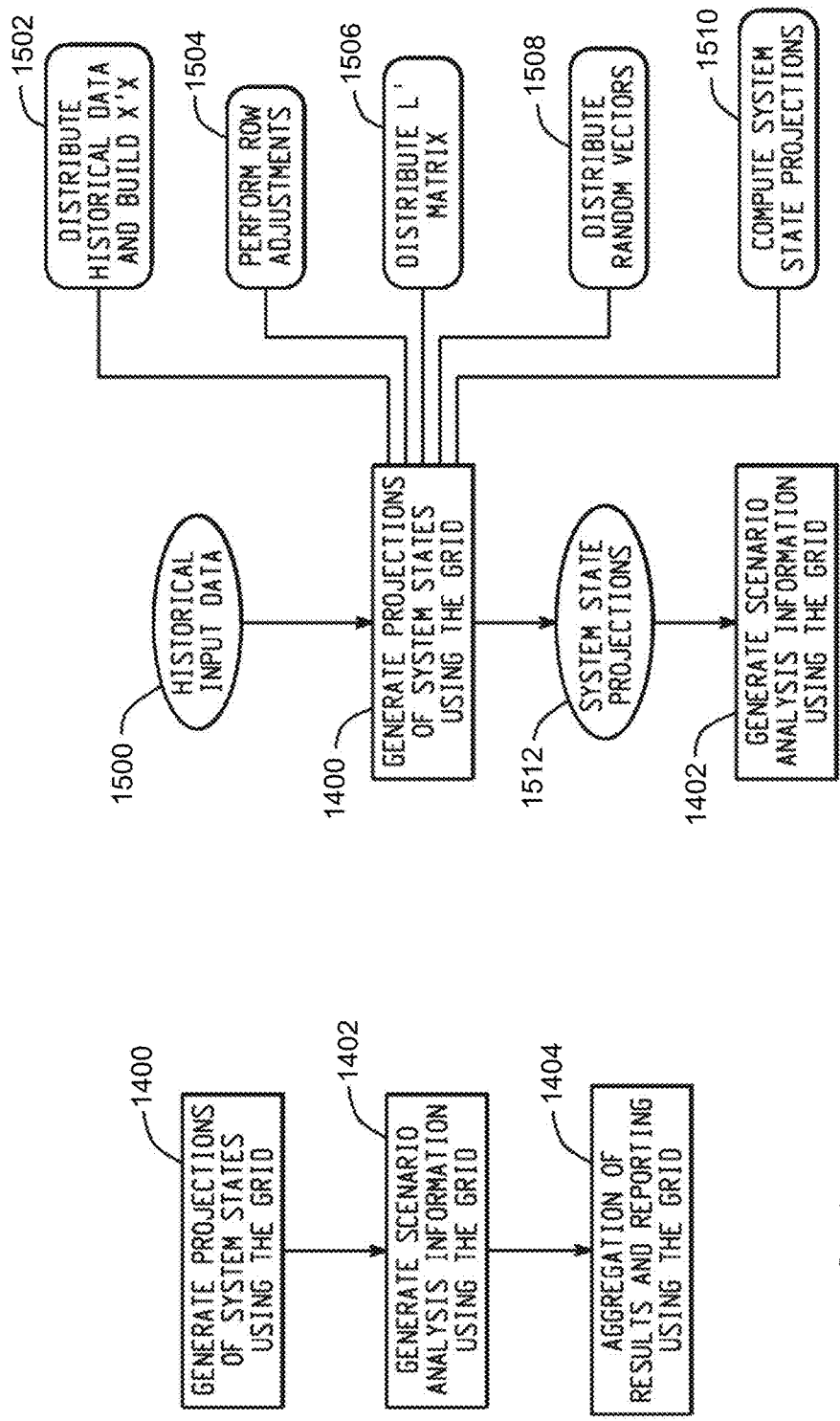

| POSITION PRICING RESULTS | | | | |
|---|---|---|---|---|
| | Market State Projection 1 | Market State Projection 2 | ... | Market State Projection 10,000 |
| Chevron | 29 | 36 | ... | 14 |
| Exxon | 78 | 75 | ... | 72 |
| ... | ... | ... | ... | ... |
| Position 1,000,000 | [pricing result] | [pricing result] | ... | [pricing result] |

4200

1,000,000 POSITION 10,000 Market State Projections

FIG. 42

| | NODE COORDINATOR 1 | |
|---|---|---|
| T1 | PRICE FOR MKT STATE 1 | PRICE FOR MKT STATE 2 |
| T2 | PRICE FOR MKT STATE 126 | PRICE FOR MKT STATE 127 |
| T3 | PRICE FOR MKT STATE 251 | PRICE FOR MKT STATE 252 |
| T4 | PRICE FOR MKT STATE 376 | PRICE FOR MKT STATE 377 |
| T1 | PRICE FOR MKT STATE 1 | PRICE FOR MKT STATE 2 |
| T2 | PRICE FOR MKT STATE 126 | PRICE FOR MKT STATE 127 |
| T3 | PRICE FOR MKT STATE 251 | PRICE FOR MKT STATE 252 |
| T4 | PRICE FOR MKT STATE 376 | PRICE FOR MKT STATE 377 |
| ⋮ | ⋮ | ⋮ |
| T1 | PRICE FOR MKT STATE 1 | PRICE FOR MKT STATE 2 |
| T2 | PRICE FOR MKT STATE 126 | PRICE FOR MKT STATE 127 |
| T3 | PRICE FOR MKT STATE 251 | PRICE FOR MKT STATE 252 |
| T4 | PRICE FOR MKT STATE 376 | PRICE FOR MKT STATE 377 |

4300

⋮

| | NODE COORDINATOR 20 | |
|---|---|---|
| T1 | PRICE FOR MKT STATE 9501 | PRICE FOR MKT STATE 9502 |
| T2 | PRICE FOR MKT STATE 9626 | PRICE FOR MKT STATE 9627 |
| T3 | PRICE FOR MKT STATE 9751 | PRICE FOR MKT STATE 9752 |
| T4 | PRICE FOR MKT STATE 9876 | PRICE FOR MKT STATE 9877 |
| T1 | PRICE FOR MKT STATE 9501 | PRICE FOR MKT STATE 9502 |
| T2 | PRICE FOR MKT STATE 9626 | PRICE FOR MKT STATE 9627 |
| T3 | PRICE FOR MKT STATE 9751 | PRICE FOR MKT STATE 9752 |
| T4 | PRICE FOR MKT STATE 9876 | PRICE FOR MKT STATE 9877 |
| ⋮ | ⋮ | ⋮ |
| T1 | PRICE FOR MKT STATE 9501 | PRICE FOR MKT STATE 9502 |
| T2 | PRICE FOR MKT STATE 9626 | PRICE FOR MKT STATE 9627 |
| T3 | PRICE FOR MKT STATE 9751 | PRICE FOR MKT STATE 9752 |
| T4 | PRICE FOR MKT STATE 9876 | PRICE FOR MKT STATE 9877 |

MATCH TO FIG. 43B

DISTRIBUTED SYSTEMS AND METHODS FOR STATE GENERATION BASED ON MULTI-DIMENSIONAL DATA

TECHNICAL FIELD

The technology described herein relates generally to distributed data processing and more specifically to scenario analysis using distributed data processing.

SUMMARY

In accordance with the teachings provided herein, systems and methods are provided for generating multiple system state projections for one or more scenarios. For example, a central coordinator software component executes on a root data processor and provides commands and data to a plurality of node coordinator software components. Each of the node coordinator software components are associated with and execute on separate node data processors. The node data processors have volatile computer memory for access by a node coordinator software component and for access by threads executing on the node data processor. A node coordinator software component manages threads which execute on its associated node data processor and which perform a set of matrix operations with respect to the simultaneous linear equations. Stochastic simulations use results of the matrix operations to generate multiple state projections. Threads execute on their associated node data processor and perform a portion of the scenario evaluations based upon the state projections and based upon scenario information provided by a user computer, thereby generating scenario evaluation results. The volatile computer memory of a node data processor retains the results of the scenario evaluations that were performed at the node data processor.

The central coordinator software component is configured to receive ad hoc questions from the user computer and provide responses to the ad hoc questions by aggregating and concatenating the scenario evaluation results provided by each of the node data processors.

The central coordinator software component processes the ad hoc questions from the user computer by instructing the node coordinator software component to access and process the results of the scenario evaluations that are stored in the volatile memory of its associated node data processor.

In an aspect, provided are improved state projection generation methods, systems, and computer program products. In an embodiment, a method of this aspect comprises accessing, by a central coordinator of a grid computing environment, a multi-dimensional data set, such as a multi-dimensional data set that includes multiple observations with respect to a plurality of dimensions, and optionally a grid computing environment includes the central coordinator, a plurality of node coordinators, and one or more compute nodes associated with each node coordinator; generating a cross-product matrix for the multi-dimensional data set, such as where generating is performed using distributed computing and includes: partitioning, by the central coordinator, the multi-dimensional sample into multiple data partitions, indicating, by the central coordinator, unique identifiers to the plurality of node coordinators, such as where a unique identifier allows a node coordinator to identify unique portions of the cross-product matrix that the node coordinator is assigned, using a wave distribution technique distribute the multiple data partitions among the plurality of node coordinators, such as a wave distribution technique that includes the central coordinator distributing a first data partition to a first node coordinator and the first node coordinator distributing the first data partition to a second node coordinator and the central coordinator distributing a second data partition to a third node coordinator and the third node coordinator distributing the second data partition to a fourth node coordinator, generating, by the one or more compute nodes associated with each node coordinator, the assigned unique portions of the cross-product matrix, such as where generating the assigned unique portions includes using one or more distributed data partitions, and storing, by the node coordinators or the one or more compute nodes associated with each node coordinators, the assigned unique portions of the cross-product matrix; decomposing, by the node coordinators, the assigned unique portions of the cross-product matrix, such as where decomposing generates decomposed matrix components; distributing the decomposed matrix components among the plurality of node coordinators to provide the plurality of node coordinators each with a full decomposed matrix, such as where a full decomposed matrix includes each of the decomposed matrix components, and such as where distributing includes the node coordinators transmitting the decomposed matrix components between one another or to the central coordinator; providing, by the central coordinator, different random vectors to the node coordinators for use in determining a plurality of state simulation matrices using the full decomposed matrix and the random vectors; computing, using the one or more compute nodes associated with each node coordinator, one or more state simulation matrices, wherein computing includes determining a product between the random vectors and the full decomposed matrix; identifying, by the central coordinator, position information corresponding to one or more positions to be evaluated; distributing, by the central coordinator, a position evaluation function to the plurality of node coordinators for use in evaluating the one or more positions by using the one or more state simulation matrices; generating position evaluations for the one or more positions, such as where generating includes using the position evaluation function, the position information, and the one or more state simulation matrices, and such as where generating is performed using distributed computing and includes: distributing the position information among the plurality of node coordinators, determining, by the one or more compute nodes associated with the node coordinators, a plurality of individual position evaluations, such as where an individual position evaluation is determined by a compute node applying the position evaluation function to an individual state simulation matrix and the position information, and storing, by the compute nodes associated with the node coordinators, the determined individual position evaluations to shared memory associated with the compute nodes; receiving, by the central coordinator, a query, such as a query that corresponds to a request for evaluation of particular position information; identifying, by the central coordinator, a plurality of individual position evaluations for use in responding to the query; aggregating, at the central coordinator, the plurality of individual position evaluations, such as where aggregating includes the node coordinators retrieving the plurality of individual positions from the shared memory, and such as where aggregating includes the node coordinators transmitting the retrieved plurality of individual positions to the central coordinator; and generating a response to the query using the aggregated plurality of individual position evaluations. Method embodiments of this aspect may further comprise generating output corresponding to the response.

In an embodiment, a system of this aspect comprises a grid computing environment, such as a grid computing environment that includes a central coordinator, a plurality of node coordinators, and one or more compute nodes associated with each node coordinator. It will be appreciated that a central coordinator, a node coordinator, or a compute node may correspond to or include one or more real or virtualized processors or threads, working memory, such as a shared and/or non-shared memory, and non-transitory computer-readable media comprising stored instructions that, when executed by one or more real or virtualized processors or threads, cause the one or more real or virtualized processors or threads to perform operations. The non-transitory computer readable media may correspond to, for example, a computer program product that comprises instructions that, when executed by one or more real or virtualized processors or threads, cause the one or more real or virtualized processors or threads to perform operations including, accessing a multi-dimensional data set, such as a multi-dimensional data set that includes multiple observations with respect to a plurality of dimensions; generating a cross-product matrix for the multi-dimensional data set, such as where generating is performed using distributed computing and includes: partitioning, by a central coordinator, the multi-dimensional sample into multiple data partitions, indicating, by the central coordinator, unique identifiers to a plurality of node coordinators, such as where a unique identifier allows a node coordinator to identify unique portions of the cross-product matrix that the node coordinator is assigned, using a wave distribution technique distribute the multiple data partitions among the plurality of node coordinators, such as a wave distribution technique that includes the central coordinator distributing a first data partition to a first node coordinator and the first node coordinator distributing the first data partition to a second node coordinator and the central coordinator distributing a second data partition to a third node coordinator and the third node coordinator distributing the second data partition to a fourth node coordinator, generating, by one or more compute nodes associated with each node coordinator, the assigned unique portions of the cross-product matrix, such as where generating the assigned unique portions includes using one or more distributed data partitions, and storing, by the node coordinators or the one or more compute nodes associated with each node coordinators, the assigned unique portions of the cross-product matrix; decomposing, by the node coordinators, the assigned unique portions of the cross-product matrix, such as where decomposing generates decomposed matrix components; distributing the decomposed matrix components among the plurality of node coordinators to provide the plurality of node coordinators each with a full decomposed matrix, such as where a full decomposed matrix includes each of the decomposed matrix components, and such as where distributing includes the node coordinators transmitting the decomposed matrix components between one another or to the central coordinator; providing, by the central coordinator, different random vectors to the node coordinators for use in determining a plurality of state simulation matrices using the full decomposed matrix and the random vectors; computing, using the one or more compute nodes associated with each node coordinator, one or more state simulation matrices, wherein computing includes determining a product between the random vectors and the full decomposed matrix; identifying, by the central coordinator, position information corresponding to one or more positions to be evaluated; distributing, by the central coordinator, a position evaluation function to the plurality of node coordinators for use in evaluating the one or more positions by using the one or more state simulation matrices; generating position evaluations for the one or more positions, such as where generating includes using the position evaluation function, the position information, and the one or more state simulation matrices, and such as where generating is performed using distributed computing and includes: distributing the position information among the plurality of node coordinators, determining, by the one or more compute nodes associated with the node coordinators, a plurality of individual position evaluations, such as where an individual position evaluation is determined by a compute node applying the position evaluation function to an individual state simulation matrix and the position information, and storing, by the compute nodes associated with the node coordinators, the determined individual position evaluations to shared memory associated with the compute nodes; receiving, by the central coordinator, a query, such as a query that corresponds to a request for evaluation of particular position information; identifying, by the central coordinator, a plurality of individual position evaluations for use in responding to the query; aggregating, at the central coordinator, the plurality of individual position evaluations, such as where aggregating includes the node coordinators retrieving the plurality of individual positions from the shared memory, and such as where aggregating includes the node coordinators transmitting the retrieved plurality of individual positions to the central coordinator; and generating a response to the query using the aggregated plurality of individual position evaluations.

In embodiments, node coordinators and associated compute nodes may have an associated shared memory, such as an associated shared memory that is independent from other node coordinators and/or other compute nodes. Optionally, receiving a query may include receiving multiple unrelated queries. Advantageously, in some embodiments, generating responses to the unrelated queries may not require re-generation of the cross-product matrix, the full decomposed matrix, or the position evaluations for the one or more positions for generating responses to the unrelated queries. In this way, efficiency of generation of query responses may be improved as compared to prior state projection generation methods and systems, such as where the individual position evaluations are not stored to shared memory and thus require additional non-transitory storage read or write cycles, compute cycles, and/or network transmissions in order to generate query responses.

Additionally, in some embodiments, it may be desirable to change portions of a multi-dimensional data set and receive new queries and generate query responses. Methods, system, and computer program products of this aspect may more efficiently respond to new queries in such a situation by only having to re-generate a subset of unique portions of the cross-product matrix instead of re-generating the full cross-product matrix, which may be performed by prior state projection generation methods and systems. It will be appreciated that re-generating the full cross-product matrix may result in repetition of generation of unique portions of a cross-product matrix which are the same as a previously generated cross-product matrix, requiring additional processing cycles, memory usage, network transmissions, etc. By not having to re-generate the full cross-product matrix, numerous processing cycles, memory usage, network transmissions can be saved.

Further advantageous aspects may be achieved by the disclosed methods, systems, and computer program products. For example, in some embodiments, storing the assigned unique portions of the cross-product matrix includes storing the assigned unique portions of the cross-product matrix to the shared memory. In this way, compute nodes and associated node coordinators may have immediate access to the assigned unique portions of the cross-product matrix without requiring additional non-transitory data storage read or write cycles, network transmissions, etc. As another example, decomposing the unique portions of the cross-product matrix optionally includes each node coordinator assigning separate decomposition tasks to the compute nodes associated with the node coordinators, such as immediately upon completion of the generation of an assigned unique portion of a cross-product matrix, thus allowing more efficient decomposition of the cross-product matrix as compared to prior techniques where decomposition occurs only by a single or a subset of nodes or only upon full completion of a cross-product matrix.

It will be appreciated that a variety of configurations for the disclosed systems, methods and computer program products may exist. For example, in some embodiments, the multi-dimensional data set may be stored as a data set matrix, such as where the data partitions correspond to unique rows of the data set matrix. Additionally, the wave distribution technique may optionally include distributing the rows of the matrix individually. Alternatively or additionally, in some embodiments a statistical analysis may be performed on the aggregated plurality of individual position evaluations. For example, the response to the query may optionally indicate results of the statistical analysis. As a specific example, performing a statistical analysis may optionally include one or more of: determining a mean of an aggregated plurality of individual position evaluations; determining a distribution of an aggregated plurality of individual position evaluations; and delineating a portion of the distribution that includes 95% (i.e., at 95%, around 95%, or approximately 95%) of an aggregated plurality of individual position evaluations, such as a portion that is centered around a mean.

Without wishing to be bound by any particular theory, there can be discussion herein of beliefs or understandings of underlying principles relating to the invention. It is recognized that regardless of the ultimate correctness of any mechanistic explanation or hypothesis, an embodiment of the invention can nonetheless be operative and useful.

BRIEF DESCRIPTION OF THE DRAWINGS

FIG. 14 is a process flow diagram depicting a process flow of a grid computing environment which has been configured for performing scenario state processing.

FIG. 15 is a process flow diagram illustrating a set of operations for using a central coordinator and node coordinators to generate system state projections.

FIG. 42 depicts an example of position evaluation results.

FIG. 43A, FIG. 43B, FIG. 44A and FIG. 44B depict an example of node coordinators storing evaluation results.

DETAILED DESCRIPTION OF THE INVENTION

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

Systems depicted in some of the figures may be provided in various configurations. In some embodiments, the systems may be configured as a distributed system where one or more components of the system are distributed across one or more networks in a cloud computing system.

Figure 1:
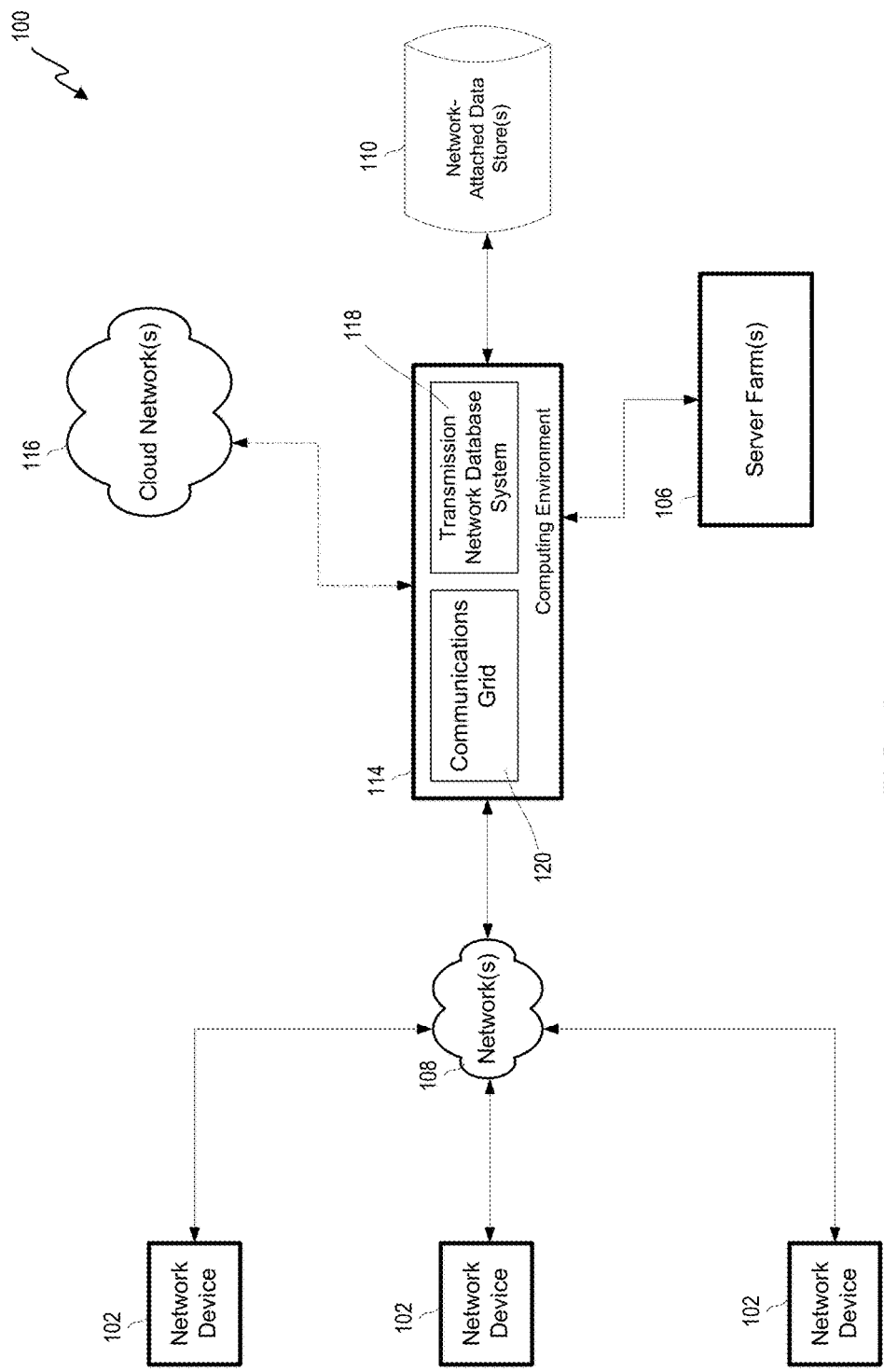
FIG. 1 illustrates a block diagram that provides an illustration of the hardware components of a computing system, according to some embodiments of the present technology.

FIG. 1 is a block diagram that provides an illustration of the hardware components of a data transmission network 100, according to embodiments of the present technology. Data transmission network 100 is a specialized system that may be used for processing large amounts of data where a large number of processing cycles are required.

Data transmission network 100 may also include computing environment 114. Computing environment 114 may be a specialized or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
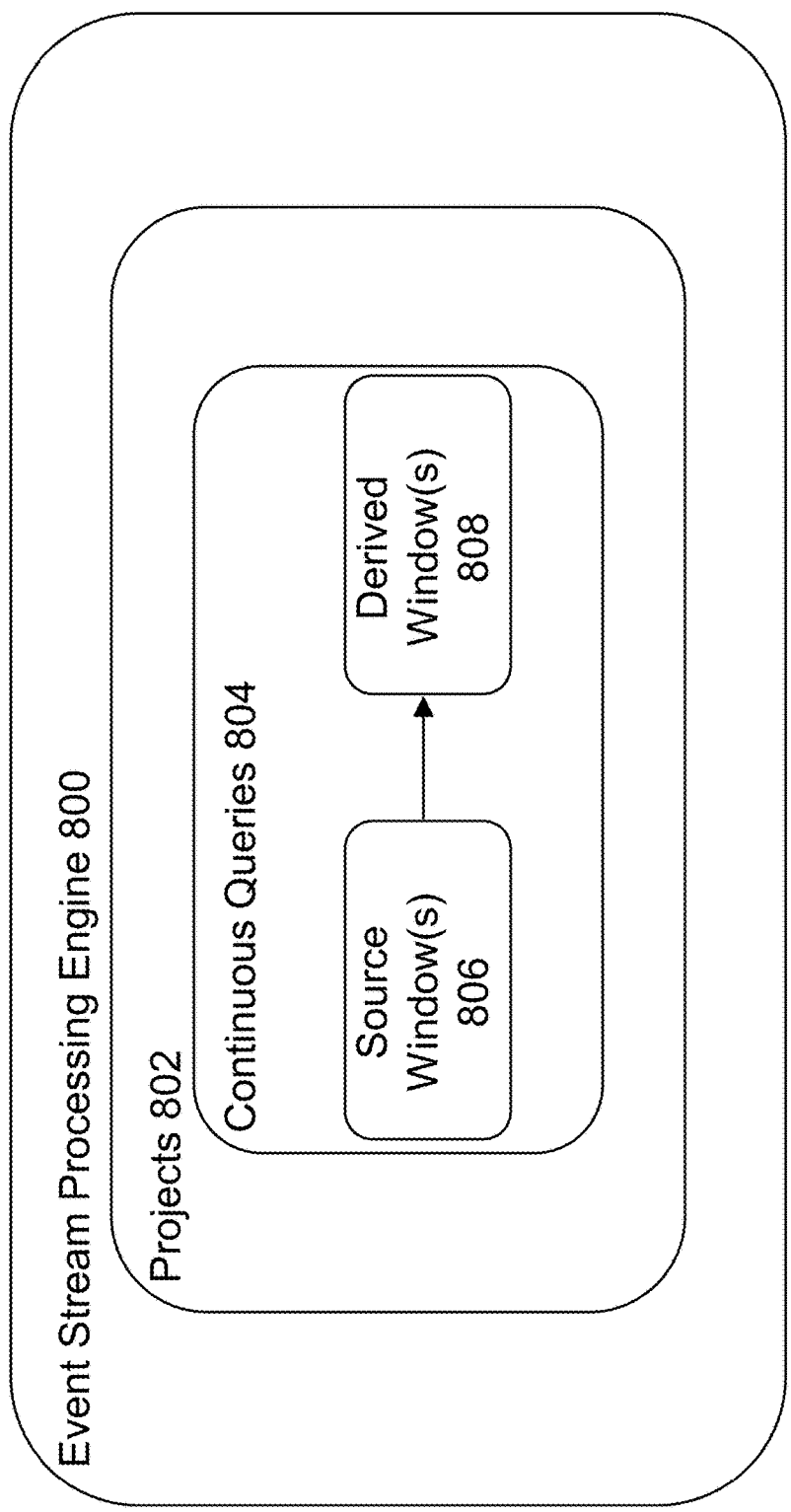
FIG. 8 illustrates a block diagram including components of an Event Stream Processing Engine (ESPE), according to embodiments of the present technology.
Figure 9:
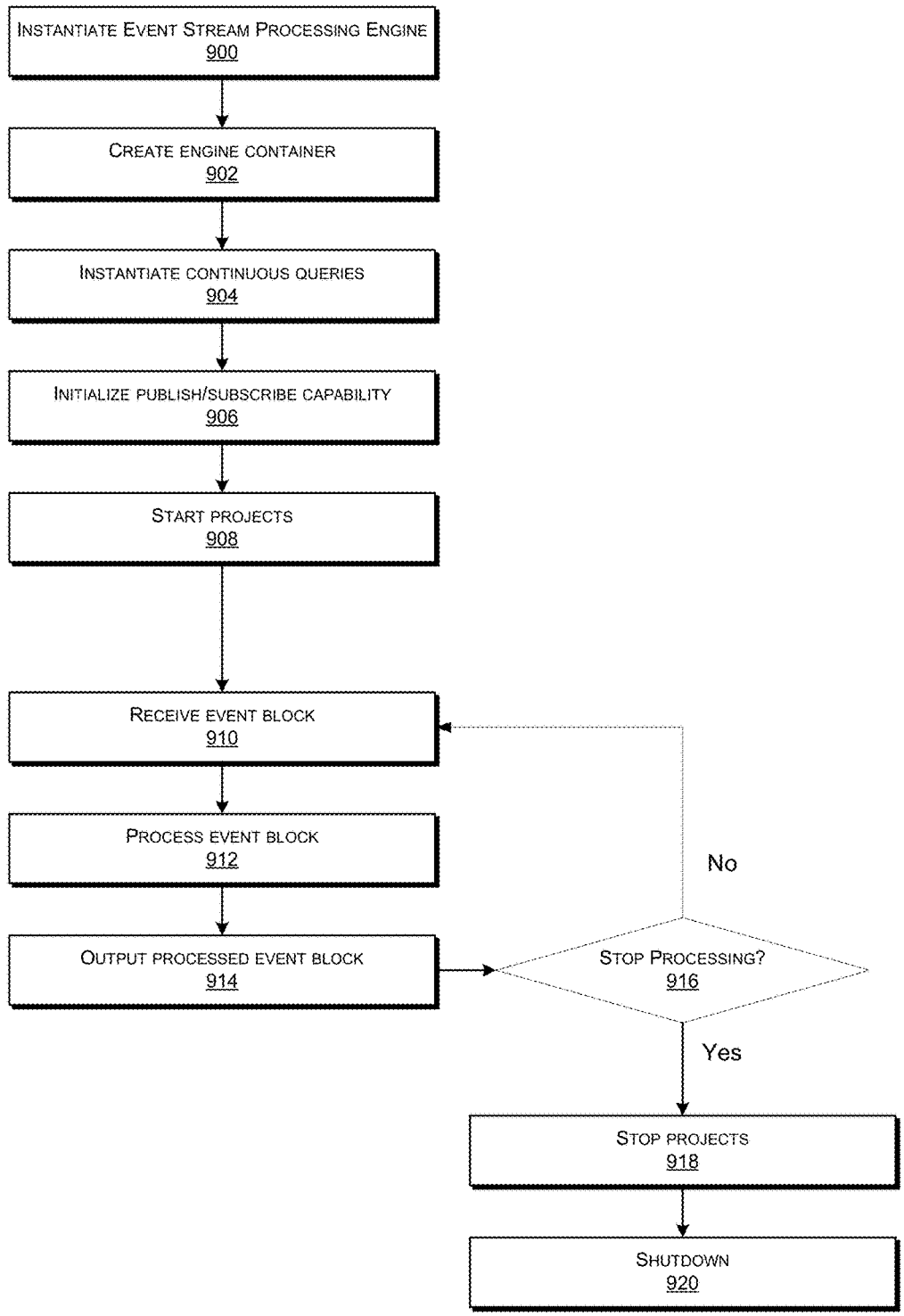
FIG. 9 illustrates a flow chart showing an example process performed by an event stream processing engine, according to some embodiments of the present technology.
Figure 10:
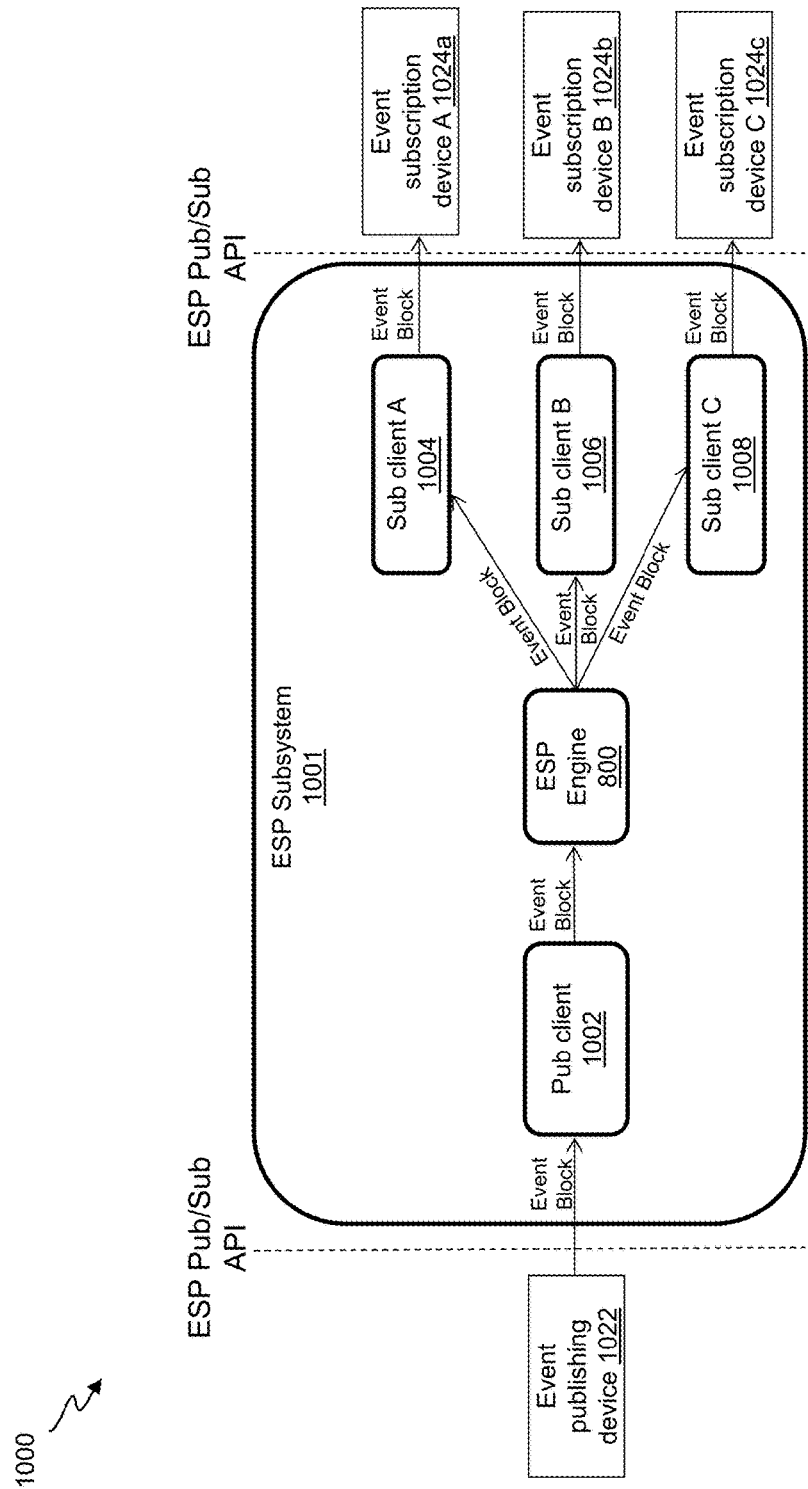
FIG. 10 illustrates an ESP system interfacing between a publishing device and multiple event subscribing devices, according to embodiments of the present technology.

In other embodiments, network devices may provide a large amount of data, either all at once or streaming over an interval of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory computer-readable storage medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying objects being manufactured with parameter data for each object, such as colors and models) or object output databases (e.g., a database containing individual data records identifying details of individual object outputs/sales).

The unstructured data may be presented to the computing environment 114 in different forms such as a flat file or a conglomerate of data records, and may have data points and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time interval units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system as needed. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may comprise one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, as needed, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection system 150, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired and/or wireless networks may be implemented using routers, access points, bridges, gateways, or the like, to connect devices in the computing environment 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and relational analytics can be applied to identify hidden relationships and drive increased effectiveness. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
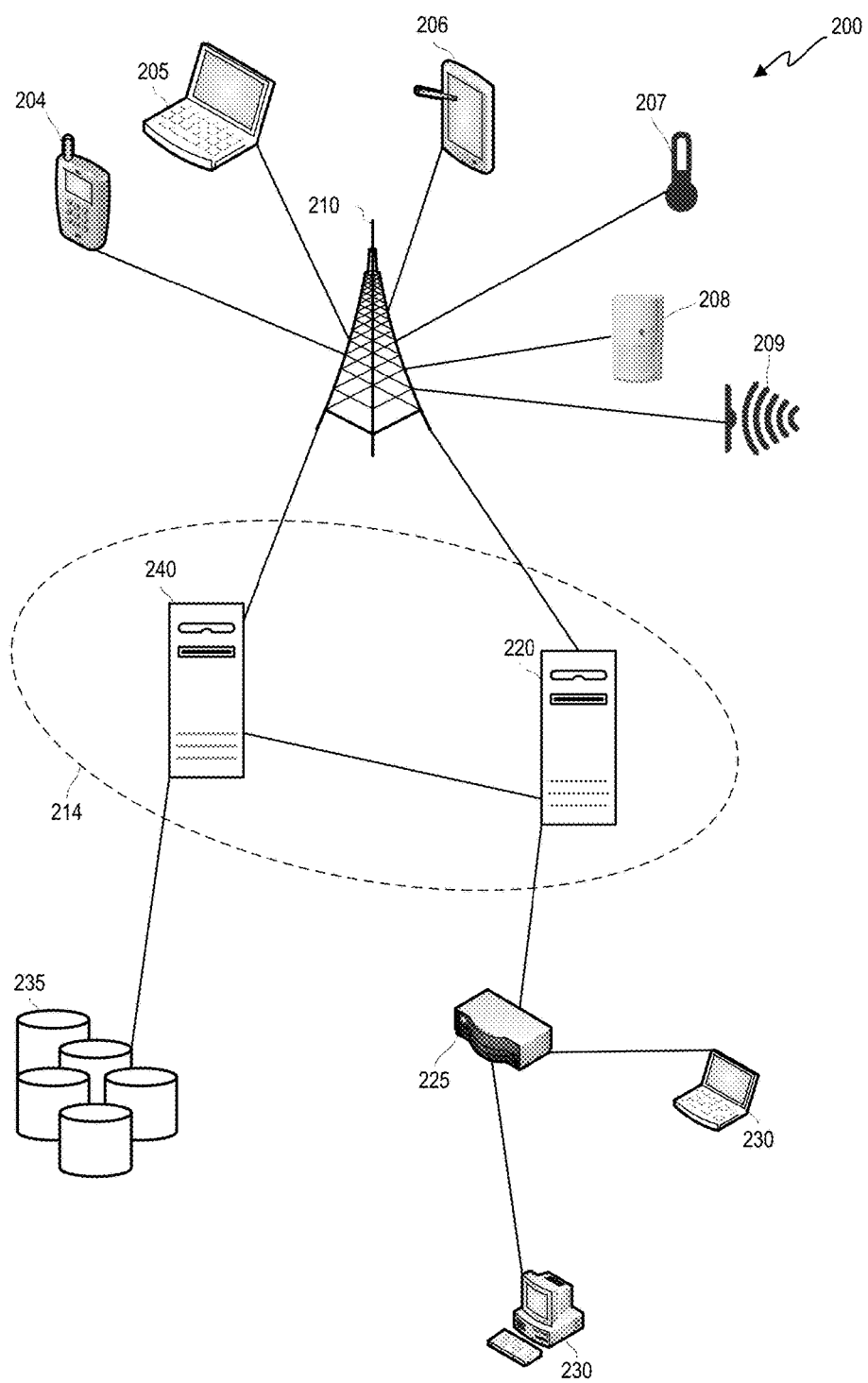
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, and homes, among others. One or more of such devices may include one or more sensors that detect energy gain or loss, electrical input or output or loss, and a variety of other benefits. These sensors may collect data to inform users of how the energy grid, and individual devices within the grid, may be functioning and how they may be better utilized.

Network device sensors may also process data collected before transmitting the data to the computing environment 114, or before deciding whether to transmit data to the computing environment 114. For example, network devices may determine whether data collected meets certain rules, for example by comparing data or points calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operation, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., object information, client rules, etc.), technical object details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over an interval of time for a client to determine results data based on the client's needs and rules.

Figure 3:
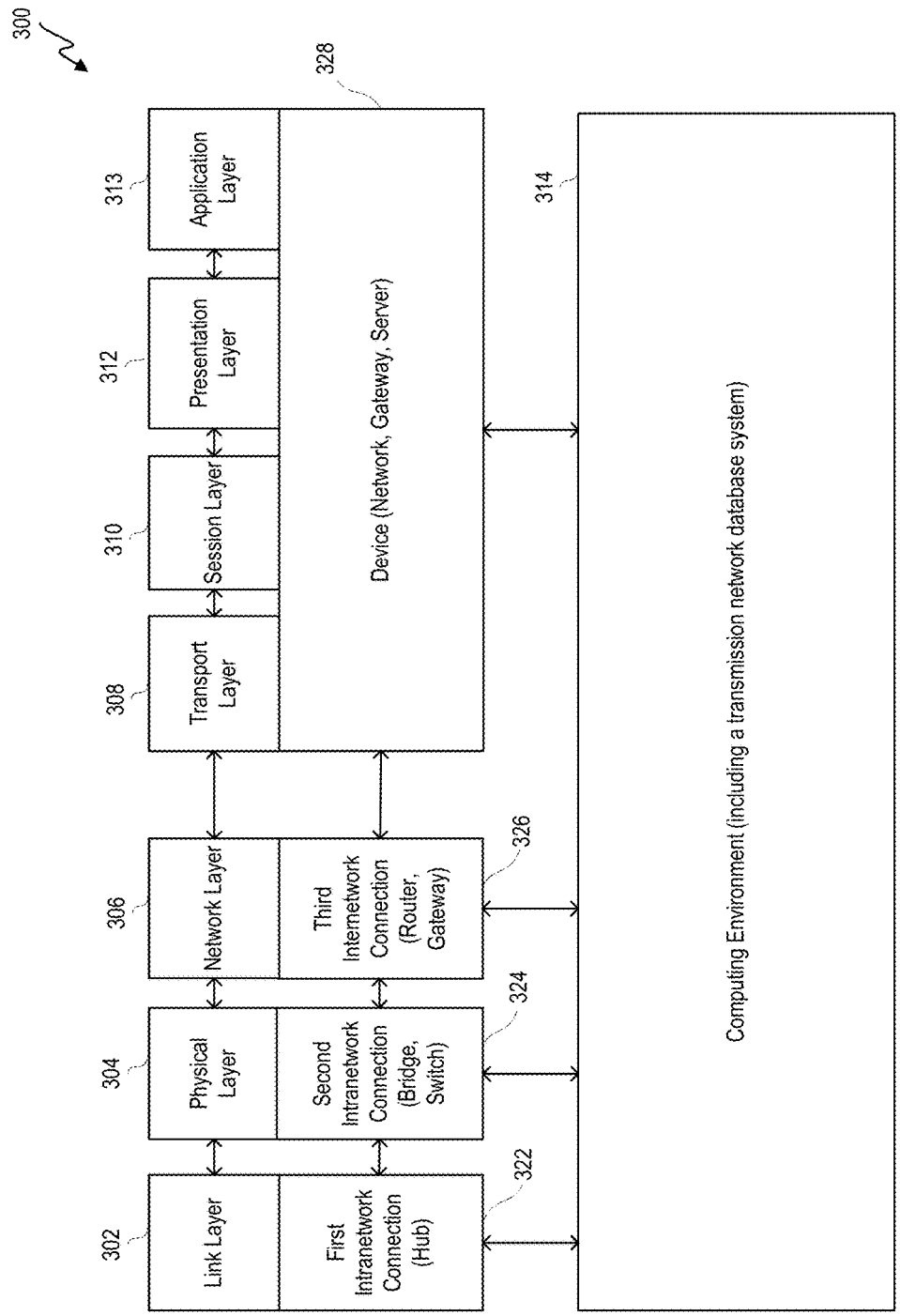
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 302-313. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with an application.

As noted, the model includes a physical layer 302. Physical layer 302 represents physical communication, and can define parameters of that physical communication. For example, such physical communication may come in the form of electrical, optical, or electromagnetic signals. Physical layer 302 also defines protocols that may control communications within a data transmission network.

Link layer 304 defines links and mechanisms used to transmit (i.e., move) data across a network. The link layer handles node-to-node communications, such as within a grid computing environment. Link layer 304 can detect and correct errors (e.g., transmission errors in the physical layer 302). Link layer 304 can also include a media access control (MAC) layer and logical link control (LLC) layer.

Network layer 306 defines the protocol for routing within a network. In other words, the network layer coordinates transferring data across nodes in a same network (e.g., such as a grid computing environment). Network layer 306 can also define the processes used to structure local addressing within the network.

Transport layer 308 can handle the transmission of data and the quality of the transmission and/or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and handle communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt and/or format data based on data types known to be accepted by an application or network layer.

Application layer 313 interacts directly with applications and end users, and handles communications between them. Application layer 313 can identify destinations, local resource states or availability and/or communication content or formatting using the applications.

Intra-network connection components 322 and 324 are shown to operate in lower levels, such as physical layer 302 and link layer 304, respectively. For example, a hub can operate in the physical layer, a switch can operate in the physical layer, and a router can operate in the network layer. Inter-network connection components 326 and 328 are shown to operate on higher levels, such as layers 306-313. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system (DBMS), controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
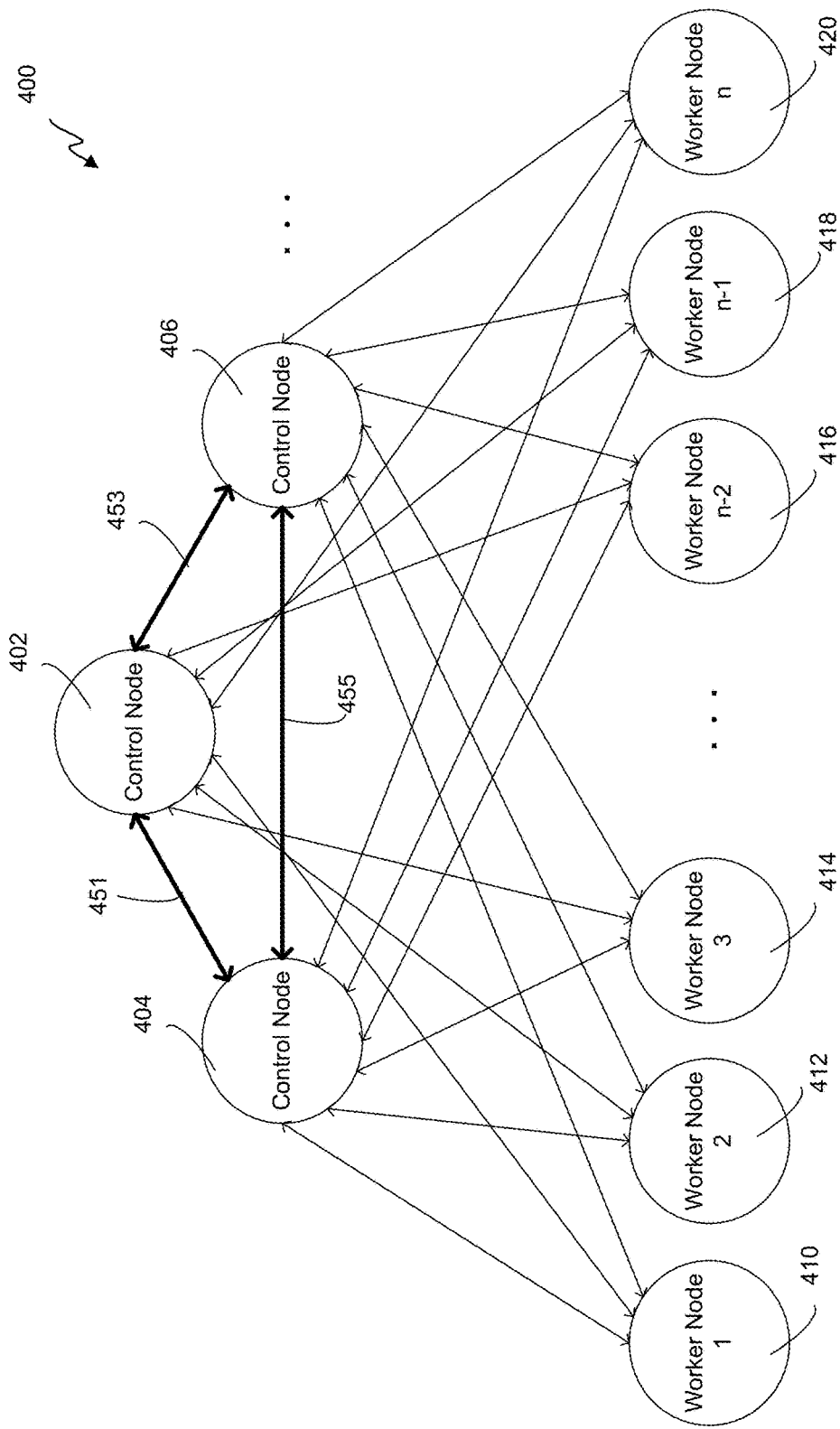
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be receive or stored by a machine other than a control node (e.g., a Hadoop data node).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most effectively and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes). The primary control node may be provided with a list of other nodes (e.g., other machines, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined interval of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
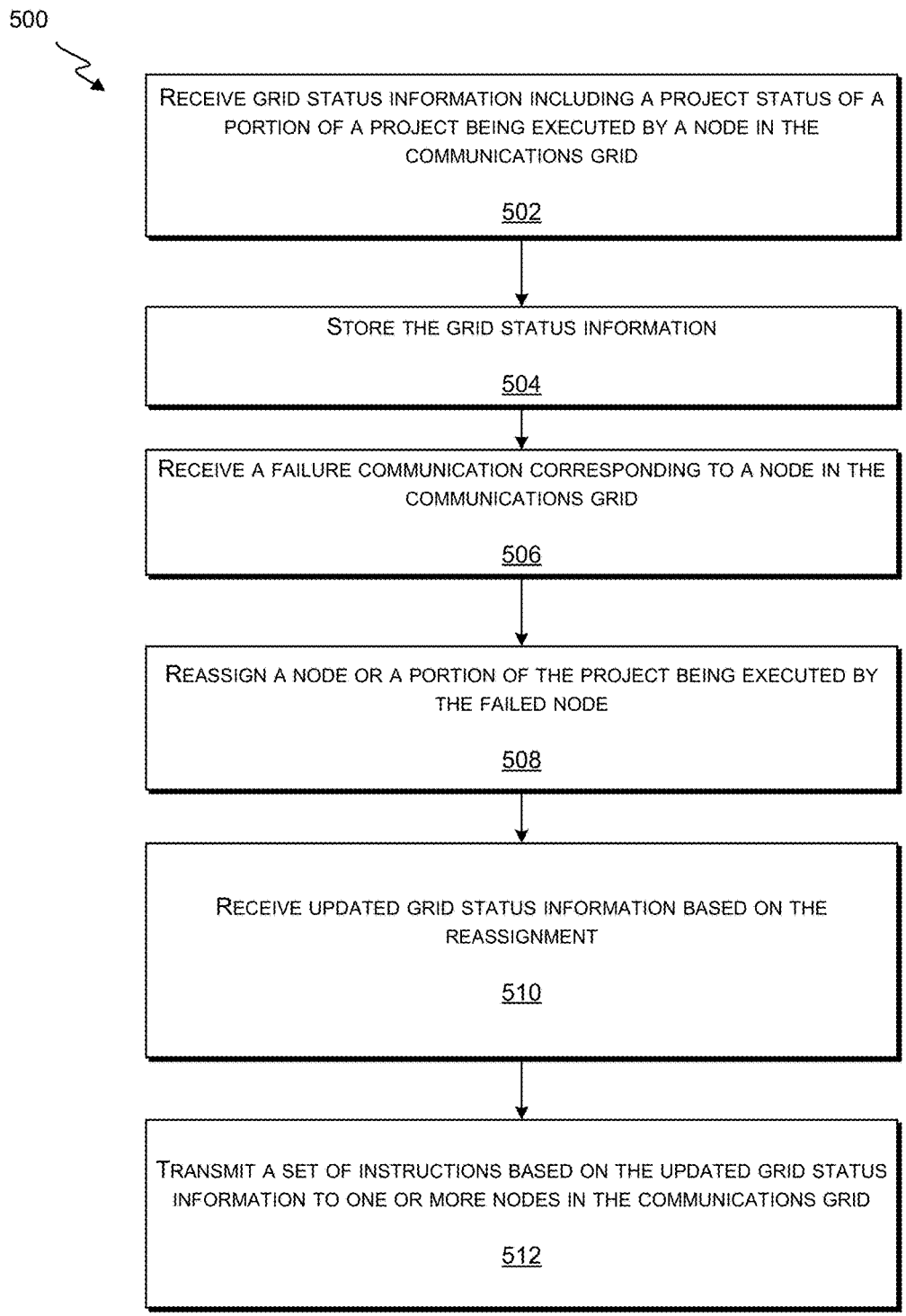
FIG. 5 illustrates a flow chart showing an example process for adjusting a communications grid or a work project in a communications grid after a failure of a node, according to some embodiments of the present technology.

FIG. 5 illustrates a flow chart showing an example process for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
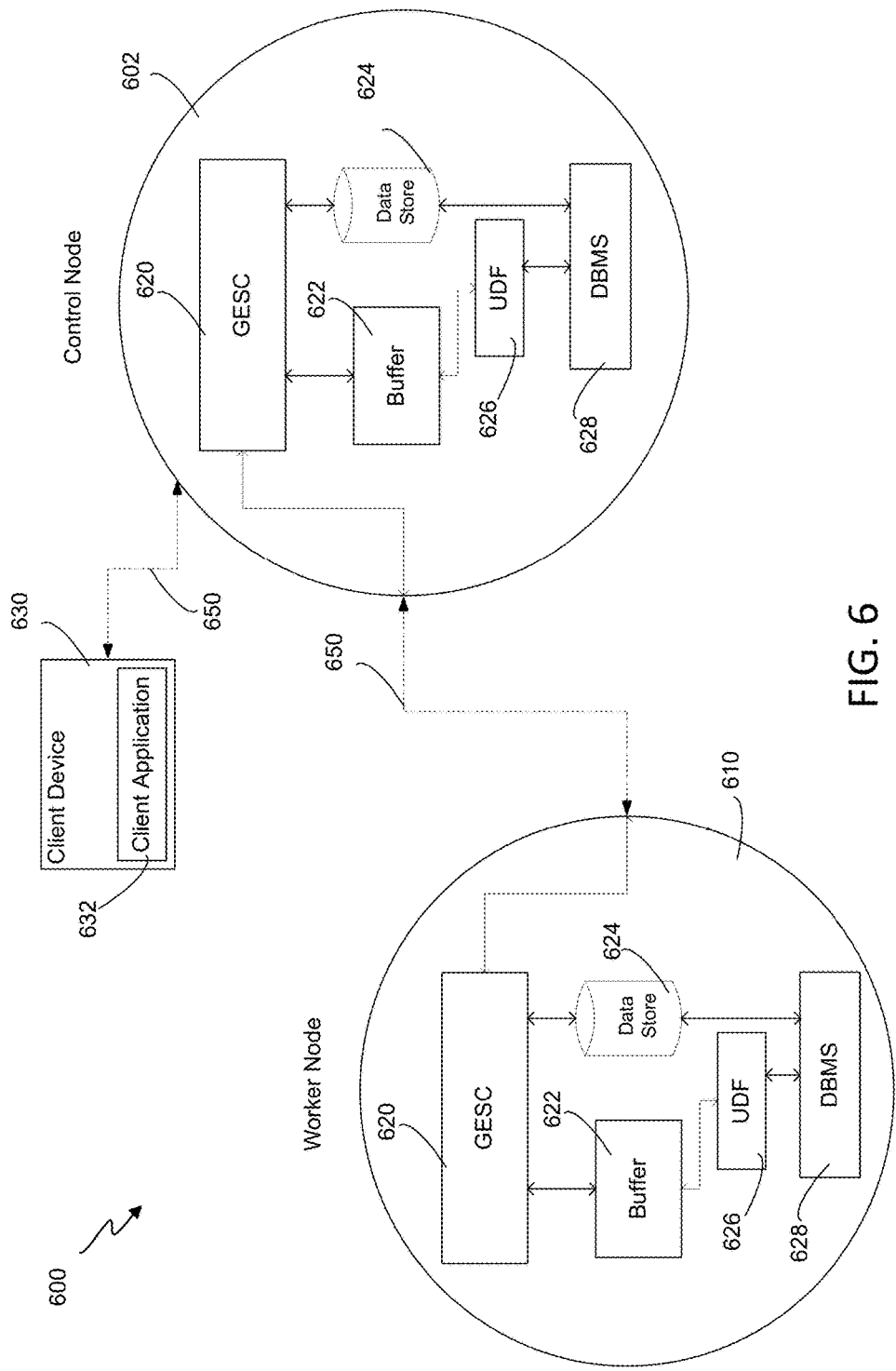
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes a DBMS 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are handled by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within a nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data handled in the associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
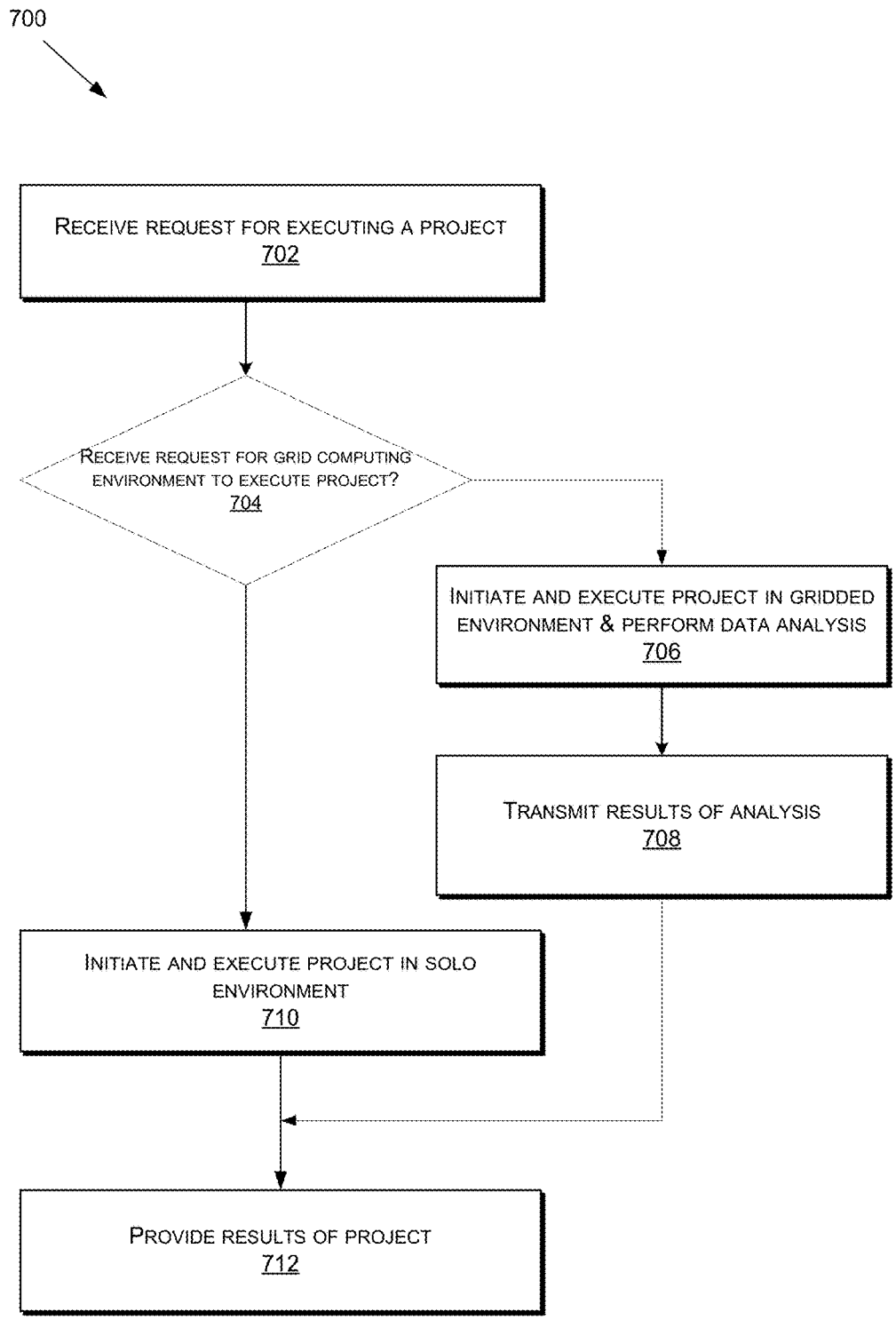
FIG. 7 illustrates a flow chart showing an example process for executing a data analysis or processing project, according to some embodiments of the present technology.

FIG. 7 illustrates a flow chart showing an example method for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model handled by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over an interval of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that handles the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other techniques on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field data points and include both metadata and field data associated with an event. The metadata may include an opcode indicating if the event represents an insert, update, delete, or upsert, a set of flags indicating if the event is a normal, partial-update, or a retention generated event from retention policy handling, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process of an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a handler for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and handling (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024*a*-*c*, according to embodiments of the present technology. ESP system 1000 may include ESP device or subsystem 1001, event publishing device 1022, an event subscribing device A 1024*a*, an event subscribing device B 1024*b*, and an event subscribing device C 1024*c*. Input event streams are output to ESP device 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024*a*, event subscribing device B 1024*b*, and event subscribing device C 1024*c*. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024*a*, event subscribing device B 1024*b*, and event subscribing device C 1024*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024*a*, event subscribing device B 1024*b*, and event subscribing device C 1024*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024*a* using the publish/subscribe API. Subscribing client B 1006 may be started by an event subscription application B executing at event subscribing device B 1024*b* using the publish/subscribe API. Subscribing client C 1008 may be started by an event subscription application C executing at event subscribing device C 1024*c* using the publish/subscribe API.

An event block object containing one or more event objects is injected into a source window of the one or more source windows 806 from an instance of an event publishing application on event publishing device 1022. The event block object may generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 806, and subscribing client C 808 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024*a-c*. For example, subscribing client A 804, subscribing client B 806, and subscribing client C 808 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a machine-readable medium operably coupled to the processor. The processor is configured to execute an ESP engine (ESPE). The machine-readable medium has instructions stored thereon that, when executed by the processor, cause the computing device to support the failover. An event block object is received from the ESPE that includes a unique identifier. A first status of the device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory machine-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory machine-readable medium.

U.S. application Ser. No. 12/705,204, filed Feb. 12, 2010, and Ser. No. 14/543,340, filed on Nov. 17, 2015, describe related systems, methods, techniques, and products. These applications are hereby incorporated by reference in their entireties for all purposes.

Figure 11:
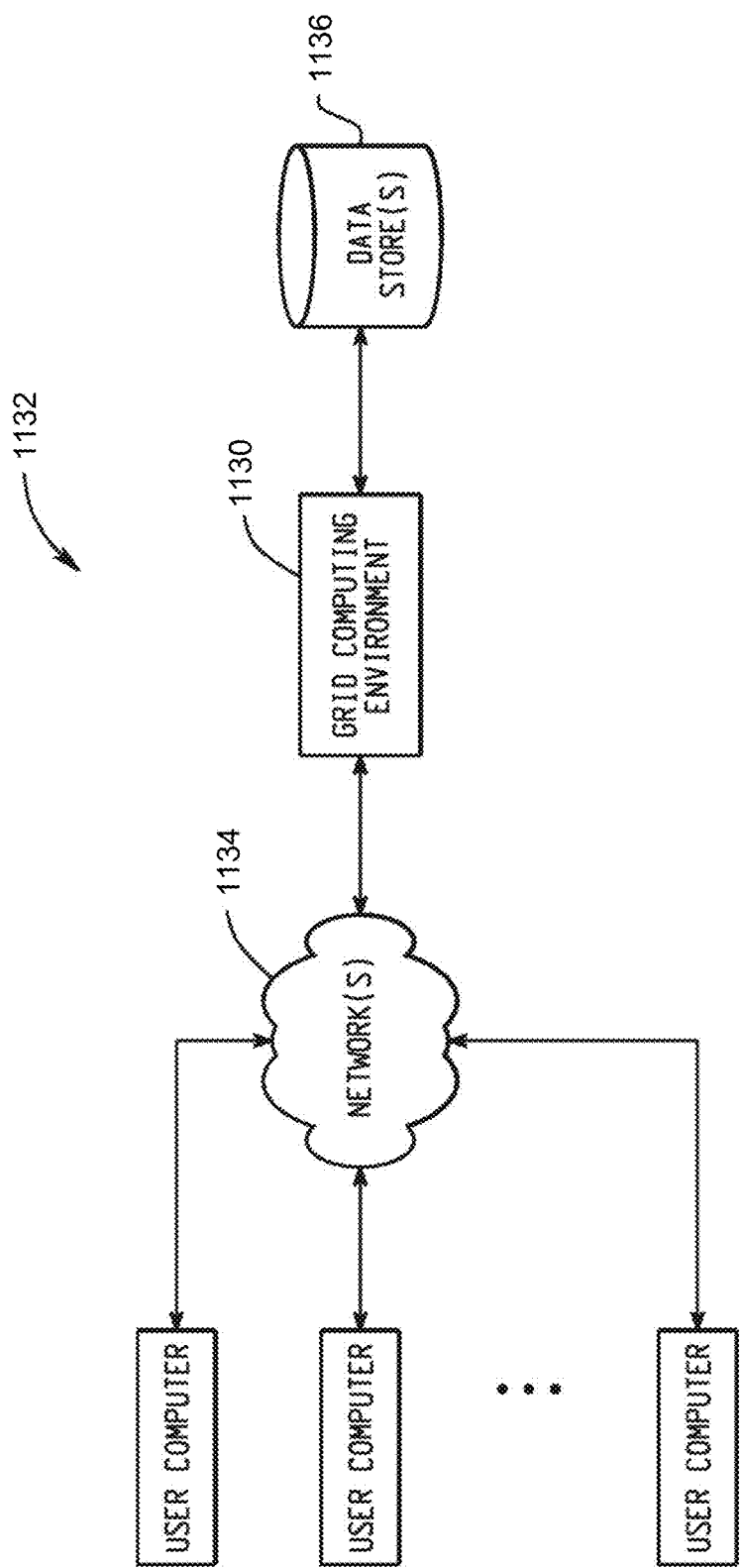
FIG. 11 is a block diagram depicting an environment wherein users can interact with a grid computing environment.

FIG. 11 depicts at 1130 a grid computing environment for processing large amounts of data for many different types of applications, such as for scientific, technical or business applications that require a great number of computer processing cycles. User computers 1132 can interact with the grid computing environment 1130 through a number of ways, such as over one or more networks 1134.

One or more data stores 1136 can store the data to be analyzed by the grid computing environment 1130 as well as any intermediate or final data generated by the grid computing environment. However in certain embodiments, the configuration of the grid computing environment 1130 allows its operations to be performed such that intermediate and final data results can be stored solely in volatile memory (e.g., RAM), without a requirement that intermediate or final data results be stored to non-volatile types of memory (e.g., disk). In this way, grid computing environment 1130 can more efficiently perform the operations, such as by requiring few or no non-volatile memory or non-transitory storage read or write cycles, which may decrease overall performance.

This can be useful in certain situations, such as when the grid computing environment 1130 receives ad hoc queries from a user and when responses, which are generated by processing large amounts of data, need to be generated on-the-fly. In this non-limiting situation, the grid computing environment 1130 is configured to retain the processed information within the grid memory so that responses can be generated for the user at different levels of detail as well as allow a user to interactively query against this information. Such a configuration allows for more efficient real-time processing and can improve the functioning of the grid computing environment by allowing for real-time processing of multiple user queries simultaneously, which may correspond to similar, related, or wholly different queries.

In addition to the grid computing environment 1130 handling such large problems, the grid computing environment 1130 can be configured to allow a user to pose multiple ad hoc questions and at different levels of granularity. For example, a user may inquire as to what is the relative possible change exposure a particular set of vehicles might have in the oil sector. To respond to this type of inquiry from the user, the grid computing environment 1130 aggregates all of the oil sector value information together and makes a determination of the exposure that might exist in the future for the oil sector. Upon viewing the results, the user may wish to learn which specific oil company vehicles are contributing the most amount of possible change. Without an OLAP or relational database environment being required, the grid computing environment 1130 aggregates all of the oil company value information and makes a determination of the company-level change exposure that might exist in the oil sector in the future. Additionally, because the underlying data results are retained throughout the queries of the user, the grid computing environment 1130 can provide other items of interest. For example, in addition to a user's earlier query involving two vehicles, the user now wishes to add another vehicle to the analysis list to see how it is affected. In response, the grid computing environment 1130 adds position evaluation information that has already been generated and retained in memory for Entity C as well as for the other entities. As another example, the user can specify in a subsequent query that they wish to reduce their number of a particular vehicle and have that position analyzed.

Figure 12:
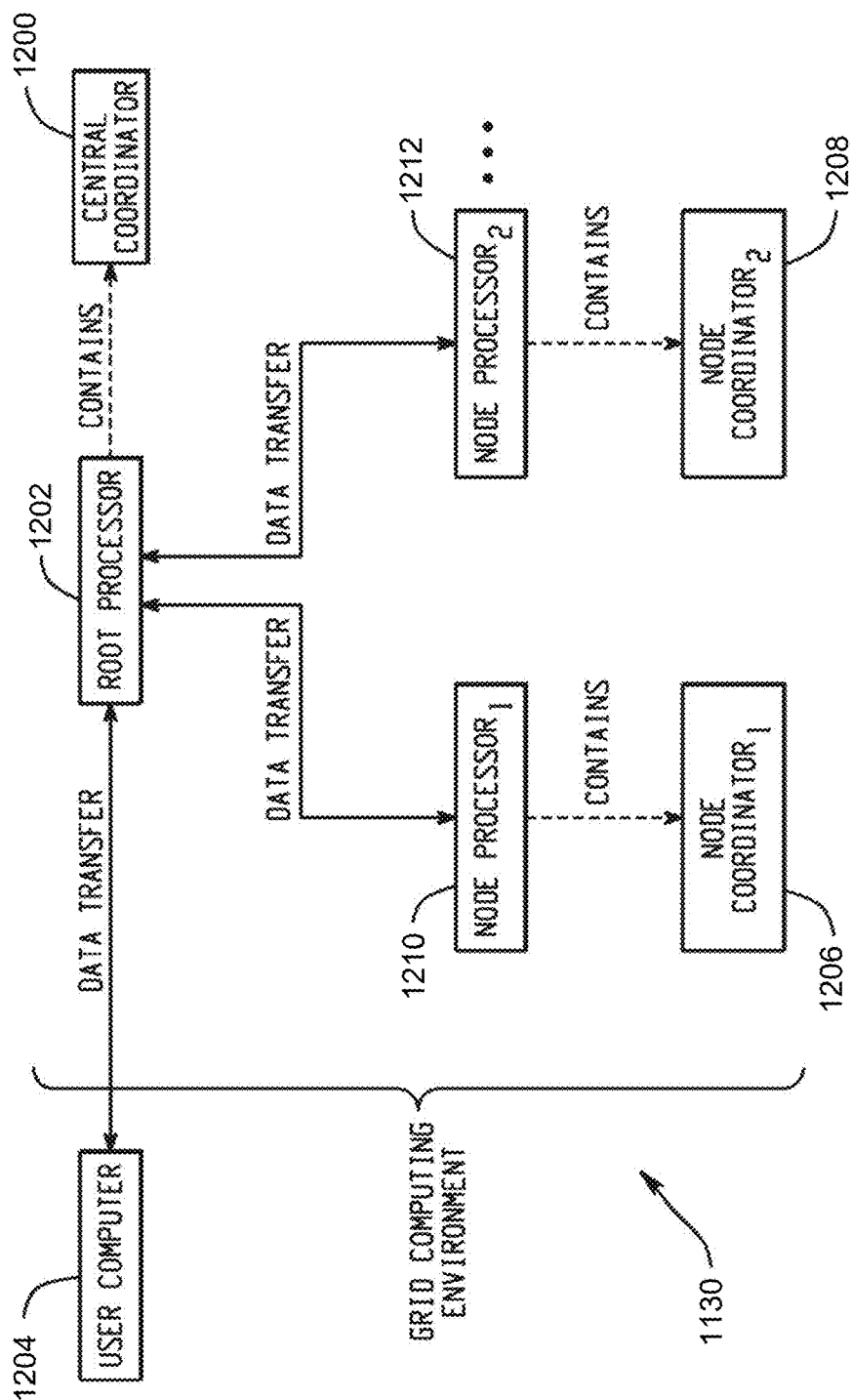
FIG. 12 and FIG. 13 are block diagrams depicting illustrate hardware and software components for the grid computing environment.
Figure 13:
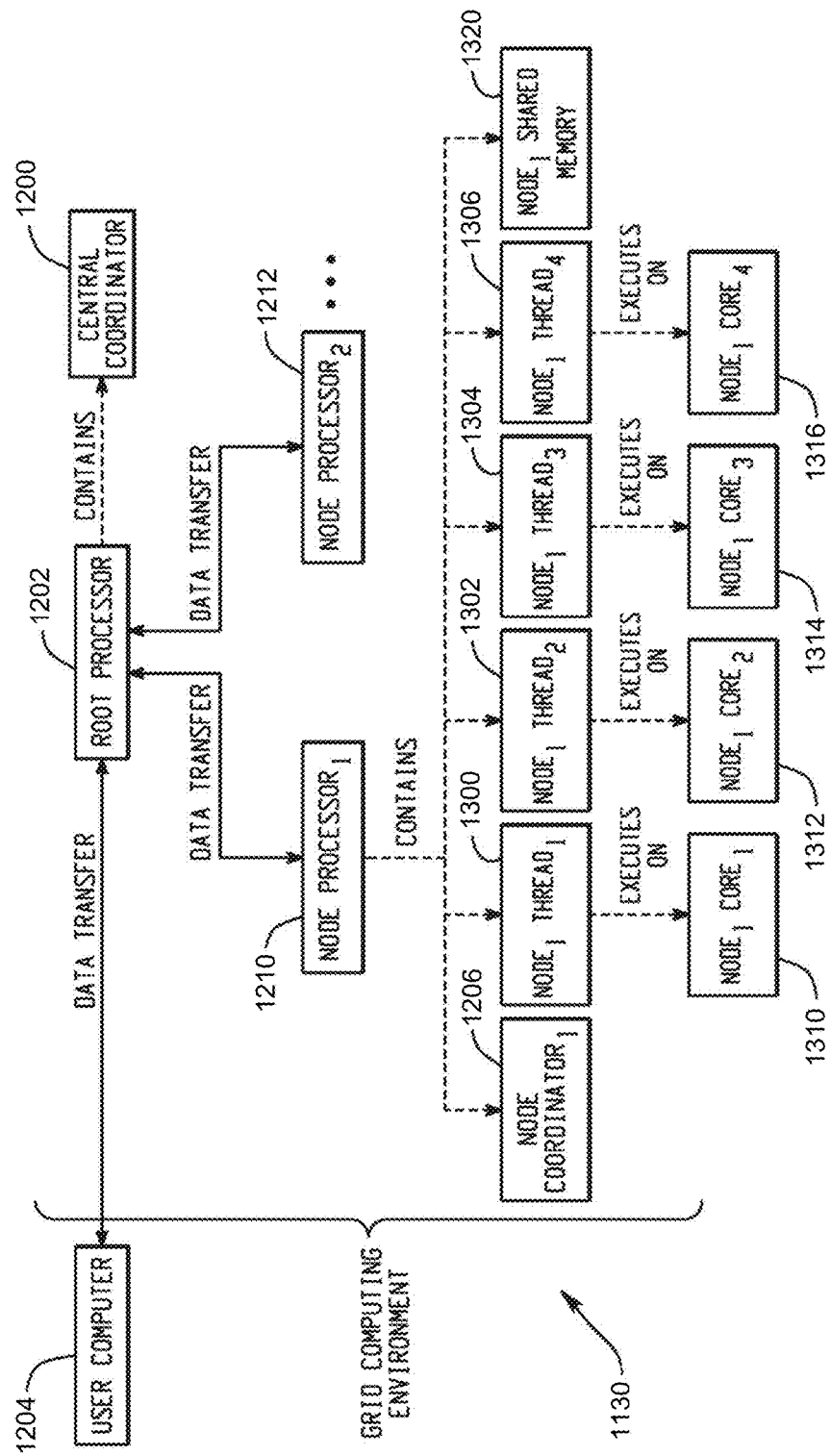

FIGS. 12 and 13 illustrate hardware and software components for the grid computing environment 1130. With reference to FIG. 12, the grid computing environment 1130 includes a central coordinator software component 1200 which operates on a root data processor 1202. The central coordinator 1200 of the grid computing environment 1130 communicates with a user computer 1204 and with node coordinator software components (1206, 1208) which execute on their own separate data processors (1210, 1212) contained within the grid computing environment 1130.

As an example of an implementation environment, the grid computing environment 1130 can comprise a number of blade servers, and a central coordinator 1200 and the node coordinators (1206, 1208) are associated with their own blade server. In other words, a central coordinator 1200 and the node coordinators (1206, 1208) execute on their own respective blade server. In this example, each blade server contains multiple cores, and as shown in FIG. 13, a thread (e.g., threads 1300, 1302, 1304, 1306) is associated with and executes on a core (e.g., cores 210, 212, 214, 216) belonging to a node processor (e.g., node processor 1210). A network connects each blade server together.

The central coordinator 1200 comprises a node on the grid. For example, there might be 100 nodes, with only 50 nodes specified to be run as node coordinators. The grid computing environment 1130 will run the central coordinator 1200 as a 51st node, and selects the central coordinator node randomly from within the grid. Accordingly, the central coordinator 1200 has the same hardware configuration as a node coordinator.

As shown in FIG. 13, the central coordinator 1200 receives information and provides information to a user regarding queries that the user has submitted to the grid. The central coordinator 1200 is also responsible for communicating with the 50 node coordinator nodes, such as by sending them instructions on what to do as well as receiving and processing information from the node coordinators. In one implementation, the central coordinator 1200 is the central point of contact for the client with respect to the grid, and a user never directly communicates with any of the node coordinators.

With respect to data transfers involving the central coordinator 1200, the central coordinator 1200 communicates with the client (or another source) to obtain the input data to be processed. The central coordinator 1200 divides up the input data and sends the correct portion of the input data for routing to the node coordinators. The central coordinator 1200 also may generate random numbers for use by the node coordinators in simulation operations as well as aggregate any processing results from the node coordinators. The central coordinator 1200 manages the node coordinators, and each node coordinator manages the threads which execute on their respective machines. Such a process may increase processing, routing and communication efficiency as compared to prior techniques, or to sending all the input data to each node coordinator with an indicator of the data to be processed by a particular node.

A node coordinator allocates memory for the threads with which it is associated. Associated threads are those that are in the same physical blade server as the node coordinator. However, it should be understood that other configurations could be used, such as multiple node coordinators being in the same blade server to manage different threads which operate on the server. Similar to a node coordinator managing and controlling operations within a blade server, the central coordinator 1200 manages and controls operations within a chassis.

As shown in FIG. 13, a node processor includes shared memory (e.g., shared memory 1320) for use for a node coordinator and its threads. The grid computing environment 1130 is structured to conduct its operations (e.g., matrix operations, etc.) such that as many data transfers as possible occur within a blade server (i.e., between threads via shared memory on their node) versus performing data transfers between threads which operate on different blades. Such data transfers via shared memory is more efficient than a data transfer involving a connection with another blade server. In this way, a node processor may operate with improved processing efficiency and reduce unused processing cycles and network transmissions as compared to alternative configurations. This allows for faster processing, more efficient memory usage, and reduced network congestion, compared to threads operating on different blades or threads not making use of shared memory on their node.

FIG. 14 depicts a flow diagram of a grid computing environment which has been configured for performing state processing for analyzing vehicle changes. The central coordinator and node coordinators of the grid computing environment are configured to efficiently perform matrix decomposition processes (e.g., factorization of a matrix) upon input data to project system states. Stochastic simulations are performed at 1400 using the matrix factorization to generate system state projections. The system state projections are used to generate at 1402 analysis information at the node coordinators. The scenario analysis information generated at the node coordinators is then aggregated at 1404 by the central coordinator and used to respond to user queries.

It will be appreciated that grid computing environment 1130 may correspond to a specialized computing platform for scenario state processing in accordance with the present disclosure. In some embodiments, scenario state processing may only be performed by a suitable computing platform, like the grid computing environment 1130, and may not operate on a general purpose computer lacking one or more components of grid computing environment 1130.

Further, it will be appreciated that nodes of grid computing environment 1130 may include one or more special purpose processors that are able to perform operations, such as matrix processing. For example, a special purpose processor may correspond to a processor programmed with or executing instructions for performing matrix operations. Additionally or alternatively, special purpose processors include, but are not limited to, those with one or more programmable logic gates, such as field programmable gate arrays, or other programmable logic devices.

FIG. 15 illustrates a set of operations for using the central coordinator and node coordinators to generate system state projections. In the example of FIG. 15, the central coordinator and node coordinators of the grid computing environment are configured to process the input data 1500 to form a cross product matrix (X'X matrix). To form the X'X matrix, the central coordinator at 1502 breaks up and distributes historical data to the node coordinators so that a matrix decomposition (X'X) of the input data 1500 can be performed at the node coordinators.

The X'X matrix is further processed by performing at the node coordinators adjustments at 1504 to the X'X rows of data stored at the node coordinators. This processing results in obtaining a root, such as a Cholesky root (L' matrix). To generate the system state projections 1512, stochastic simulations are performed at 1510 at the node coordinators based upon the generated L' matrix that was distributed to the node coordinators at 1506 and based upon vectors of random numbers that were distributed to the node coordinators at 1508. After the system state projections are calculated, each node coordinator will have a roughly equal number of system state projections, with each system state containing values for all of the factors from the input data.

Figure 16:
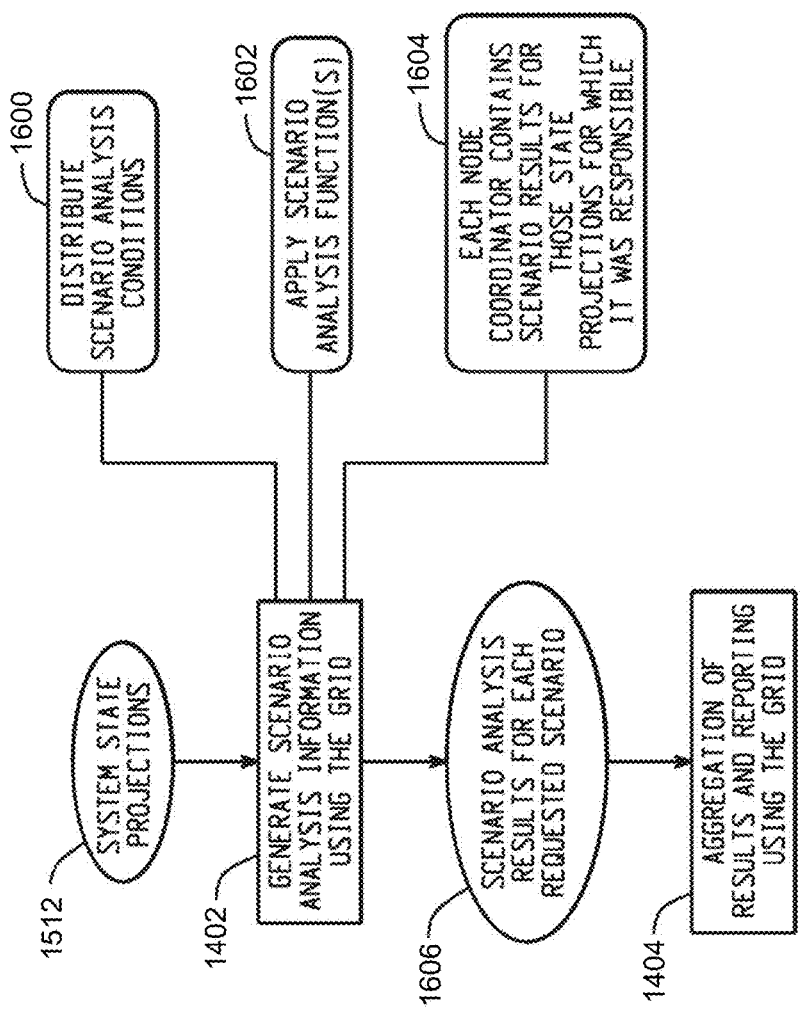
FIG. 16 is a process flow diagram depicting functionality directed to using system state projections for generating scenario analysis results.

FIG. 16 depicts functionality directed to using the system state projections 1512 for generating analysis results 1606. As input data to the analysis generation function 1402, a user provides the conditions under which the analysis is to be conducted. For example, conditions for an analysis can include position information for different vehicles to be evaluated.

The scenario condition information provided by the user is received by the central coordinator and distributed at 1600 by the central coordinator to the node coordinators. Each node coordinator instructs its threads to call scenario analysis functions at 1602 for the system state projections that are present on that node. When this is accomplished, each node coordinator has scenario analysis results for the system state projections for which it is responsible as shown at 1604.

Figure 17:
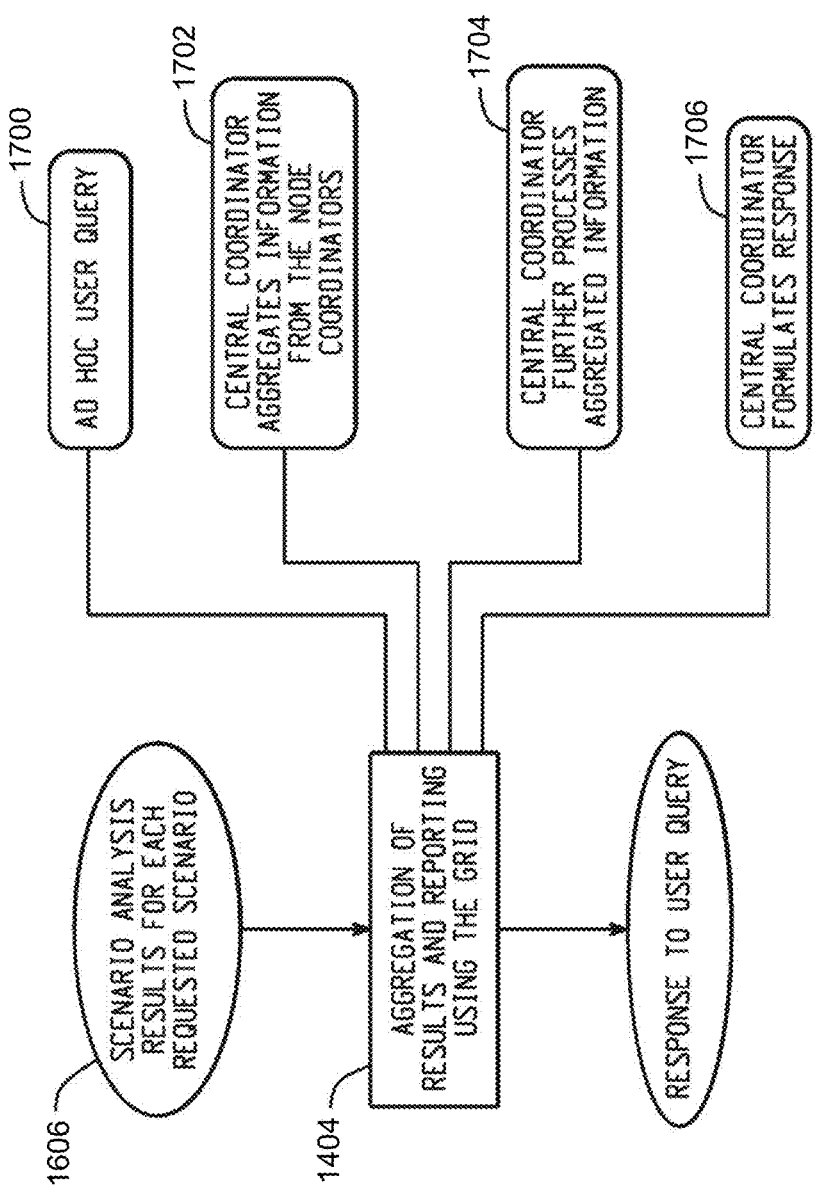
FIG. 17 is a process flow diagram depicting functionality directed to aggregating results from the node coordinators and using the results to respond to ad hoc user queries.

FIG. 17 depicts functionality directed to aggregating results from the node coordinators and using the results to respond at 1706 to ad hoc user queries received at 1700. The central coordinator receives the individual scenario analysis results 1606 from each node coordinator. The central node coordinator aggregates at 1702 the individual scenario results at a level responsive to the user query. The central node coordinator may also perform at 1704 additional math operations (e.g., descriptive statistical operations) on the aggregated data for user review.

Figure 18:
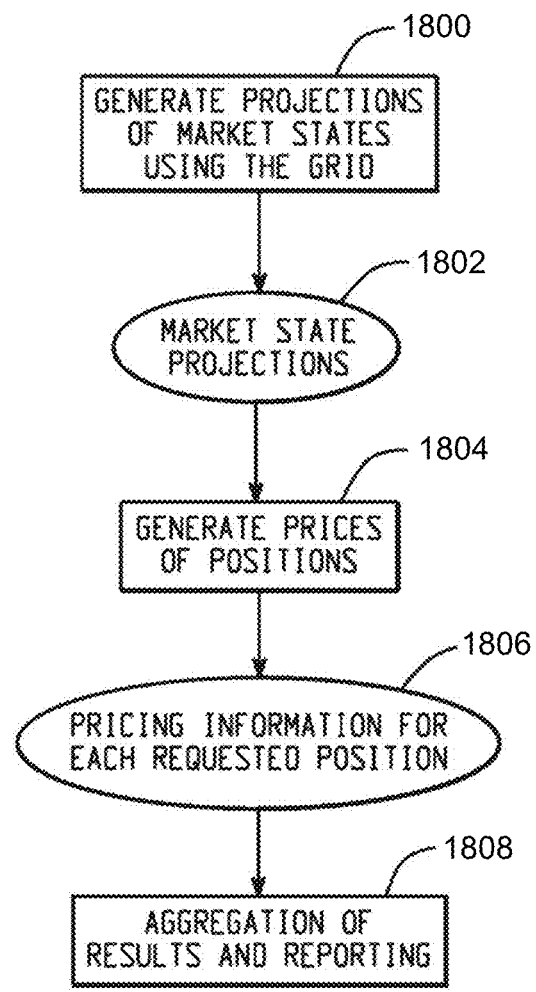
FIG. 18 is a process flow diagram depicting a state generation and change evaluating application using a grid computing environment.

FIG. 18 depicts a state generation and change evaluation application using a grid computing environment. This change evaluation application considers how previous changes affect the yet to come vehicle changes. For example, for A and B vehicles, the grid computing environment examines previous information for the change factors which are relevant to such vehicles. Change factors are a set of variables that describe a state of the system under consideration. Each change factor has different attributes and behaviors and is a unique contributor to the environment and state outcome. For example, for A and B vehicles, change factors might include values of the A or B product source material, value medium switch rates, non-working rates, etc.

The grid computing environment examines the history of these change factors to determine how it may affect vehicle values. The grid computing environment then projects forward from the change factor historical data (e.g., via a stochastic model) by generating at 1800 state projections 1802 for all of the change factors. For example, state projections in this field may examine how A or B product source material values varied over past periods as well as for different value mediums, and then perform stochastic simulations using the historical change factor data to project possible performance going forward (e.g. over the next period).

As an illustration, the grid computing environment is provided with several periods of historical information for the change factors. As shown at 1900 in the example of FIG. 19, two working periods of information has been collected for the change factors for each working day, which amounts to 500 days of information. From this information, the grid computing environment generates state projections for each change factor. For example, a state projection for A and B product source material values may indicate that the value of the source material will vary between 50-90 over the next year. Another state projection may examine how a particular value medium will vary over that period. The state projections are used to examine the different ways in which the overall vehicle distribution might perform.

For each of these states (e.g., the source material has a value of 75 over the next year on average, and the US value medium will be 1.39 times the EU value medium, and unemployment will 10%), the grid computing environment examines the value of a person's 200 vehicle units of Entity B, and similarly, the value of the person's 300 vehicle units of Entity A. The grid computing environment takes each of the state projections into the future, and generates a value for the different vehicle positions.

Figure 19:
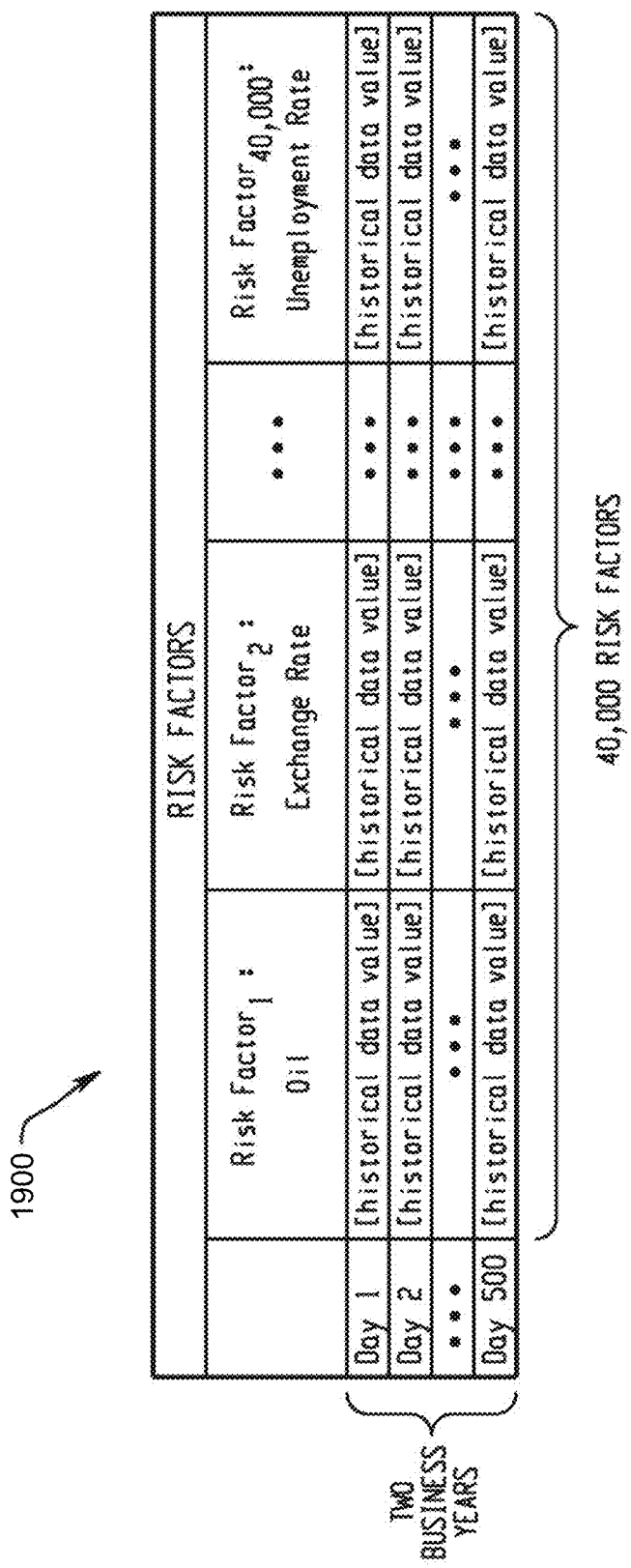
FIG. 19 is a table depicting two business years of information which has been collected for the change factors for each working day.

To achieve a relatively high level of confidence, a large number of change factors is examined. As an illustration, the number of change factors in FIG. 19 is 40000. Additionally, the grid computing environment may generate tens of thousands of state projections because a higher confidence level is desired.

With reference to FIG. 19, in addition to change factor historical data being input into the grid computing environment, the number of working days ("n") and the number of external change factors that affect vehicle value ("p") are provided. As an illustration, the number of working days ("n") for which historical data has been collected for the external change factors is 500 working days (i.e., the data has been collected for two years); and the number of external change factors ("p") is 40000 variables (e.g., value medium switch (i.e., exchange) rates, non-working rate, etc.). This forms an "n" by "p" matrix and is termed an "X" matrix. The size of the matrix illustrates the magnitude of the problem to be handled.

This input data set can be supplied by the user over a network and stored only in volatile memory, thereby helping, if needed, to mitigate security concerns. However, it should be understood that other situations may allow the input data set to be stored and provided on non-volatile medium.

For possible change evaluation applications which only involve a relatively small number of change factors, processing time using conventional approaches can be acceptable. However, once the problem becomes inordinately large, such as having the grid computing environment track tens of thousands of change factors (e.g., 40000), processing time can approach multiple days. In addition to this large number, the problem is amplified because the grid computing environment must also generate thousands of state projections (e.g., 10000) to acquire a desired confidence level. This only serves to increase further the overall amount of processing time required to handle such large data sets, with some runs using conventional approaches lasting as many as 5-7 days.

As another indication of the relatively large nature of the problem, it is not uncommon for a user to provide a million positions to evaluate. With this number of positions to value and the grid computing environment generating 10,000 state projections, this will result in 11 billion items to process. A grid computing environment as disclosed herein can be configured to efficiently handle such a large-scale problem.

Figure 20:
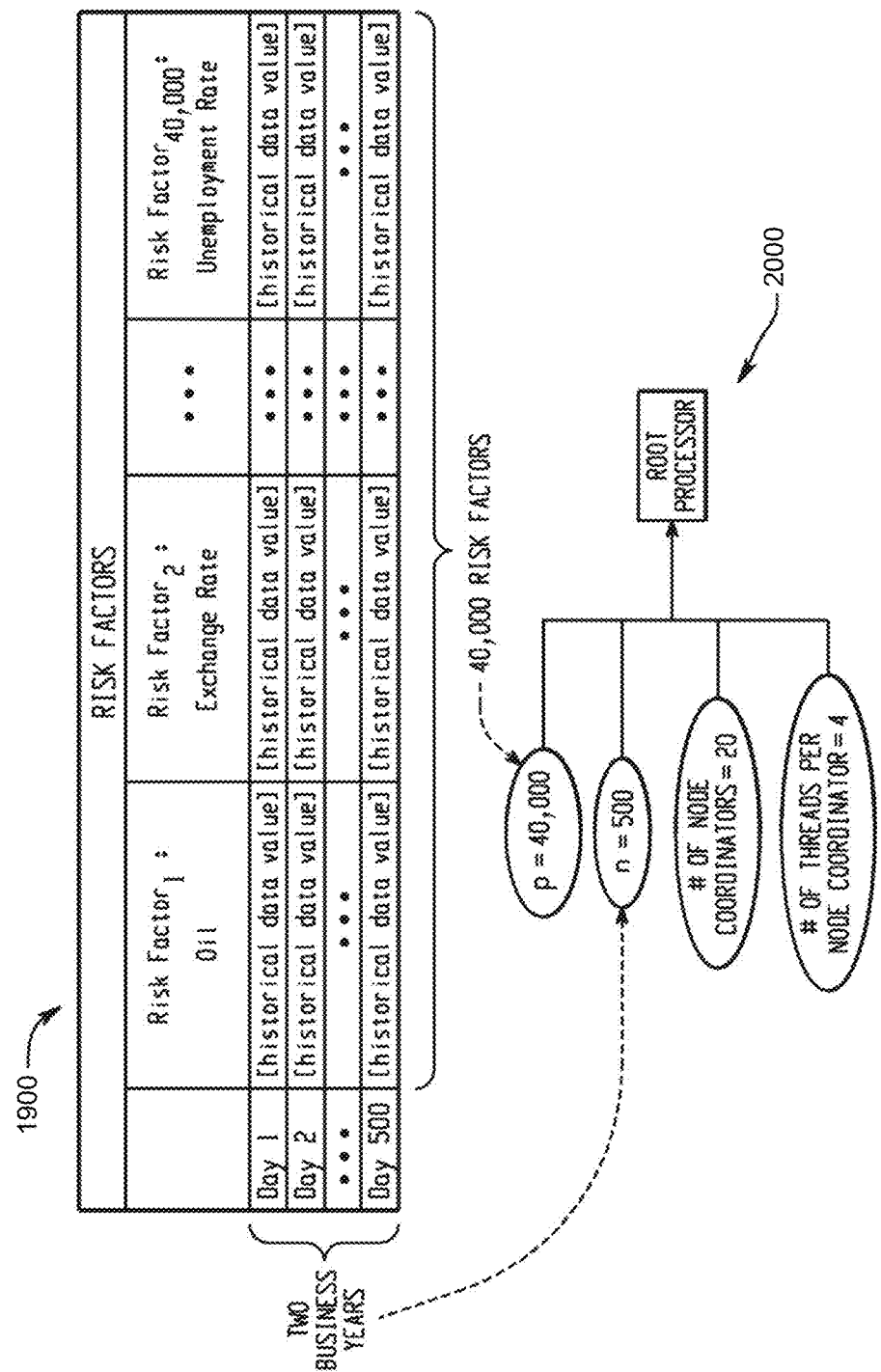
FIG. 20 depicts additional input data for generating state projections.

FIG. 20 depicts at 2000 additional input data for generating state projections. To determine how to allocate which portions of data a node coordinator is to handle, the central coordinator on the root processor receives not only the dimensions associated with the change factor input data and the data itself, but also the configuration to be used within the grid computing environment. This type of information can include the number of node coordinators and the number of threads per node coordinator. For example, the number of node coordinators might be 20 and the number of threads per node coordinator might be 4.

With reference back to FIG. 18, the state projections 1802 form the basis for examining how the A vehicles and the B vehicles will perform in the time to come and allow a user (e.g., an evaluator) to view what the potential value changes might be for a set of vehicles, such as does an individual have a 0.05 possibility of a particular reduction by a given set of vehicles over the next period? For each change factor, the state projections 1802 in the time to come correspond to a mean of all of the different change factors. A state projection can be viewed as a curve which represents how a change factor will vary over time.

To generate these curves for the change factors, the grid computing environment uses stochastic simulation techniques. Stochastic simulation techniques differ from methods which use predictions of change factors to understand possible changes. For example, a prediction model probably would not have predicted a non-working rate to have risen to 10% and beyond in 2009 because only a couple years ago it was much lower. In contrast, a stochastic simulation may have simulated a situation where the non-working rate did reach 10% and beyond in 2009.

After the state projections are generated at 1800, the next step involves evaluating each of the positions at 1804. A list of held vehicles (e.g., positions) are received from the user. An evaluation function uses this information as well as the generated state projections to generate values 1806 for each of the positions under the different state projections 1802.

After the values 1806 of positions are generated, the next step is to process at 1808 any queries from a user. Because the grid computing environment retains the evaluation information on the grid, responses can be generated on the fly. In other words, the grid computing environment does not need to know beforehand what is to be asked. Previous approaches would have to pre-aggregate the data up to the level of the user's query (e.g., an entity grouping level information), thereby missing out on more detailed information (e.g., entity-specific level information). In the grid computing environment disclosed herein, the grid computing environment keeps the lower level information live in memory and does not aggregate information until the grid computing environment receives a query from a user. Additionally, the evaluation information staying out in the grid is in contrast to previous approaches wherein the data was written to a central disk location. The central disk location approach constituted a single point which operated as a bottleneck in the process.

Figure 21:
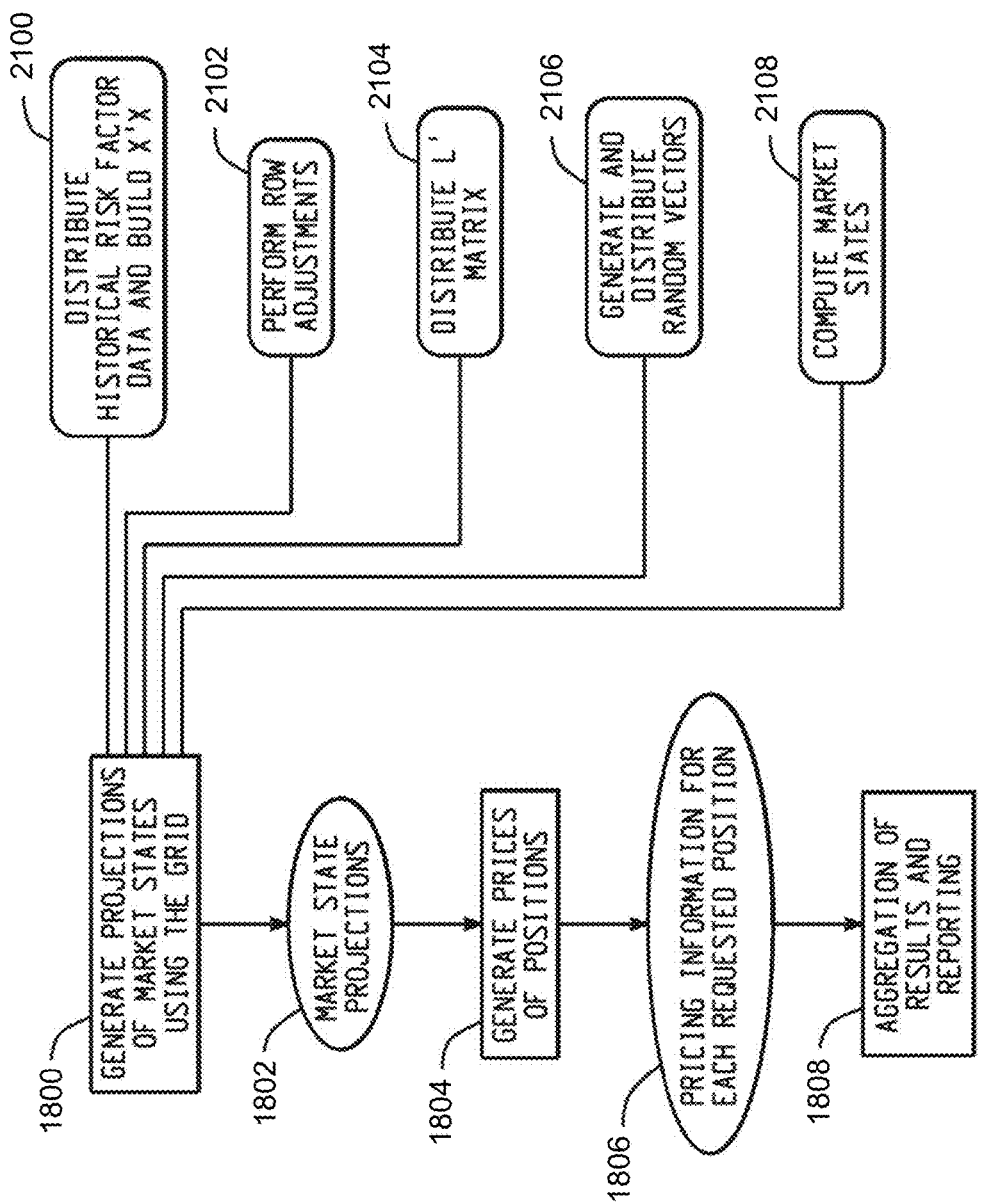
FIG. 21 is a process flow diagram depicting matrix operations and stochastic simulations that are used to generate state projections.

FIGS. 21-48 depict an operational scenario for illustrating the processing of the input data shown in FIGS. 19 and 20. FIG. 21 depicts matrix operations and stochastic simulations that are used to generate state projections. These operations include:

Distribute change factor historical data and build an X'X matrix (at step 2100)

Perform row adjustments to create an L' matrix (at step 2102)

Distribute the L' matrix among the node coordinators (at step 2104)

Distribute random vectors among the node coordinators (at step 2106)

Compute state projections (at step 2108)

Overall, these operations form a cross product matrix (X'X matrix) and then applies a forward Doolittle technique (or other equivalent approach) to obtain a Cholesky root (L' matrix). Stochastic simulations are then performed using the Cholesky root to generate state projections.

Figure 22:
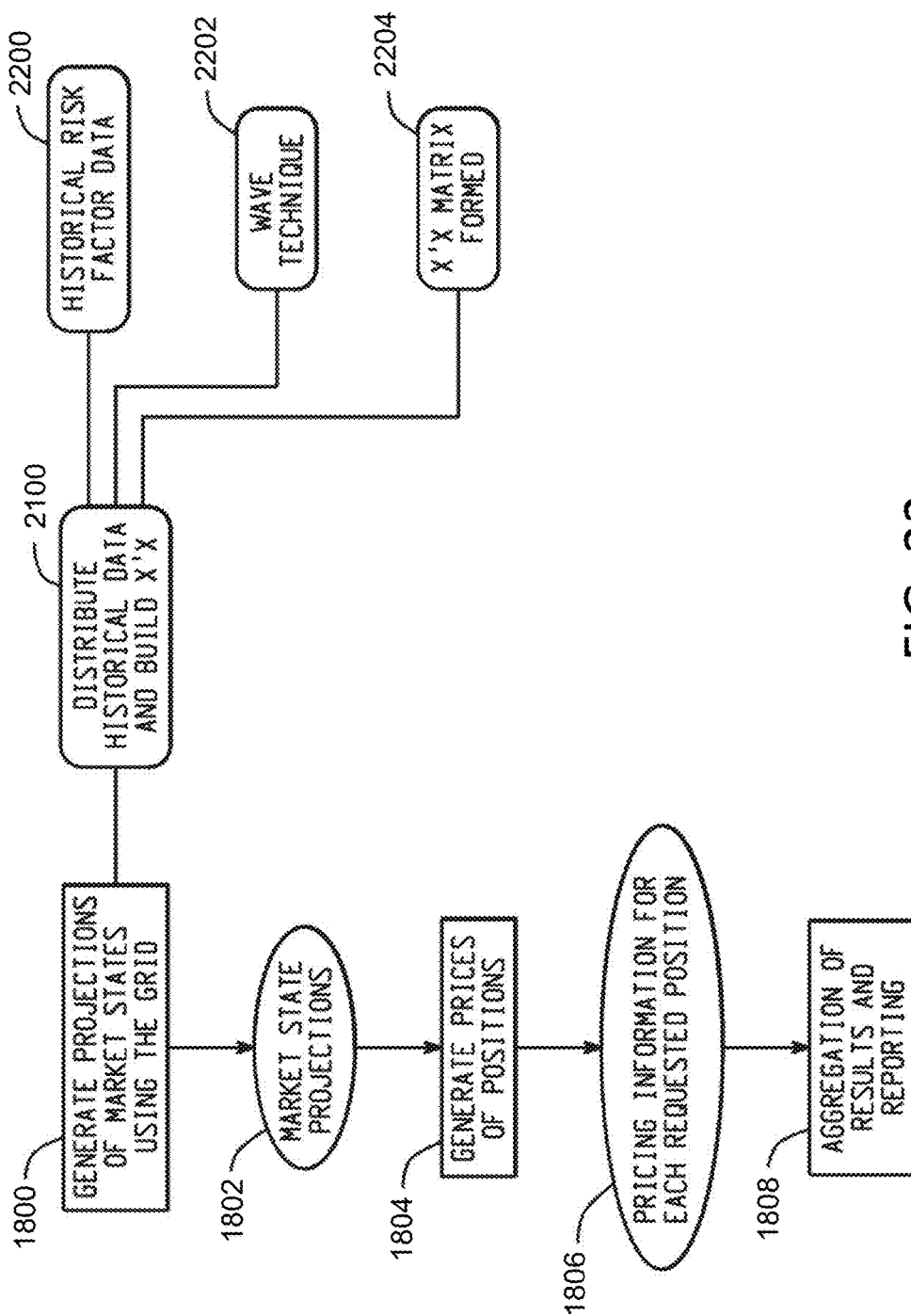
FIG. 22 is a process flow diagram depicting a central coordinator distributing change factor historical data to the node coordinators.
Figure 23:
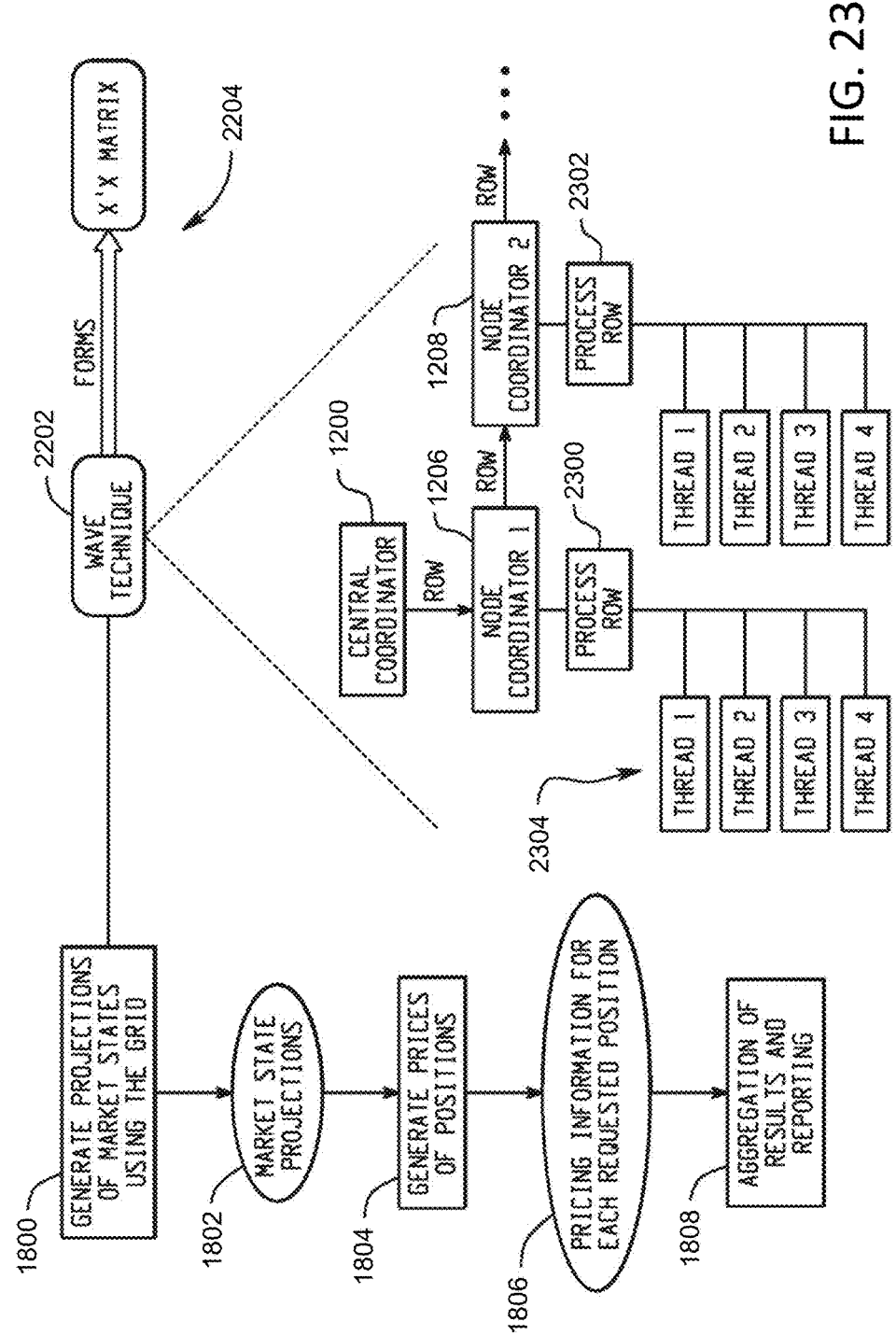
FIG. 23 is a process flow diagram illustrating a wave data distribution technique.
Figure 24:
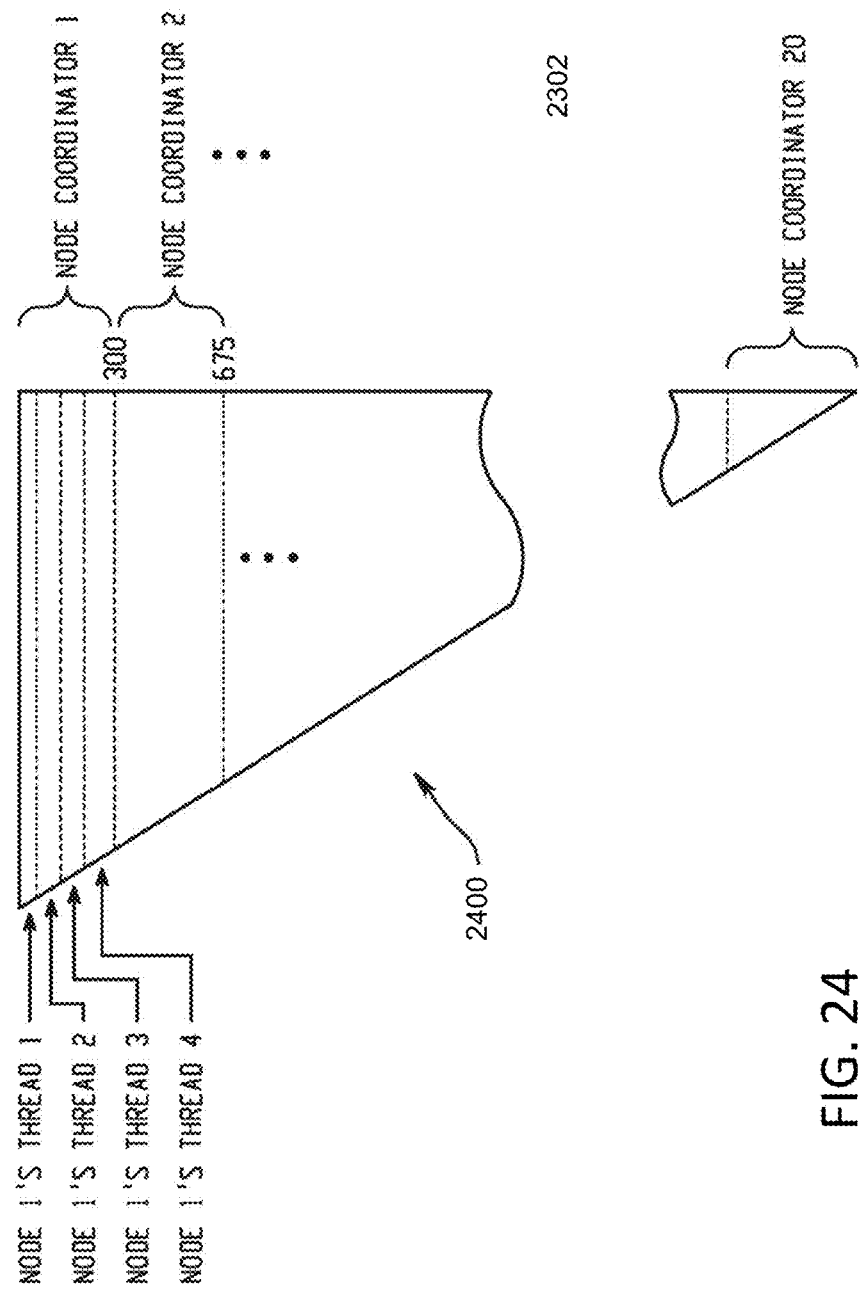
FIG. 24 and FIG. 25 depict an example of storage of an X'X matrix.

FIG. 22 is directed to a central coordinator distributing at 2100 change factor historical data 2200 to the node coordinators for building at 2204 the X'X matrix. The central coordinator receives the input data from the client, and breaks up that information to pass it on to the node coordinators. The grid computing environment uses as shown at 2202 a wave technique for distributing and processing the data. FIG. 23 provides an illustration of the wave data distribution technique 2202, wherein the central coordinator 1200 sends the first row to the first node coordinator 1206. The first node coordinator 1206 sends that row to the second node coordinator 1208, and then the first node coordinator 1206 processes the row at 2300. The second node coordinator 1208 receives the row from the first node coordinator 1206, sends it to the third node coordinator, and then processes at 2302 the row and so forth. The processing of a row by a node coordinator involves instructing its threads 2304 to read that row, and each thread will build a portion of the upper triangular matrix for which it is responsible. As soon as the first node coordinator 1206 has completed processing the first row, it can receive the second row from the central coordinator 1200. The second row is passed on to the subsequent node coordinators in a wave-like fashion similar to the way in which the first row was transmitted. There can be many waves of rows traveling down through the node coordinators at the same time. When all of the rows have been received and processed by the node coordinators, the X'X matrix will have been formed as shown at 2204 and stored in an upper triangular form across the node coordinators.

As an example using the data of FIG. 19, the grid computing environment starts with an X matrix which is "n" by "p" as shown in FIG. 19. From this data set, a "p" by "p" matrix (e.g., 40,000 by 40,000 matrix) is generated by the grid computing environment and is termed an X'X matrix. Once that matrix is determined, then a Cholesky root is taken. This is done by distributing the 40,000×40,000 matrix among the threads of the node coordinators. Each row is sent to the central coordinator, and then the central coordinator farms it out to the node coordinators using the wave data distribution and processing technique described above. Each node coordinator is provided with every row, but each node coordinator creates only a fraction of the overall matrix.

Accordingly, the grid starts with rows of the X matrix, and the calculated X'X matrix will be "p" by "p." Because the matrix is symmetrical, only the upper or lower triangular portion of the matrix is stored. In this example, the upper triangular portion is stored.

Figure 25:
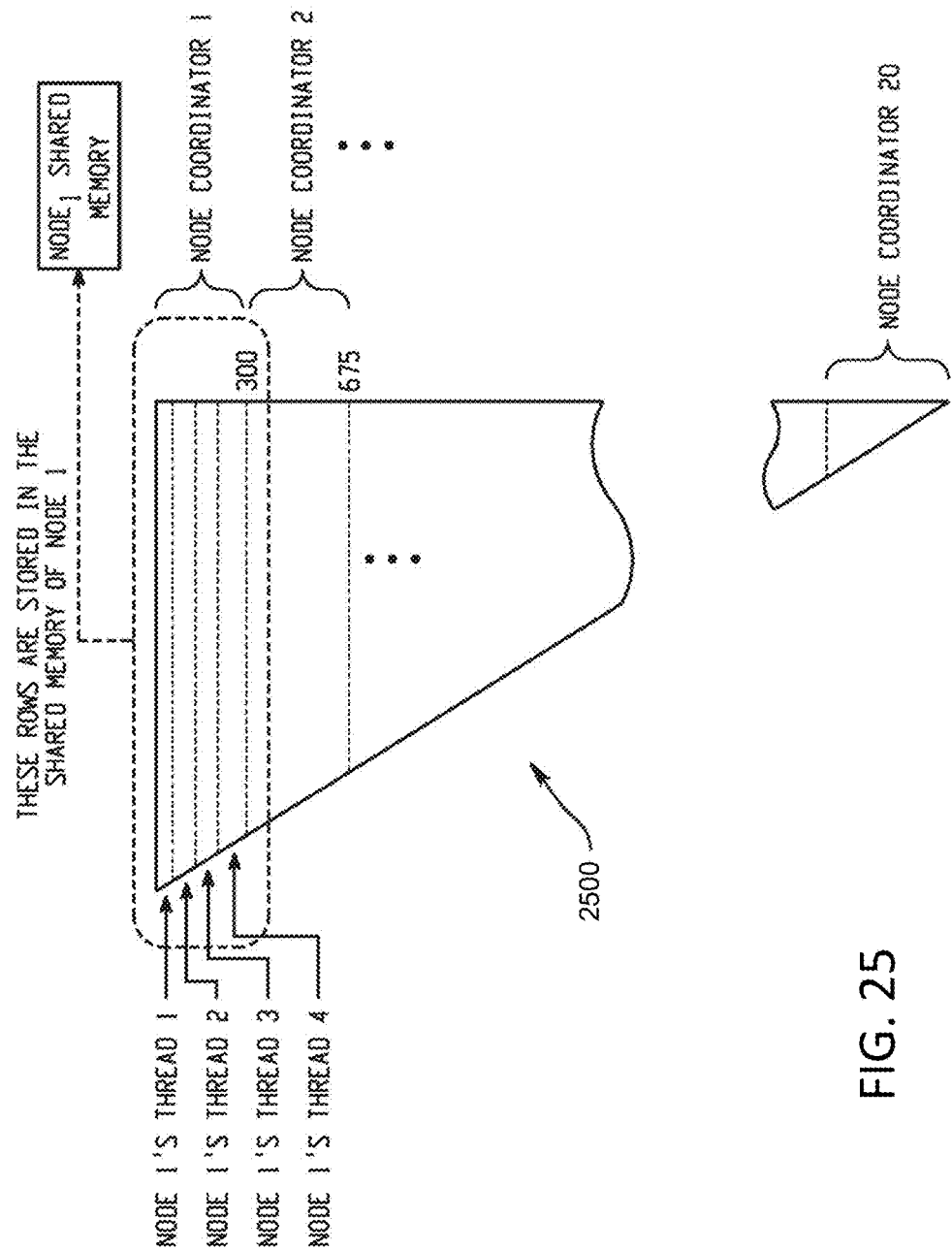

The processing of a row by a node coordinator involves instructing its threads to read that row, and each thread will build a portion of the upper triangular matrix for which it is responsible. The X'X matrix is stored in chunks as shown at 2400 in FIG. 24. The first chunk will be maintained by node coordinator 1, the second chunk will be maintained by node coordinator 2, etc. Within each node coordinator, each chunk is further divided among the threads of the node coordinator. As an illustration, FIG. 25 shows at 2500 that the rows associated with node 1's threads (i.e., threads 1-4) are stored in the shared memory of node 1.

Each node coordinator knows which portion of the triangle is its responsibility to construct based upon how many other nodes there are and how many threads per node there are (i.e., "n" and "p" of FIG. 20). The central coordinator indicates to a node coordinator which number it is, and this is sufficient for the node coordinator to know which portion of the matrix it is to handle as well as how to partition its portion into chunks for the number of threads that is associated with the node coordinator. The size of the portion which a node coordinator is to process is approximately the same as for any other node coordinator.

For example, the central coordinator can indicate to the 20 node coordinators that there will be 80 overall threads that will be working on a 40,000×40,000 size matrix. Based on this information, each node coordinator (e.g., node coordinators 1-20) knows on which portion of the matrix it is to work. The central coordinator then sends out a row from the n by p input matrix to a node coordinators. As an illustration in FIG. 25, node coordinator 2 recognizes that since it is the second node coordinator, that it is to process rows 300 to 675.

Figure 26:
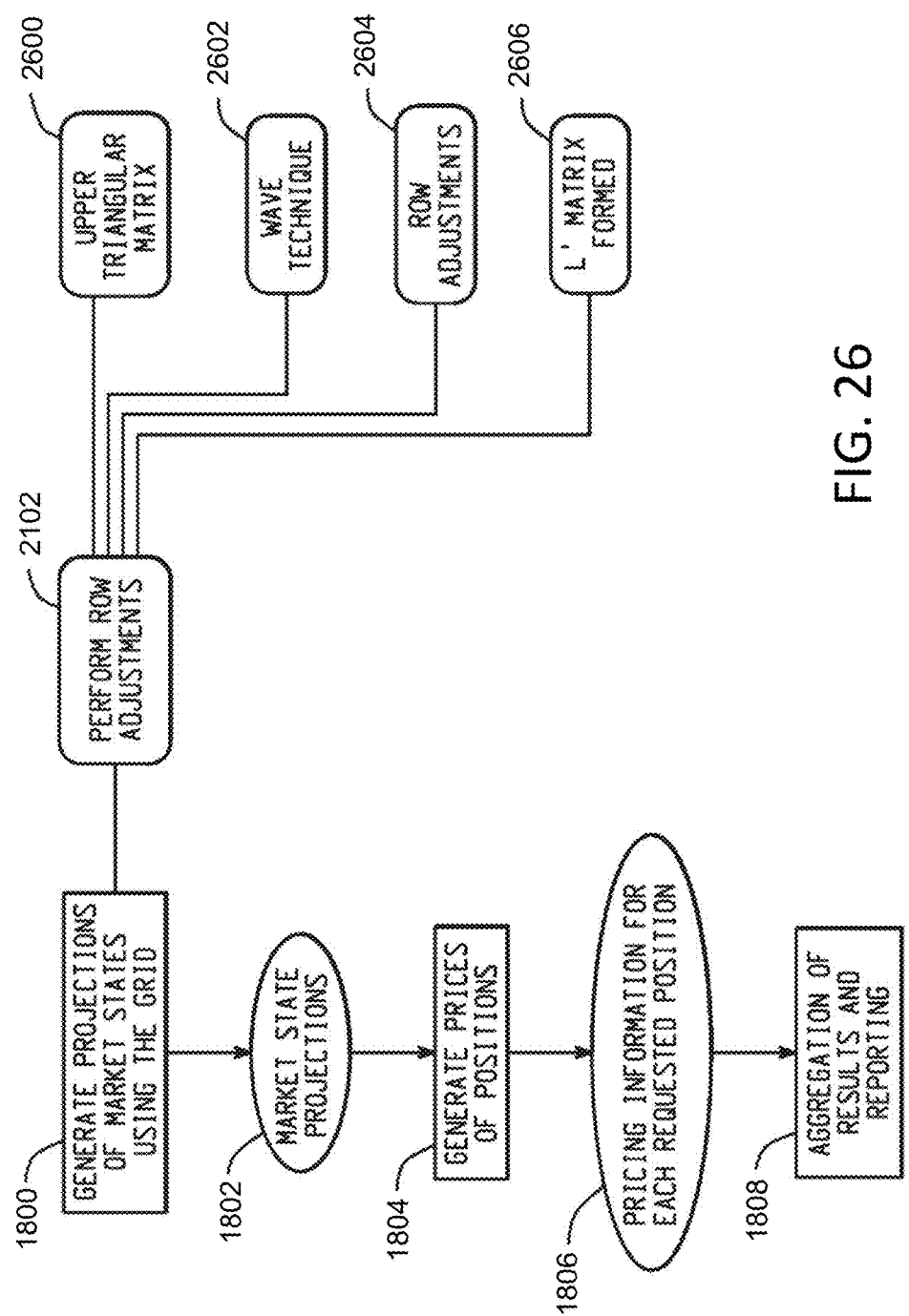
FIG. 26 is a process flow diagram depicting functionality directed to performing row adjustments in order to construct the L' matrix.

FIG. 26 depicts functionality directed to performing at 2102 row adjustments in order to construct the L' matrix 2606. When performing the row adjustments 2604, each row of the upper triangular matrix 2600 is sent to each node coordinator, using the wave technique 2602 that helped distribute the input data and build the X'X matrix described above. The completion of this process results in the formation of the L' matrix 2606.

Figure 27:
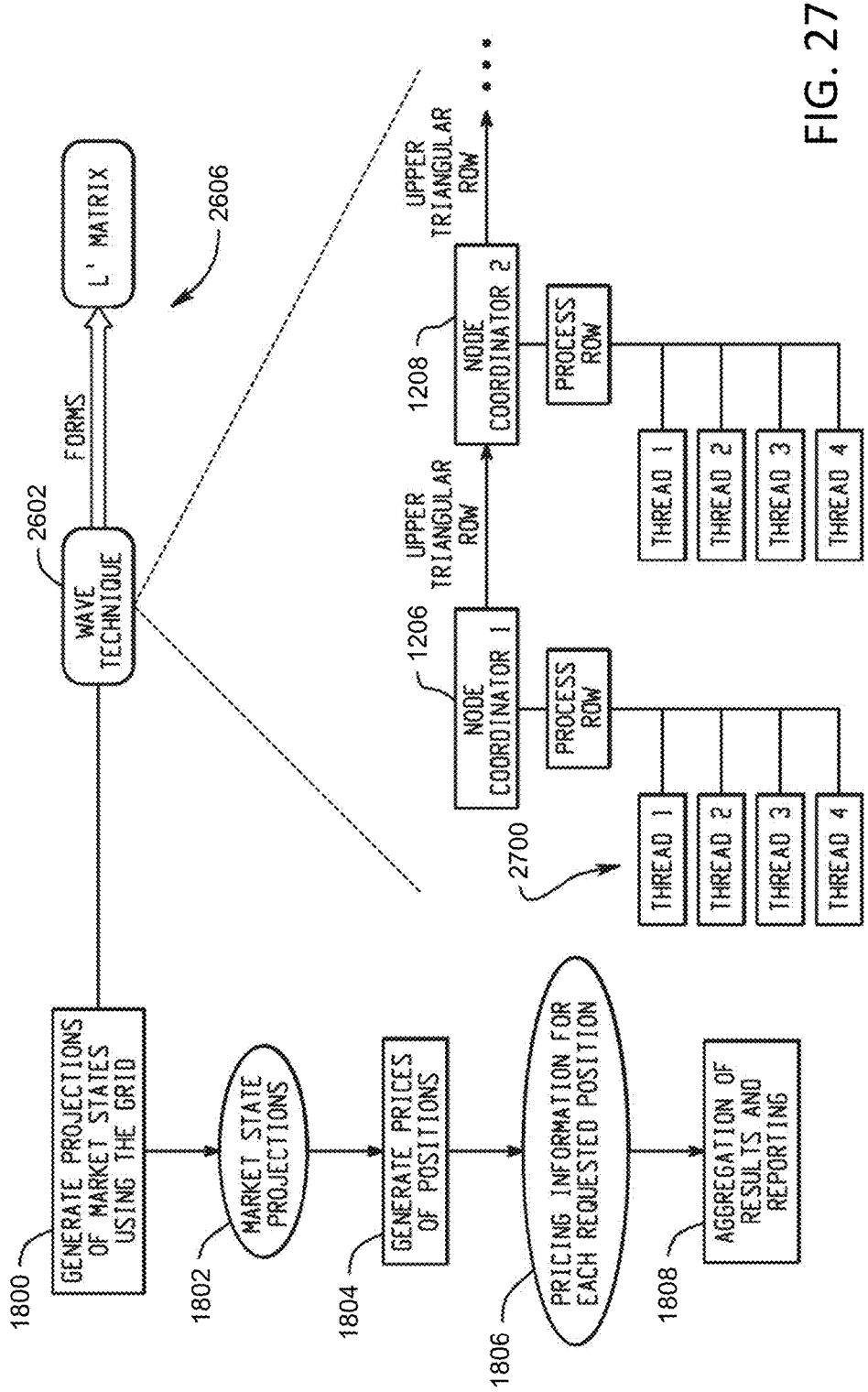
FIG. 27 is a process flow diagram depicting a wave technique.

The wave technique of FIG. 26 is further illustrated in FIG. 27. With reference to FIG. 27, upon receipt of a row, each node coordinator instructs its threads to perform row adjustments to all rows that are greater than the transmitted row. More specifically, the first node coordinator 1206 takes a row and sends it to the second node coordinator 1208, and then the first node coordinator 1206 instructs its threads 2700 to process that row. The second node coordinator 1208 sends the row to the third node coordinator, and then the second node coordinator 1208 processes it.

When a node coordinator finishes processing, it can begin the next iteration of processing. This can occur even if subsequent node coordinators have not completed their first iteration of processing. For example, if node coordinator 3 completes its processing for the first iteration, then node coordinator 3 can begin processing for the second iteration (i.e. the data provided during the second wave) even if a subsequent node coordinator has not completed its processing for the first iteration.

To form the L' matrix using the wave technique, the node coordinators perform a Cholesky decomposition upon the X'X matrix. For this, the grid computing environment uses a forward Doolittle approach. The forward Doolittle approach for forming the Cholesky decomposition results in a decomposition of a symmetric matrix into the product of a lower or upper triangular matrix and its transpose. The forward Doolittle approach is discussed further in: J. H. Goodnight, *A Tutorial On The Sweep Operator*, The American Statistician, vol. 33, no. 3 (August 1979), pp. 149-158. (This document is incorporated herein by reference for all purposes.)

The forward Doolittle approach essentially performs Gaussian elimination without the need to make a copy of the matrix. In other words, the grid computing environment constructs the L' matrix as the grid computing environment goes through the matrix (i.e., as the grid computing environment sweeps the matrix a row at a time). As the node coordinators work on it, they create an inverse matrix. Because of this, storage of the entire matrix is not needed and can be done in place, thereby significantly reducing memory requirements.

For example, the Doolittle approach allows the grid computing environment to start at a row and adjust all rows of the node coordinators below it and the grid computing environment is not required to go back up. For example, if the grid computing environment were on row three, then the grid computing environment never needs to go back up to rows one and two of the matrix. Whereas if it were a full sweep, the grid would have to go back to earlier rows in order to make the proper adjustments for the current row. This allows the grid to send out a row that is being operated upon by other nodes, and when a node coordinator receives that row to work on, the node coordinator already has everything that it needs to make the adjustment to that portion of the row. Accordingly, the grid computing environment can do this very efficiently by only having to go through the matrix twice to form the L' matrix. Additionally, each node coordinator is given approximately the same amount of work to do. This prevents bottlenecks from arising if a node coordinator takes longer to complete its task.

Upon completion of the row adjustments by the threads of all of the node coordinators, the X'X matrix will have been adjusted for all rows and is now an L' matrix distributed among the node coordinators.

Figure 28:
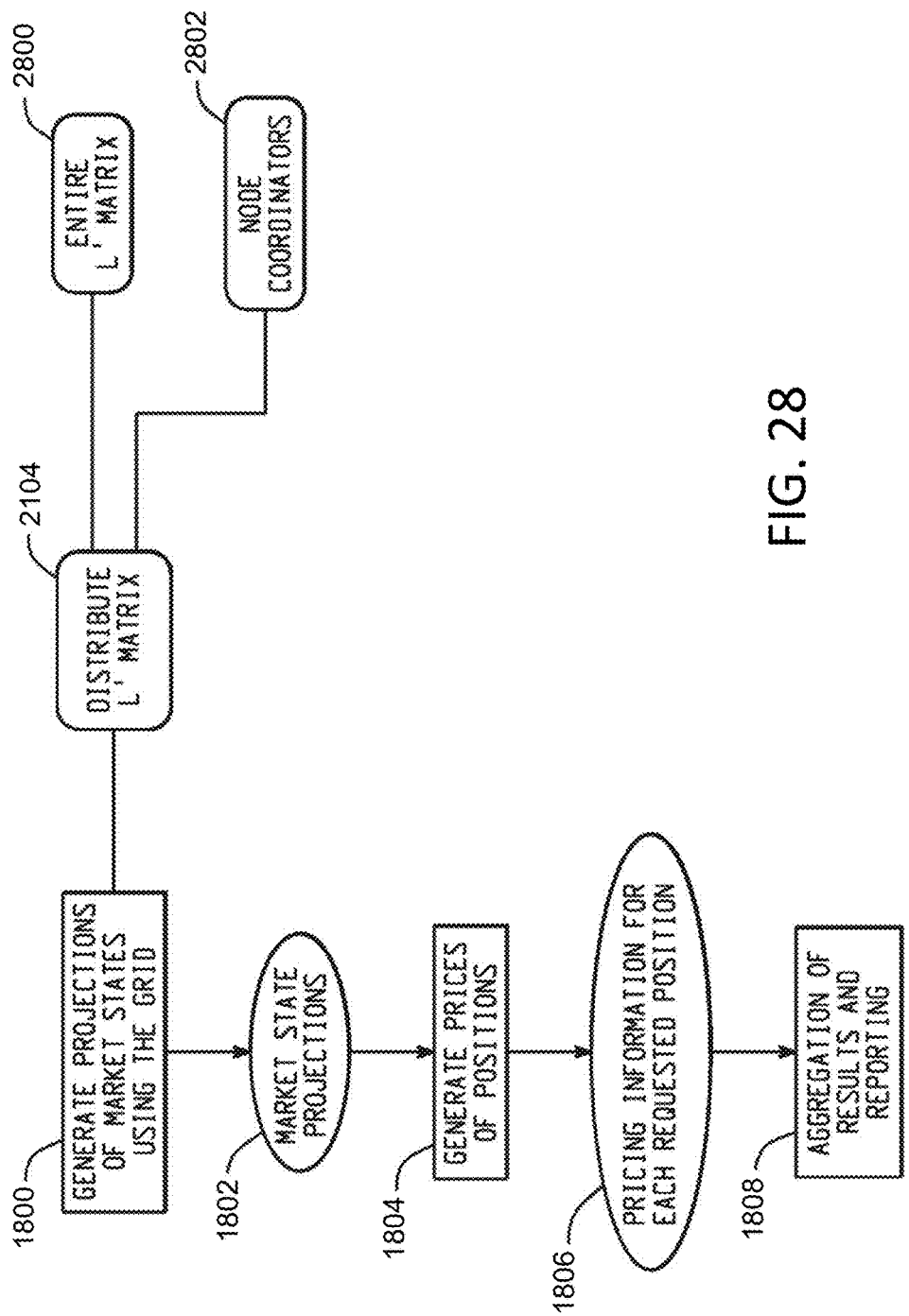
FIG. 28 is a process flow diagram depicting node coordinators being provided with the L' matrix.

To complete the state projection calculations, the node coordinators are provided with the entire L' matrix as illustrated at 2800 in FIG. 28. To accomplish this, each node coordinator 2802 sends its portion of the L' matrix to all other node coordinators. Another approach is to have a node coordinator report its portion directly to the central coordinator so that the central coordinator can assemble all of the node coordinators' results and then distribute the entire matrix to all of the node coordinators. At the end of this processing, each node coordinator has a full copy of the L' matrix.

While other approaches can be used (e.g., another approach is to generate the state projections using the distributed L'), the approach to provide the entire L' matrix to the node coordinators is used because the generated L' matrix contains a significant number of zeros. Because of this, a subset of L' is formed, which is, in this example, a 500×40,000 matrix that is distributed to the node coordinators. Additionally, an advantage of each node coordinator having the L' matrix is that the subsequent state projections can be calculated more quickly because this obviates the requirement for a node coordinator to have to fetch additional rows of information when calculating states. Because each node coordinator is no longer storing just its portion of the L' matrix, a reconfiguration of the node's memory is done to transition from the storage of only a node coordinator's specific portion of the L' matrix to storing the entire L' matrix for the 500×40,000 matrix.

Figure 29:
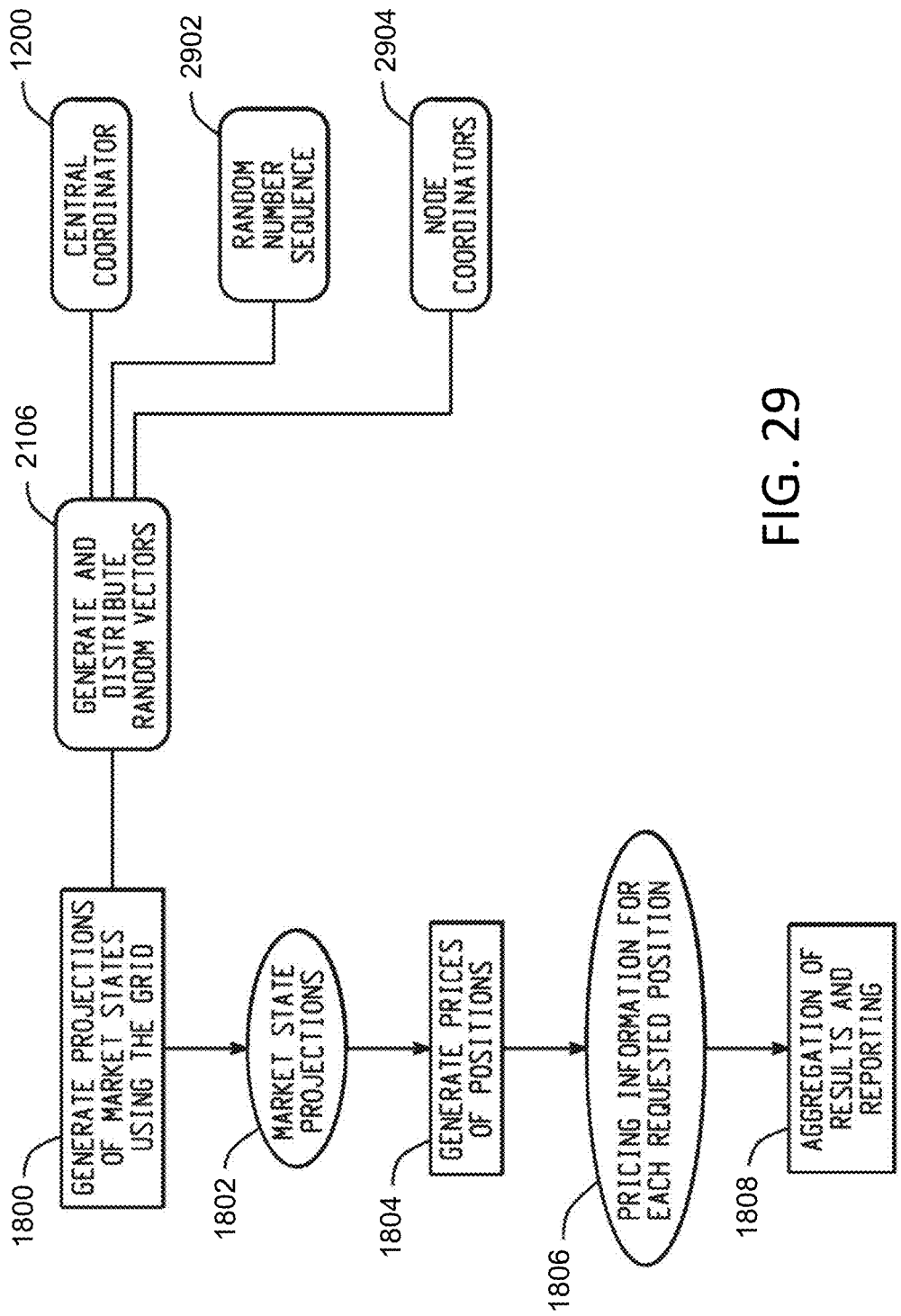
FIG. 29 and FIG. 30 are process flow diagrams depicting functionality directed to generating and distributing random vectors to the node coordinators.
Figure 30:
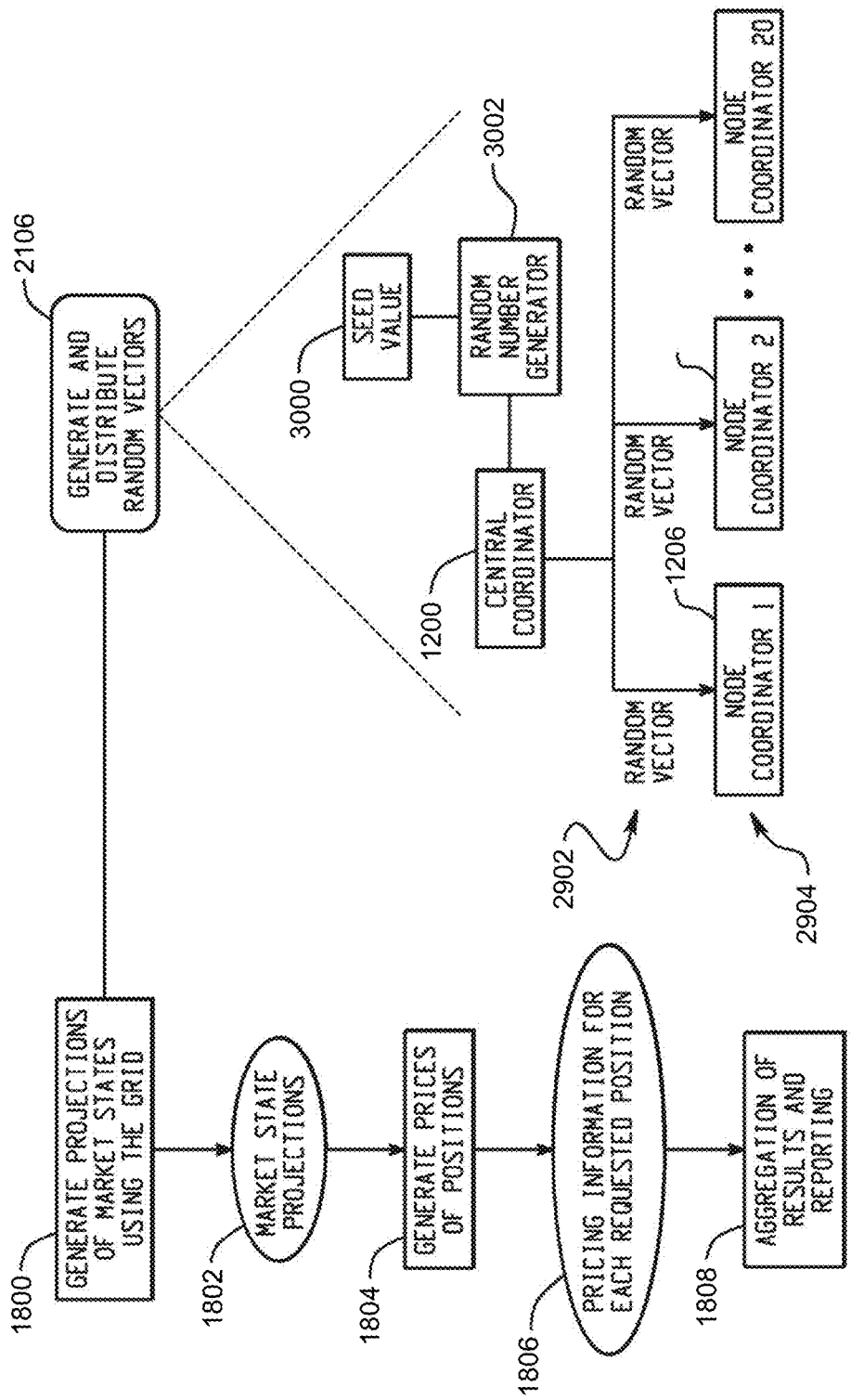

FIG. 29 depicts functionality at 2106 directed to generating and distributing random vectors 2902 to the node coordinators 2904. As shown in FIG. 30, the random vectors 2902 are for use by the node coordinators to perform state simulations. If desired, the central coordinator 1200 generates all of the random numbers 2902 by using a seed value 3000 and a random number generator 3002 and sends each node coordinator 2904 a portion (e.g., a vector) of the generated random numbers 2902.

As an alternative, the grid computing environment could have each node coordinator individually generate the random numbers it needs for its simulation operations. However, this alternate approach may exhibit certain drawbacks. For example, random numbers are typically generated using seeds. If each node coordinator starts with a predictable seed, then a deterministic set of random numbers (e.g., a reproducible sequence) may arise among the node coordinators. For example if the root seed is 1 for a first node coordinator, the root seed is 2 for a second node coordinator, and so forth, then the resulting random numbers of the node coordinators may become deterministic because of the progressive and incremental values of the seeds for the node coordinators.

Because the central coordinator generates and distributes the random numbers for use by the node coordinators, it is ensured that the random numbers utilized by the node coordinators do not change the ultimate results whether the results are generated with two node coordinators or twenty node coordinators. In this approach, the central coordinator uses a single seed to generate all of the random numbers that will be used by the node coordinators and will partition the random numbers among the node coordinators.

The grid computing environment can be configured such that while the node coordinators are constructing the L' matrix, the central coordinator is constructing a vector of random numbers for subsequent use by the node coordinators in generating state projections.

Figure 31:
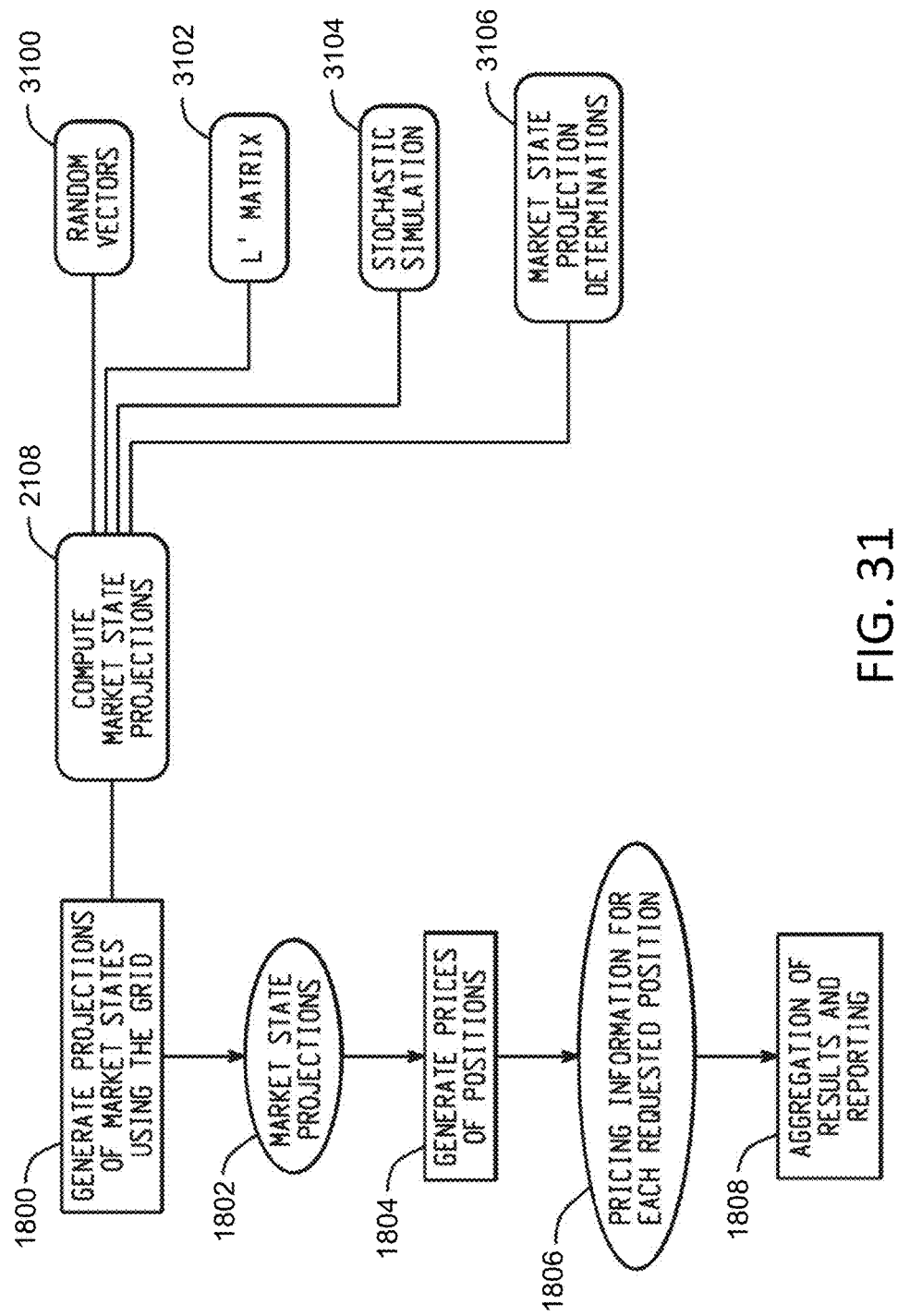
FIG. 31 is a process flow diagram depicting functionality directed to computing state projections based upon the L' matrix.

FIG. 31 depicts functionality at 2108 directed to computing state projections based upon the L' matrix 3102 and stochastic simulation 3104. More specifically, the random vectors 3100 are multiplied by the L' matrix 3102 to produce the state projections at 3106. The work is performed by the threads under each node coordinator. After the state projections are calculated, each node coordinator will have a roughly equal number of system state projections, with each system state containing values for all of the factors from the input data.

More specifically, the state projections are determined by computing a UL' matrix, wherein U is a vector of random numbers. The calculations are repeated K times for K different random vectors, wherein K is selected by the user (e.g., K equals 10,000). A value of 10,000 for K results in 10,000 vectors of size 40,000 each for use in generating state projections. Additionally, the state projections are calculated by adding a base case to UL'. (The large number of state projections can be needed to reach a relatively high degree of confidence.)

With respect to the base case, the state projections generated by a node coordinator are generated from the base case, which in this example, comprise current values of the change factors. For example, in the case of the oil value change factor, the base case can be the current values for oil.

Figure 32:
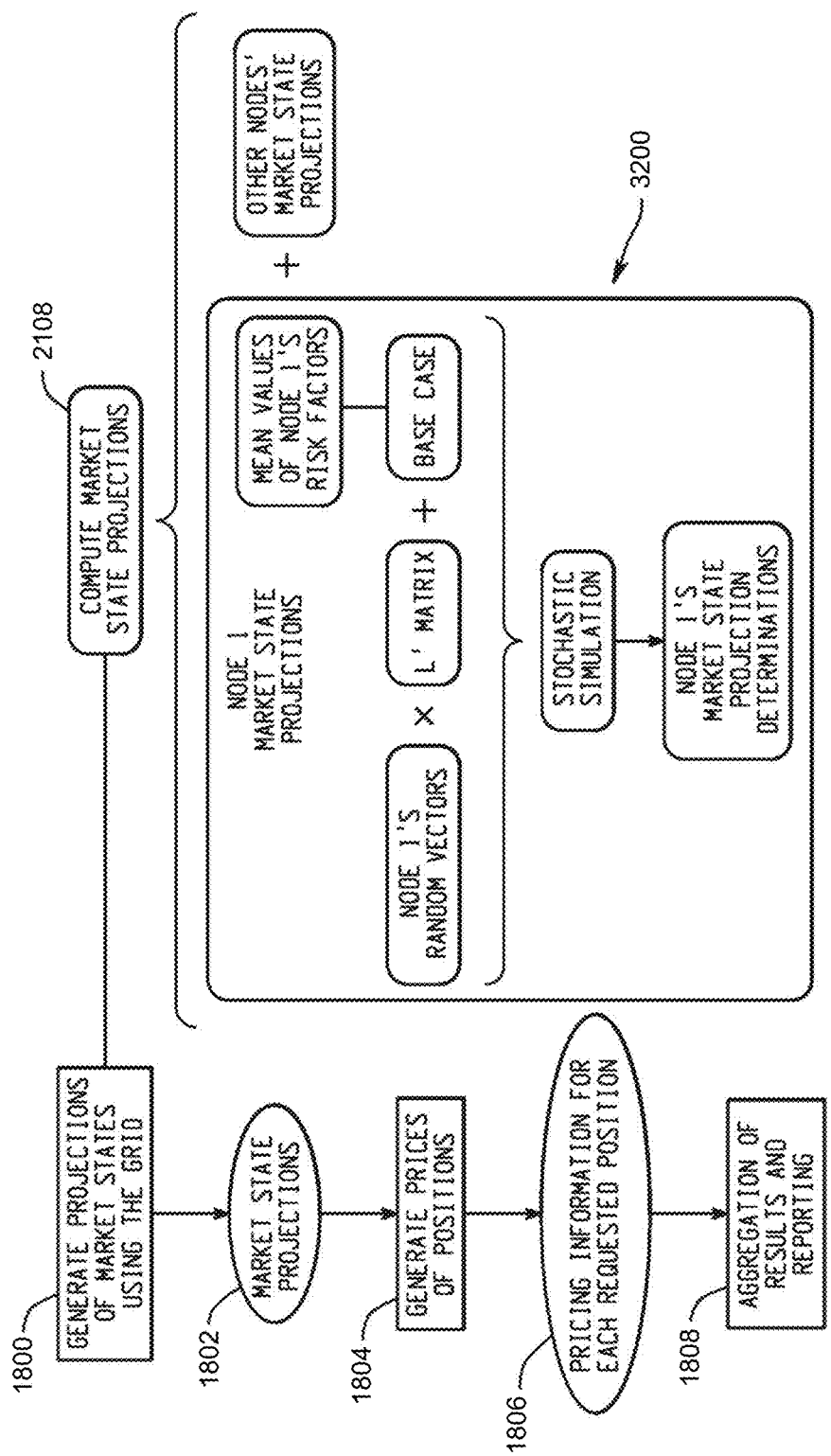
FIG. 32 is a process flow diagram depicting node coordinators generating a subset of the overall request of the state projections.

FIG. 32 depicts at 3200 that with respect to the node coordinators, each node coordinator generates a subset of the overall request of the state projections. For example, if 10,000 state projections are to be generated and there are 100 node coordinators, then each node coordinator will generate 100 state projections for each of the change factors. Each node coordinator knows what state projections it needs to calculate because each node coordinator knows where in the chain of node coordinators it is. More specifically, the node coordinator uses the number of samples in the number of node coordinators to identify which state projections it needs to calculate. This also determines how many random numbers in a vector need to be sent to a node coordinator to compute its portion of the state projections. As an illustration, the grid computing environment takes the overall number of samples and divides by the number of node coordinators and then see how many are extra which are divided as equally as possible among as many node coordinators are needed to handle the extra data items. This can help assure that each node coordinator is doing approximately the same amount of state projections as any other. In this situation, the node coordinators differ only by at most one additional state projection.

Figure 33:
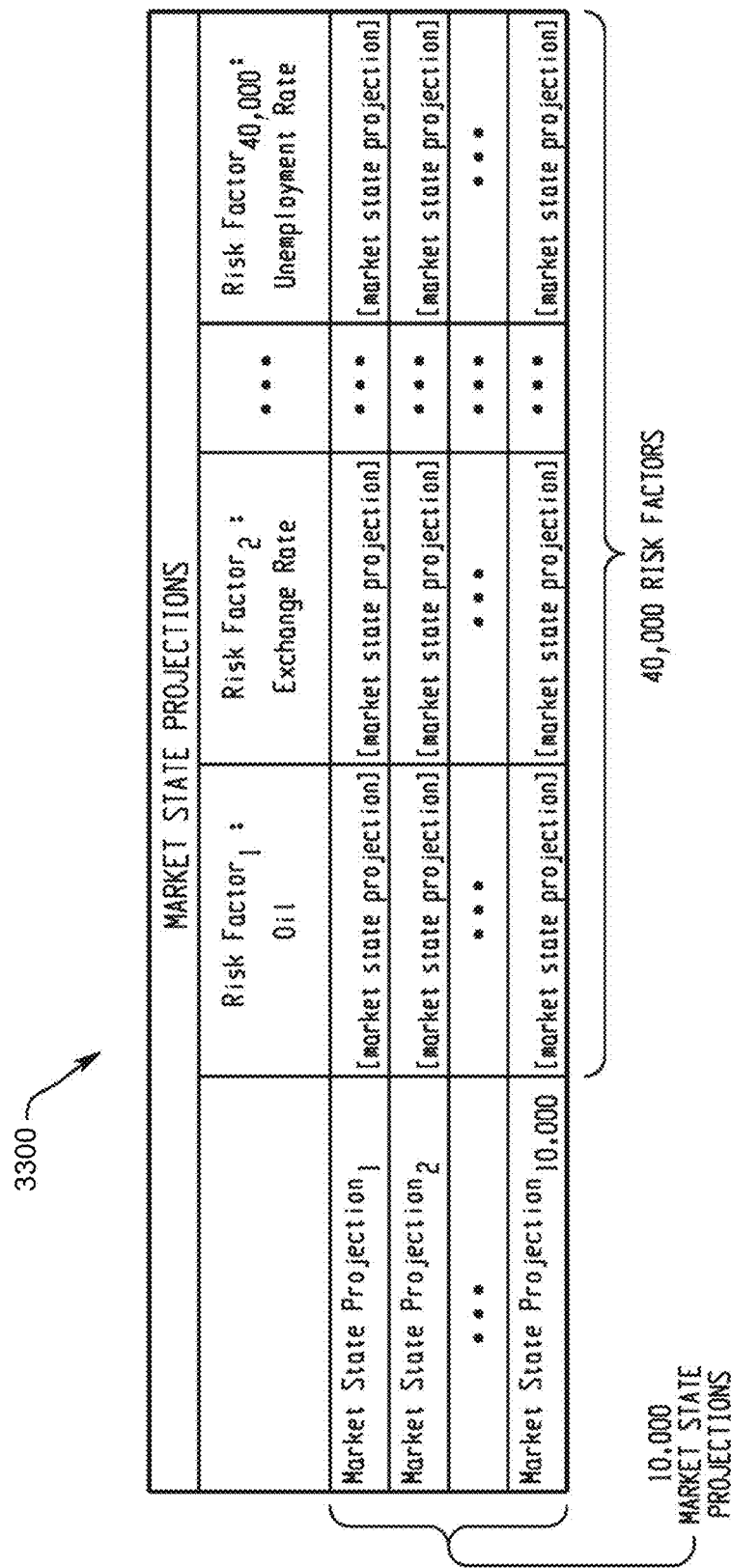
FIG. 33 depicts an example of state projection results.

FIG. 33 depicts at 3300 an example of state projection results. The results illustrate that the grid computing environment has computed 10,000 state projections for each of the 40,000 change factors.

Figure 34:
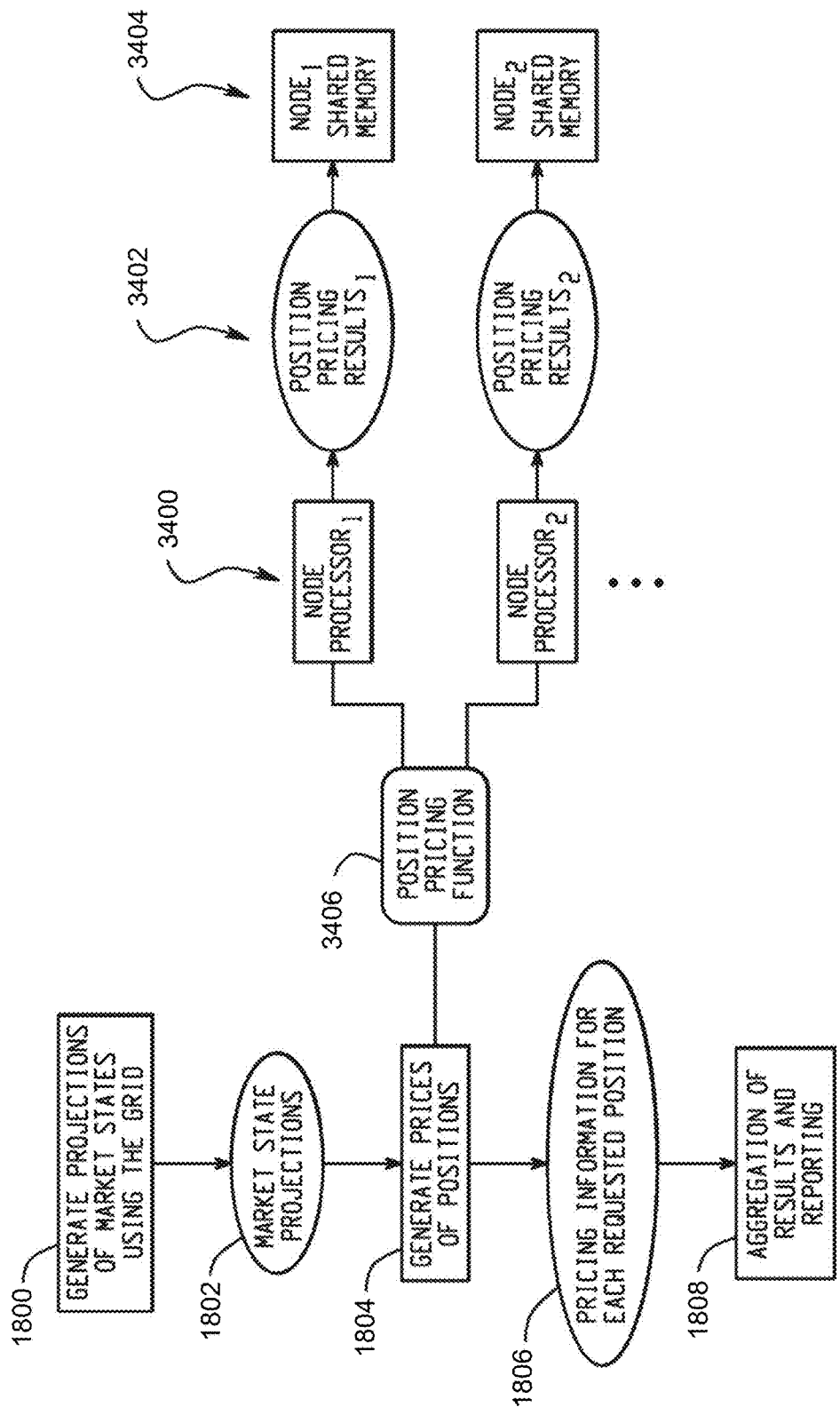
FIG. 34 is a process flow diagram depicting node processors using the state projections to generate position evaluation results.
Figure 35:
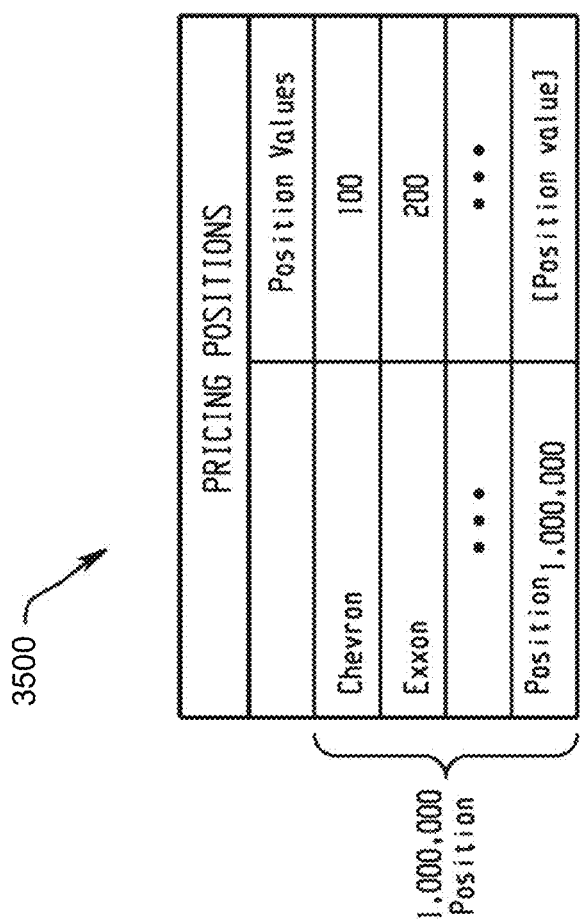
FIG. 35 depicts input position data.

FIG. 34 depicts node processors 3400 using the state projections to generate though function 3406 position evaluation results 3402 which are stored in their respective shared memories. As input data to the scenario analysis generation function, a user provides positions information under which the analysis is to be conducted. For example, positions information for a scenario analysis can include position values for different vehicles to be evaluated. As illustrated at 3500 in FIG. 35, the number of positions to be analyzed can be quite large (e.g., 1,000,000). Other situations may reach 1,000,000,000 positions to be analyzed.

Figure 36:
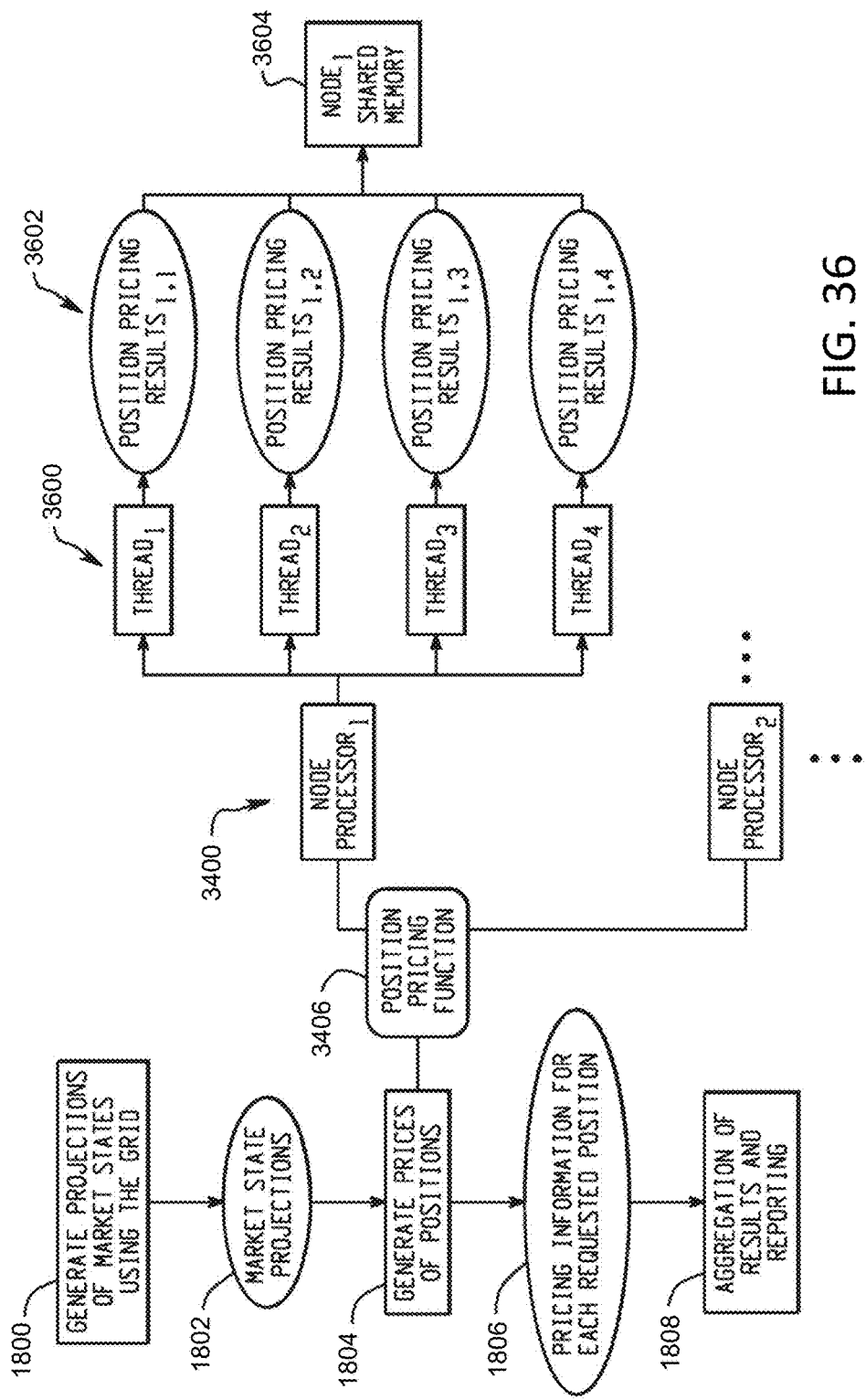
FIG. 36 is a process flow diagram depicting threads generating different position evaluation results.

To help expedite processing of the positions, each thread of a node is assigned a particular portion of the problem to solve. As an illustration, FIG. 36 depicts at 3600 threads 1-4 generating different position evaluation results 3602 for storage in the shared memory 3604 of node 1. An operational scenario can include thread 1 of node 1 being assigned to use a certain subset of state projections to calculate values for all positions, thread 2 of node 1 being assigned to use a different subset of state projections to calculate values for all positions, etc.

Figure 37:
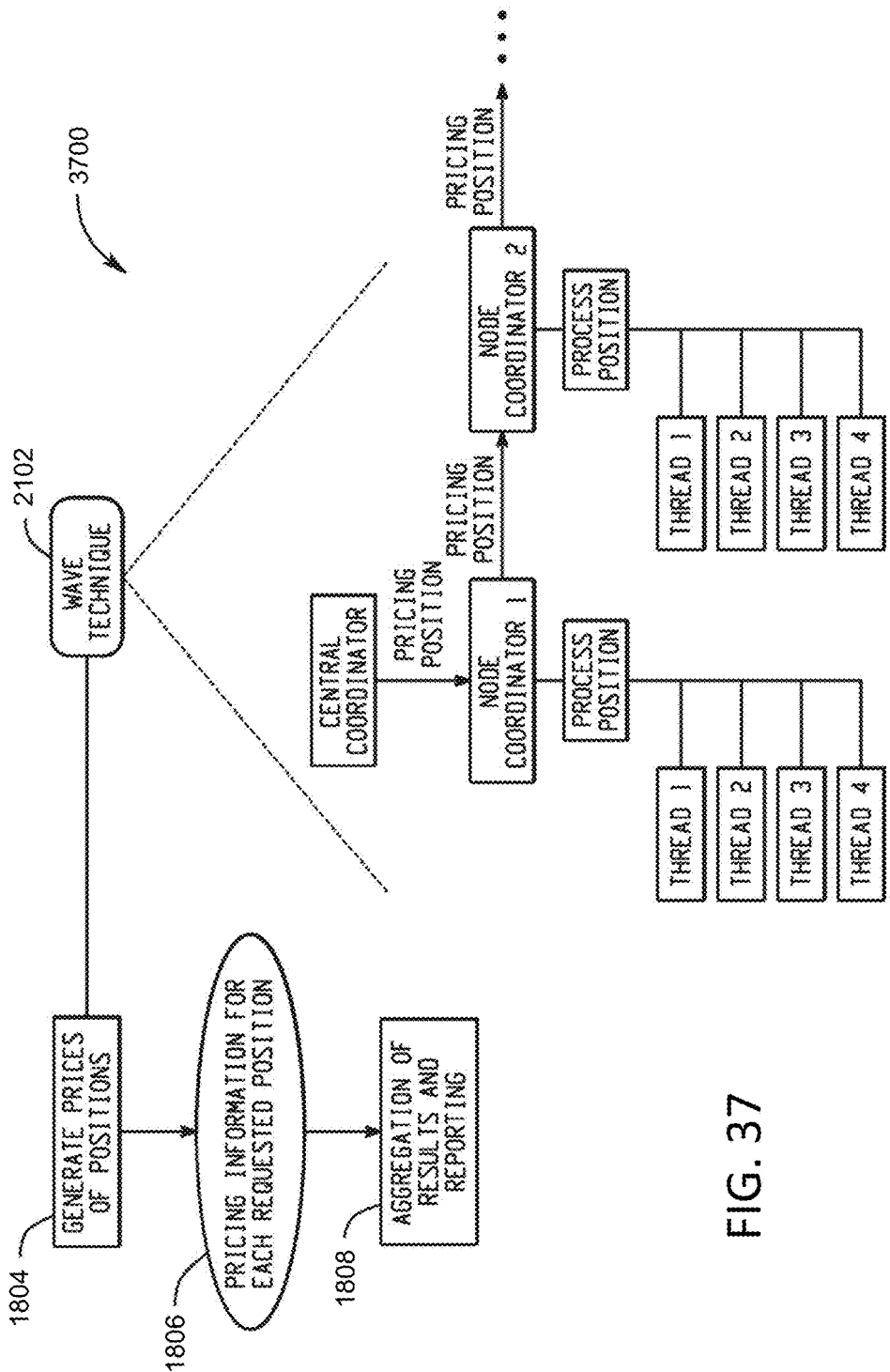
FIG. 37 is a process flow diagram depicting a mechanism for distributing positions provided by a user to the nodes.

FIG. 37 illustrates at 3700 a mechanism for distributing the positions provided by a user to the nodes. Similar to the wave technique described above, the central coordinator sends position information to node coordinator 1, which then sends the position information to node coordinator 2, then node coordinator 2 sends the position information to node coordinator 3, etc. Each node coordinator instructs its threads to call evaluation functions for the state projections that are associated with a node coordinator. After a node coordinator receives a position and then sends it on to the next node coordinator, the node coordinator generates evaluations based upon which state projections it has.

Figure 38:
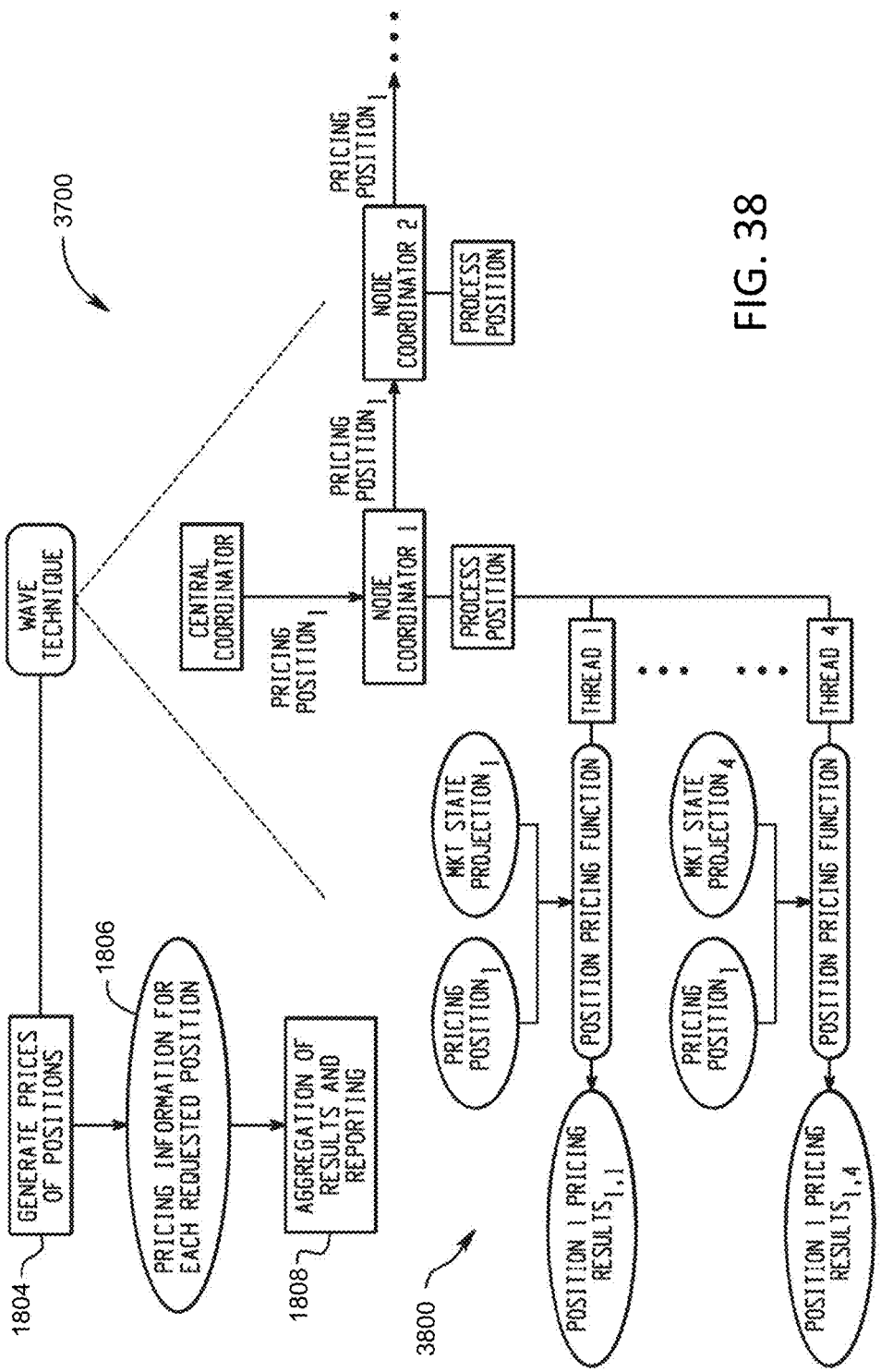
FIG. 38 is a process flow diagram depicting a first position being distributed among the node coordinators.

In FIG. 38, a first position is shown being distributed among the node coordinators. The positions are processed, such that each thread of a node coordinator applies a different state projection to the first position than another thread. For example, FIG. 38 depicts at 3800 thread 1 of node 1 applying a position evaluation function to the first state projection and the first position to generate its evaluation results. Concurrently, thread 4 of node 1 is applying a position evaluation function to the fourth state projection and the first position to generate its evaluation results.

With respect to evaluation functions, a client may provide in the position data for each type of instrument (e.g., a vehicle) which evaluation function should be used. For example, an evaluation entity can indicate how much a vehicle unit of Entity A will be worth if the grid computing environment can provide information about the state projections. Many different types of evaluation functions can be used, such as those provided by FINCAD®. FINCAD® (which is located in Surrey, B.C., Canada) provides an analytics suite containing functions for evaluation and measuring the possible change of various vehicles.

The grid computing environment can be configured to map the stored change factors to the evaluation functions so that the evaluation functions can execute. If needed, the grid computing environment can mathematically manipulate any data before it is provided as a parameter to an evaluation function. In this way, the grid computing environment acts as the "glue" between the change factors of the grid computing environment and the specific parameters of the evaluation functions. For example, an evaluation function may be called for a particular vehicle and calculates values of positions based upon a set of parameters (e.g., parameters "a," "b," and "c"). The grid's change factors are directly or indirectly mapped to the parameters of the evaluation function. A system change factor may map directly to parameter "a," while a different system change factor may need to be mathematically manipulated before it can be mapped to parameter "b" of the evaluation function.

The number of calls by the node coordinator to the evaluation function may be quite large. For example, suppose there are 1,000,000 positions and 10,000 state projections. The overall number of evaluation calls by the node coordinators will be 1,000,000 times 10,000 calls (i.e., 10,000,000,000).

An evaluation function can provide many different types of outputs. For example, an evaluation function can provide an array of output values and the grid computing environment can select which of the outputs is most relevant to a user's question. The output values can include for a vehicle evaluation-related function what is the value of my vehicle, what is the exposure of my vehicle, etc.

Figure 39:
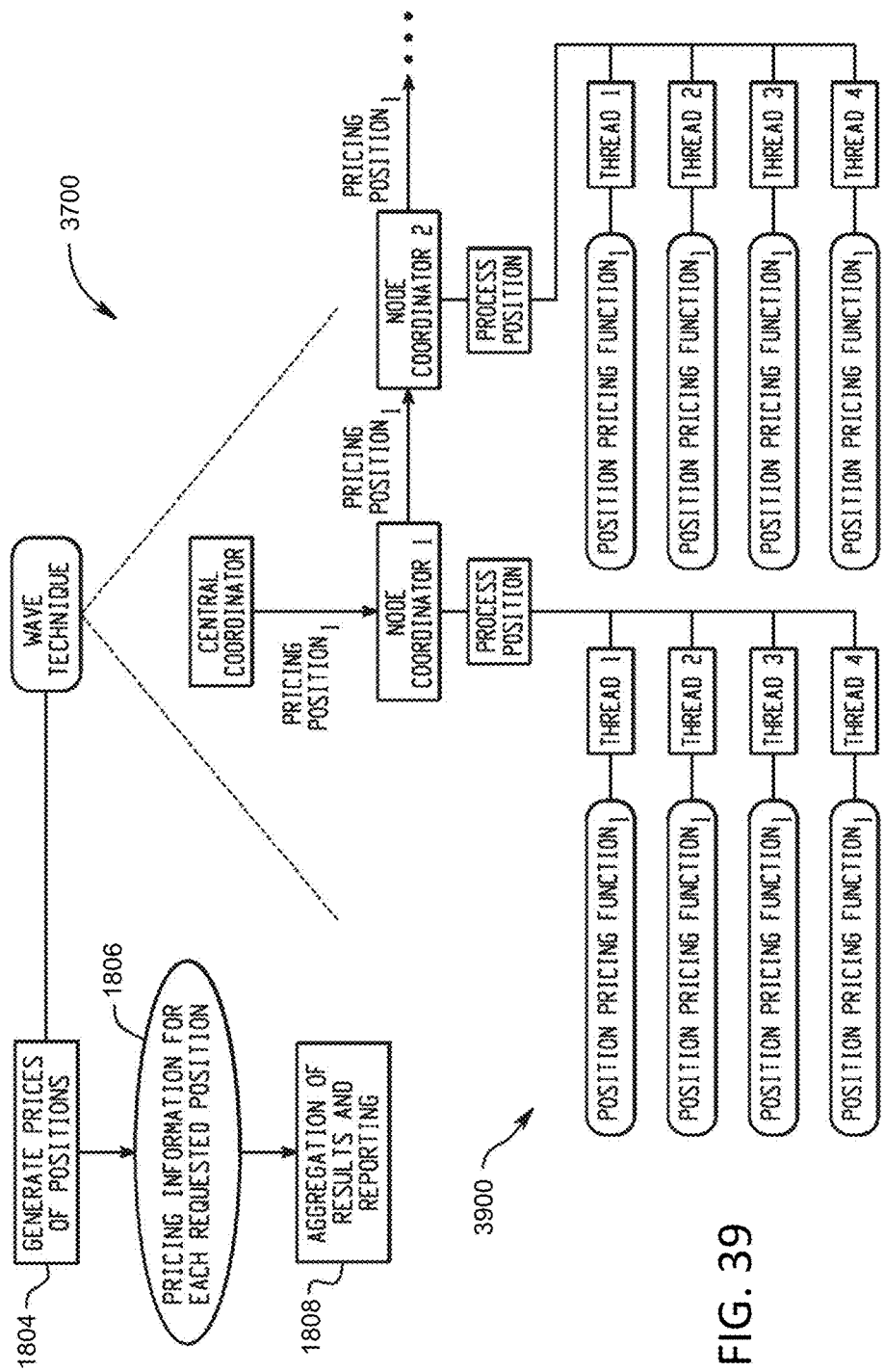
FIG. 39, FIG. 40, and FIG. 41 are process flow diagrams depicting evaluation functions being used by the nodes.
Figure 40:
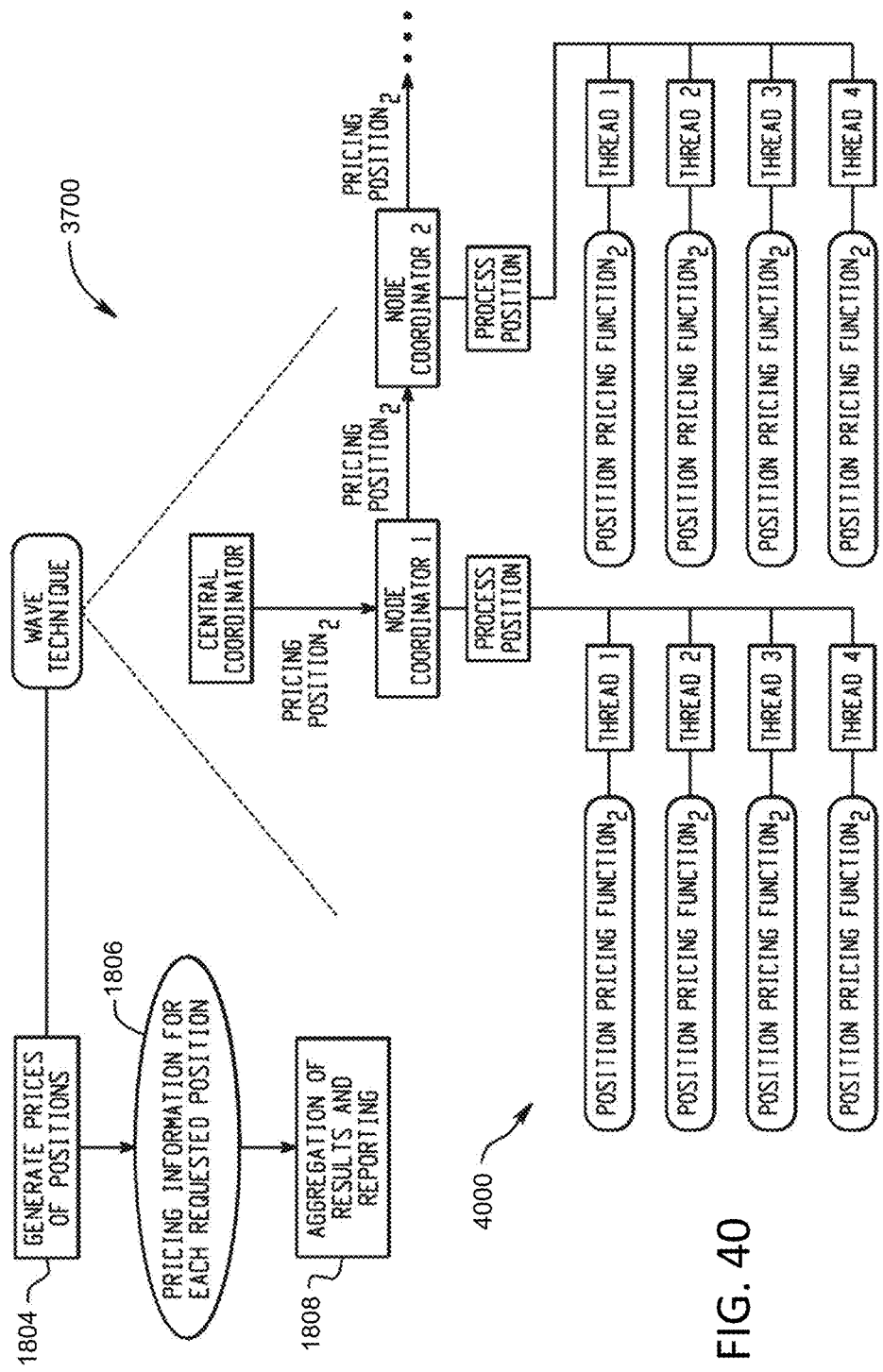
Figure 41:
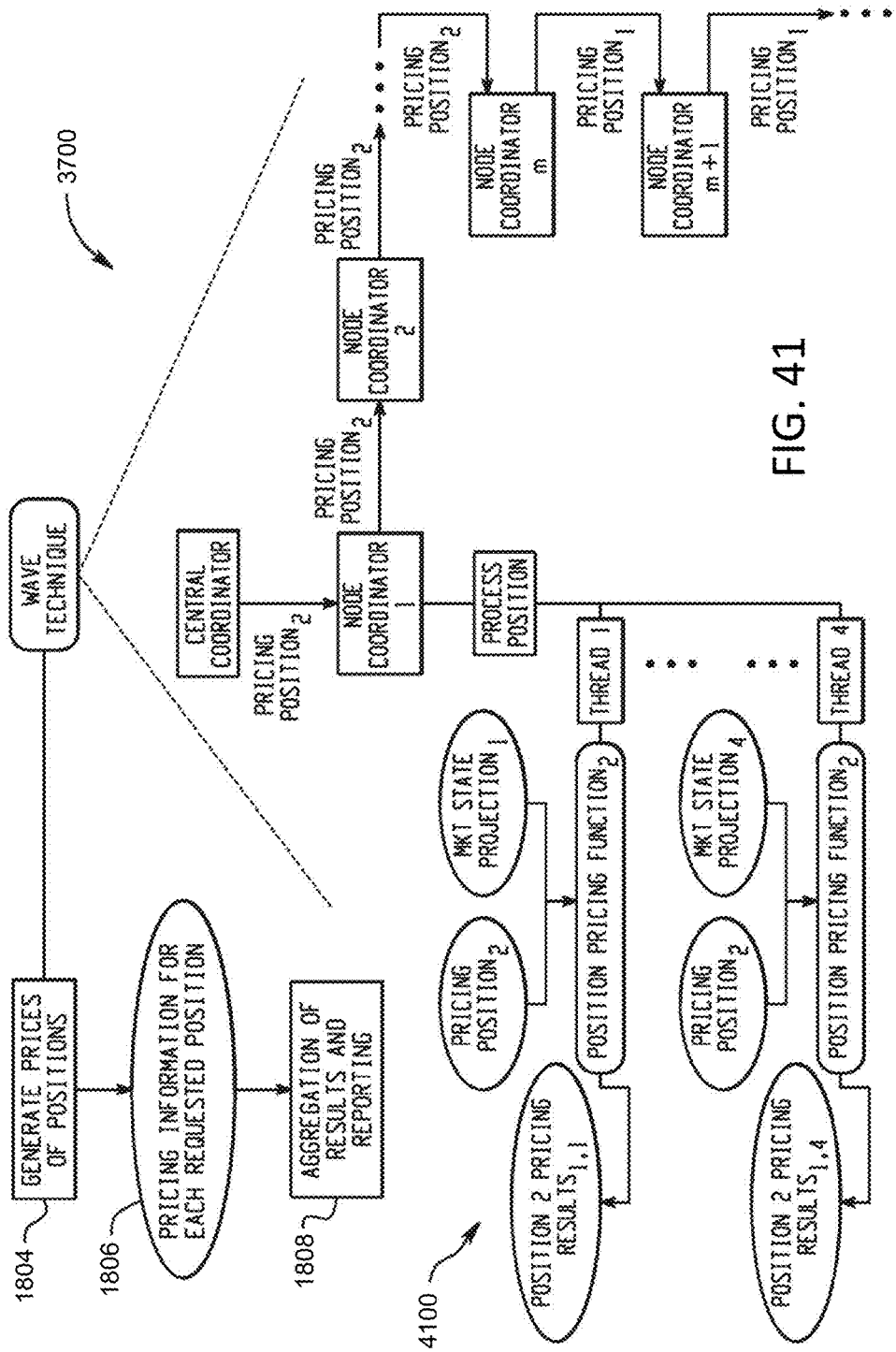
Figure 43B:
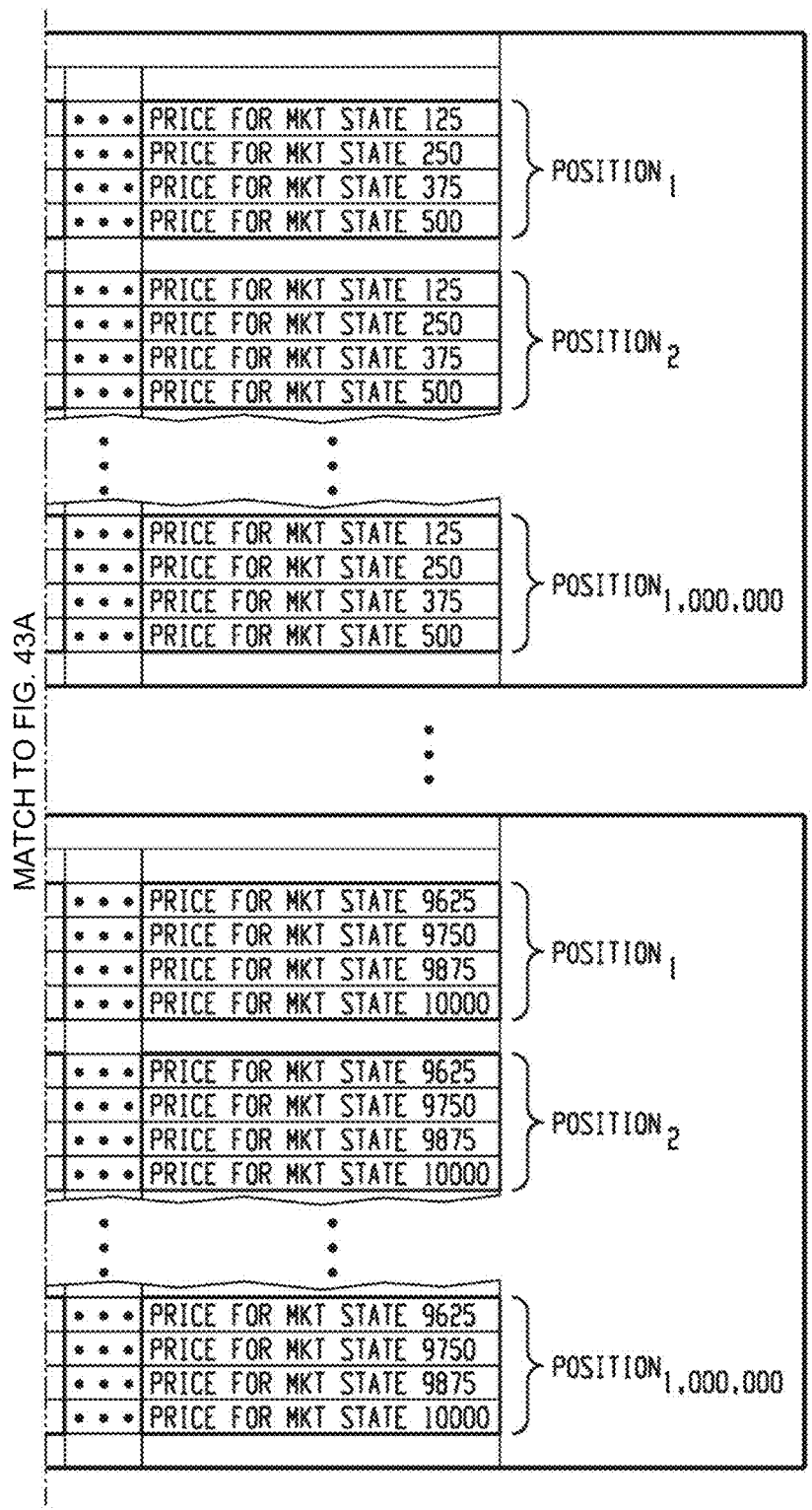

FIGS. 39 and 40 illustrate that different evaluation functions can be used by the nodes depending upon the position the threads of the nodes are processing. As depicted at 3900, FIG. 39 shows that a first evaluation function is used by the threads of nodes 1 and 2 when processing the first position. FIG. 40 depicts at 4000 that a second (e.g., different) evaluation function is used by the threads of nodes when processing the second position. Although, FIGS. 39 and 40 depict nodes 1 and 2 processing the same positions, it should be understood that one or more nodes may be processing different positions than the positions that other nodes are currently processing. Such a situation is illustrated at 4100 in FIG. 41, wherein because of the position distribution technique, one or more nodes may be processing a position, while nodes earlier in the chain are processing positions that have just been provided to the first node by the central coordinator. As shown in FIG. 31, the central coordinator has provided the second position to the first node. However, the first position is still being processed by nodes further down the chain (i.e., nodes m, m+1, etc.). Accordingly, the threads of node 1 will be applying the second evaluation function because it is processing the second position, while the threads of node m will be applying the first evaluation function because it is still processing the first position.

FIG. 42 depicts at 4200 an example of position evaluation results. As shown in this figure, Entity A vehicle is at 29 per vehicle units as a value for a position in the first state projection, 36 per vehicle unit in the second projection, . . . , and valued at 14 per vehicle unit for the last state projection. In other words these are possible values for all of the possible states.

Each node coordinator maintains all of its evaluation information results in its memory and optionally writes to a file in case a different user would like to access the results. Upon request by the central coordinator, each node coordinator sends its evaluation information to the central coordinator for further processing. An example of node coordinators storing the evaluation results are shown at 4300 in FIGS. 43A and 43B. As illustrated in this figure, the position evaluation results are distributed among the various node coordinators. More specifically, each node coordinator contains position evaluation results for all positions and for the state projections for which it is responsible. In this example, there are 10,000 state projections and 20 nodes having 4 threads per node. Accordingly, each node is responsible for 500 state projections (i.e., (10,000 total state projections)/(20 nodes)). With this apportionment, node coordinator 1 is responsible for the first 500 of the 10,000 total states projections, node coordinator 2 is responsible for the next 500 state projections, etc. Within a node, each thread is provided a pro rata share of the state projections (e.g., 125 state projections per thread). This figure illustrates an embodiment where thread 1 (T1) of node coordinator 1 handles the first set of state projections, thread 2 (T2) of node coordinator handles the second set of state projections, etc. It should be understood that other approaches can be used, such as T1 of node coordinator 1 handling the first state projection, T2 of node coordinator 1 handling the second state projection, etc.

Figure 44A:
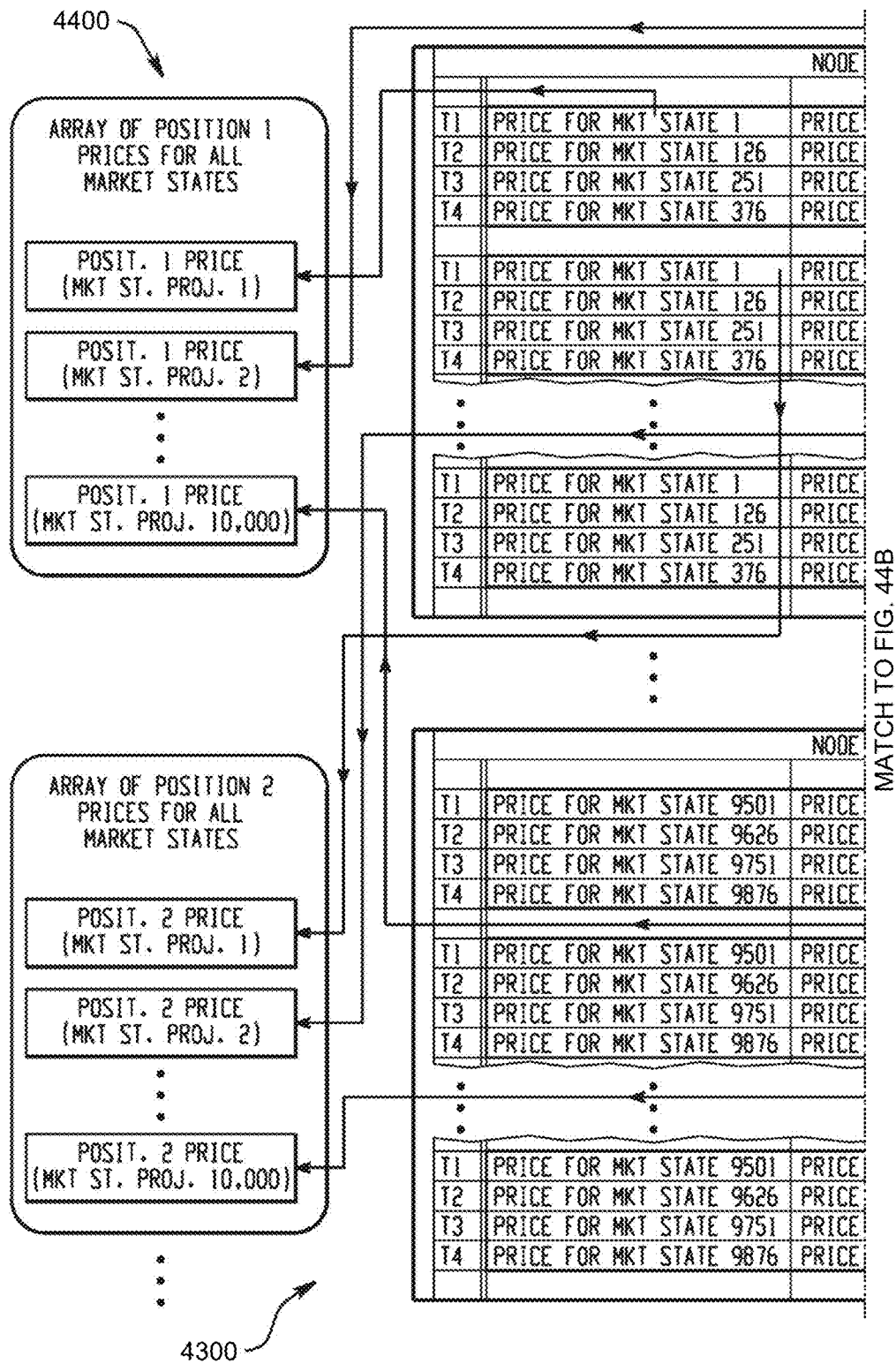
Figure 44B:
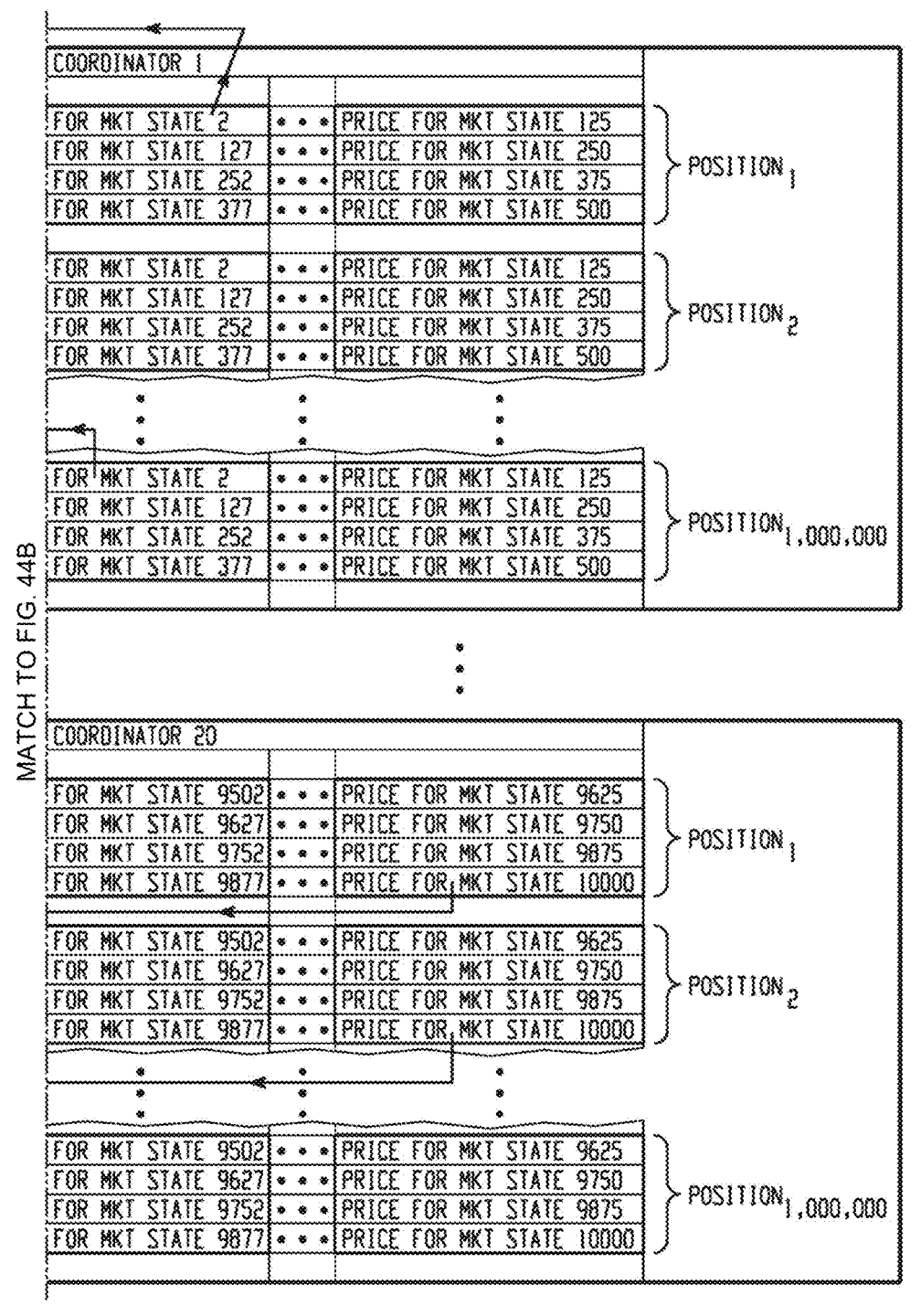

FIGS. 44A and 44B depict at 4400 an example of an array of position evaluation results derived from the data stored at the node coordinators. This array of information is what will be aggregated by the central coordinator when it responds to a user's query.

This figure also illustrates the degree to which memory reconfiguration occurs at the node coordinators from when they generate the X'X matrix, the L' matrix, the state projections, and the position evaluation results. The node coordinators change their node memory layouts as they generate each of the aforementioned data. Upon the final reconfiguration of the memory by each node coordinator, the user can then query (indirectly through the central coordinator) against the position evaluation results which are stored at the node coordinators.

Figure 45:
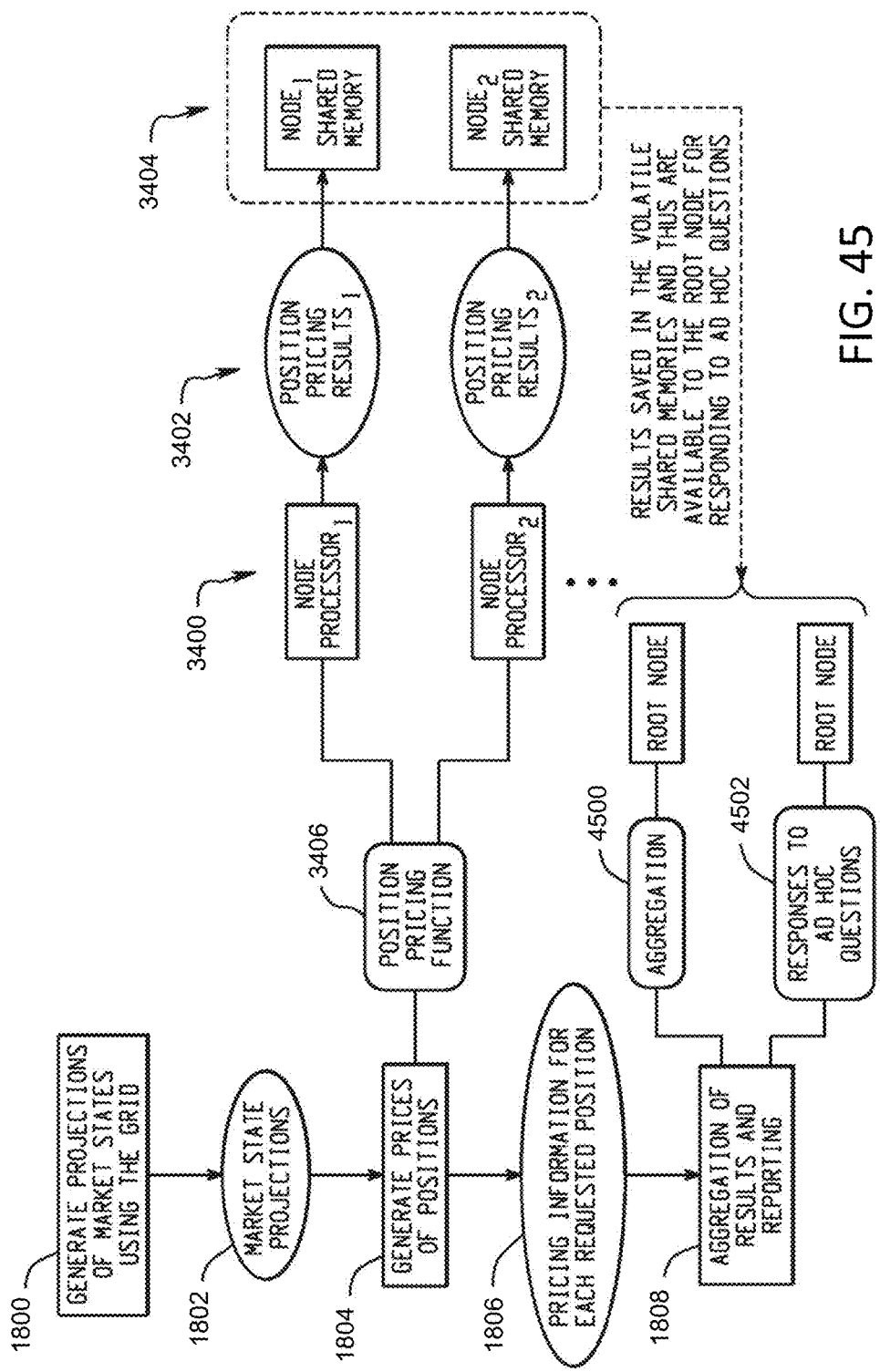
FIG. 45 is a process flow diagram depicting the information at the node coordinators being retained in memory throughout the multiple steps to the extent that it is needed to provide answers at different levels to the user.

As illustrated in FIG. 45, the information at the node coordinators is retained in memory 3404 throughout the multiple steps to the extent that it is by the root node for aggregation 4500 in order to provide answers 4502 at different levels to the user. For example, as soon as the grid computing environment has completed calculating the state projections, the previous intermediate results do not need to be retained in memory because they are not needed to handle a user's ad hoc queries. As another example, as soon as the Cholesky root is used to generate the states, it is not retained beyond the immediate step and that memory can be freed up and reconfigured.

As noted above, position evaluation results are retained in memory after they are created. The ability to do this entirely within memory without a requirement to writing it to disk can yield advantages within certain contexts. For example, the grid computing environment can be processing sensitive information which may be subject to rules on preserving the confidentiality of the information. Because the sensitive information is only retained within memory, security rules about sensitive data and their storage on nonvolatile storage medium are not implicated. Additionally, the user queries against evaluation information which is stored in memory; after the querying process has completed, the information is removed from volatile memory at the end of the session. Accordingly in this example, information is not stored to disk, thereby eliminating or significantly reducing likelihood of a security breach. However, it should be understood that various other storage approaches can be utilized to suit the situation at hand, such as storing in non-volatile memory position evaluation information for use at a later time. This can be helpful if a user would like to resume a session that had occurred several weeks ago or to allow another user (who has been authorized) to access the position evaluation information.

Figure 46A:
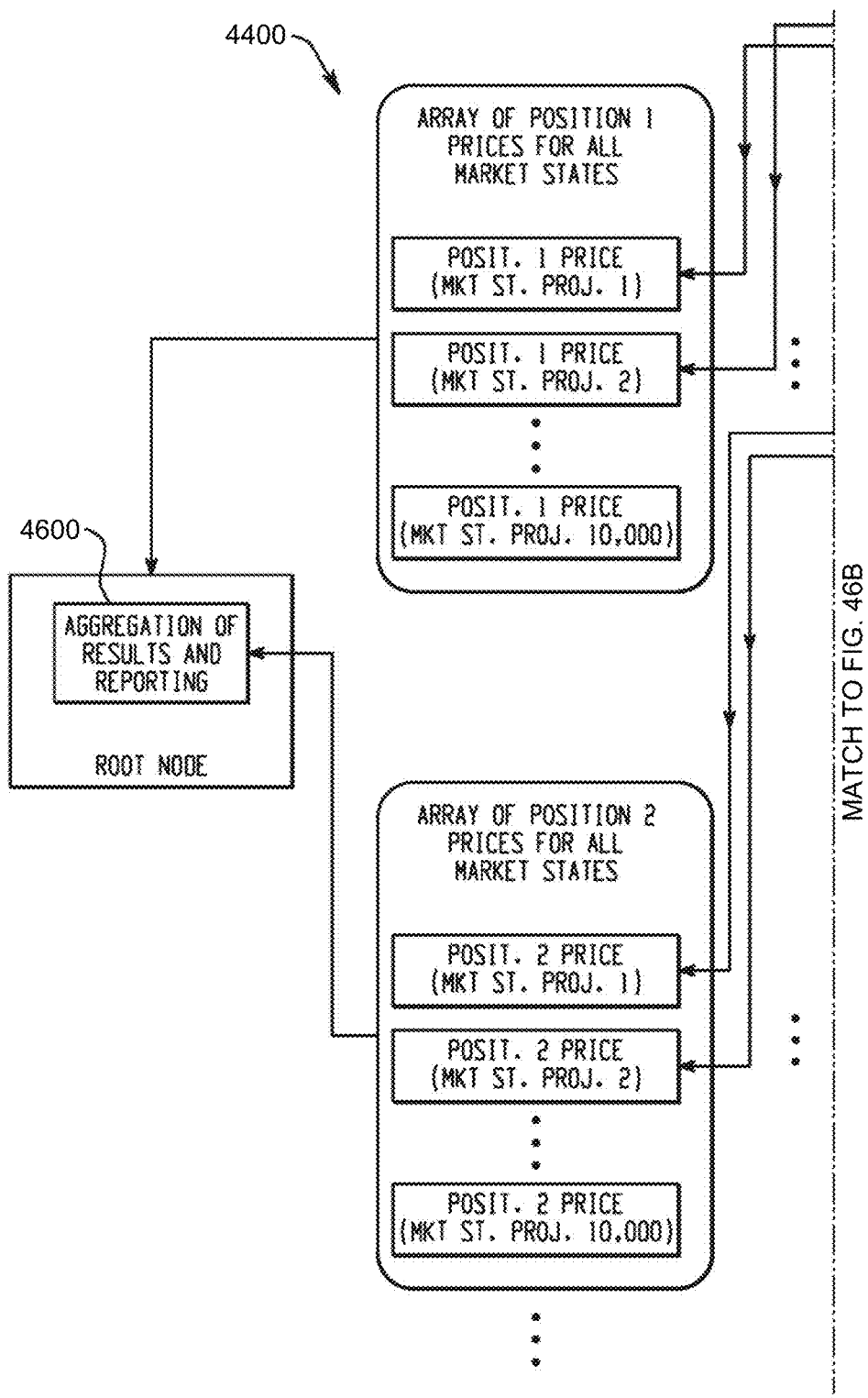
FIG. 46A and FIG. 46B are process flow diagrams depicting functionality directed to aggregating results from the node coordinators and using the results to respond to ad hoc user queries.
Figure 46B:
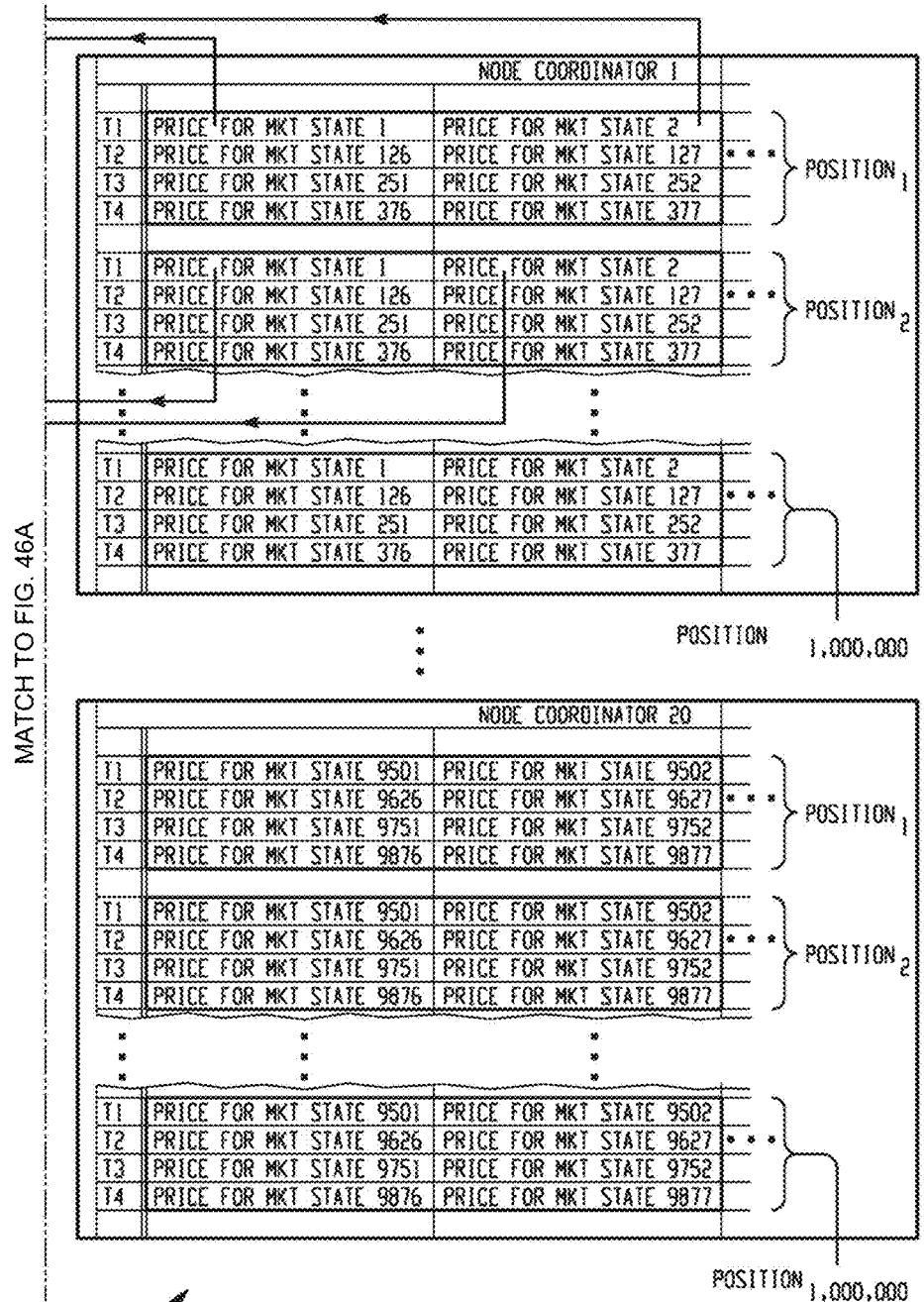

FIGS. 46A and 46B depict at 4600 functionality directed to aggregating results from the node coordinators and using the results to respond to ad hoc user queries. The central coordinator receives the individual position evaluation results from each node coordinator. The central coordinator aggregates the position evaluation results at a level which answers the query from the user. The central coordinator may also perform additional mathematical operations (e.g., descriptive statistical operations) on the aggregated data before forming the query response based upon the processed data. After a query is processed, the central coordinator is ready to receive another user query, and provide a response which is based upon the detailed position evaluation results that are stored at the node coordinators.

Figure 47:
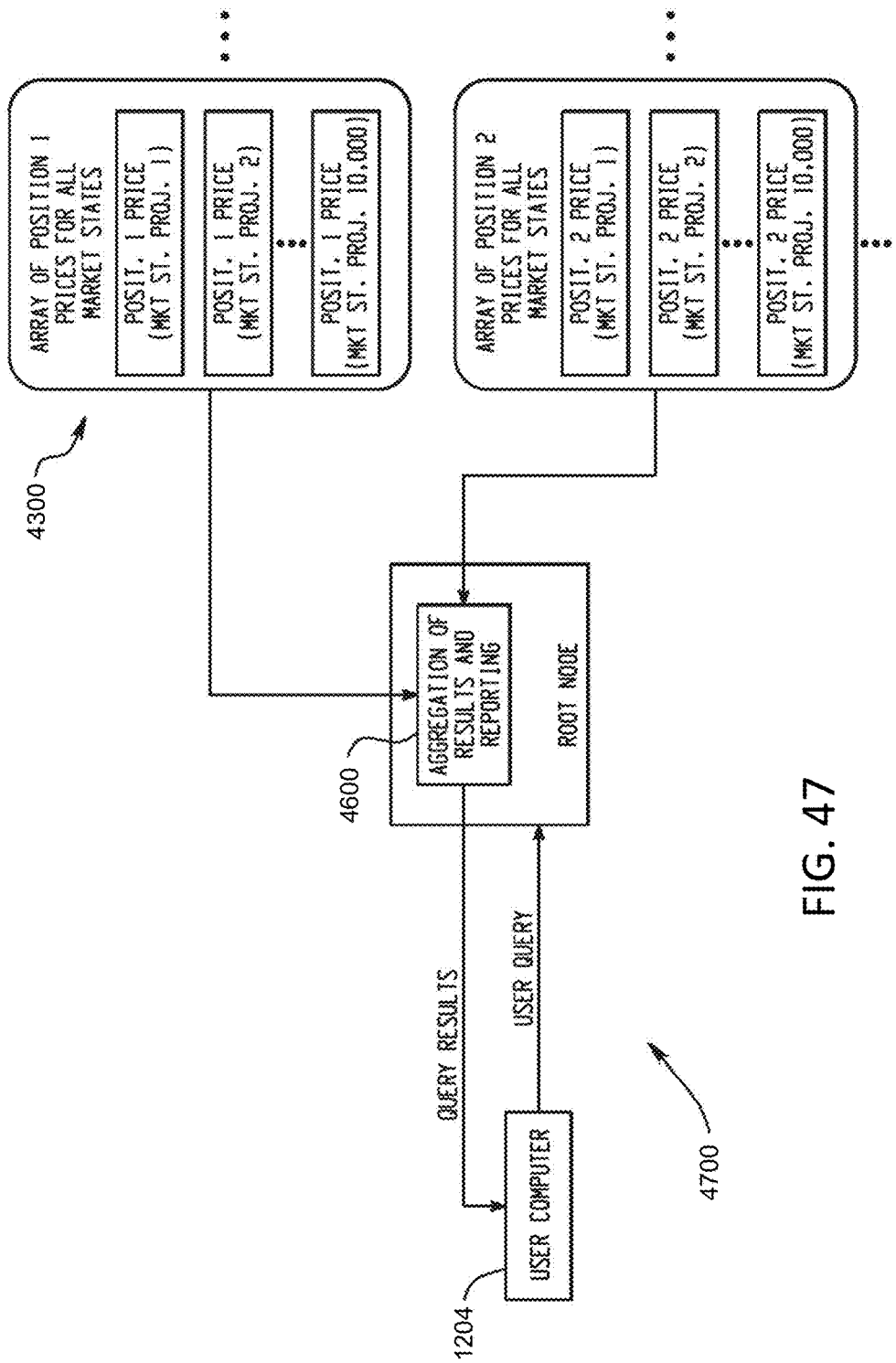
FIG. 47 is a process flow diagram depicting an array of value positions being used by a central coordinator for aggregation of results and reporting purposes.

With respect to the aggregation of results from the node coordinators, FIG. 47 depicts at 4700 how the array of value positions as generated by the node coordinators are used by the central coordinator for aggregation of results and reporting purposes. The central coordinator performs a roll up of the information stored at the various root nodes and if needed, performs any descriptive statistics for responding to a query from a user.

As an illustration, consider a situation wherein all of the node coordinators have Google and Microsoft vehicle information, and the first node coordinator has position information for the first 1000 state projections. The first node coordinator sends its Google and Microsoft position evaluation results for its state projections to the central coordinator for aggregation. Similarly, the other node coordinators send to the central coordinator its Google and Microsoft position evaluation results for their respective state projections. The central coordinator will join these sets to satisfy the user query. (It is noted that each node coordinator (in parallel with the other node coordinators) also performs its own form of aggregation upon the position evaluation information received from its respective threads.) In short, because the underlying originally generated data is continuously stored either in memory or on disk, the central coordinator can answer ad hoc user queries at any level. This obviates the requirement that a grid must know the query before generating the state projections and position evaluation.

The central coordinator can be configured to retain the last query and its results in memory so that if the last query's results are relevant to a subsequent query, then such results can be used to handle that subsequent query. This removes the need to have to retrieve information from the node coordinators to handle the subsequent query. A central coordinator could be configured to discard a query's results if a subsequent query does not map into the most recent query. In this approach, the central coordinator would retrieve position evaluation results from the node coordinators in order to satisfy the most recent query.

The query results sent back to the client can be used in many different ways, such as stored in a database at the client location, displayed on a graphical user interface, processed further for additional analysis, etc.

Figure 48:
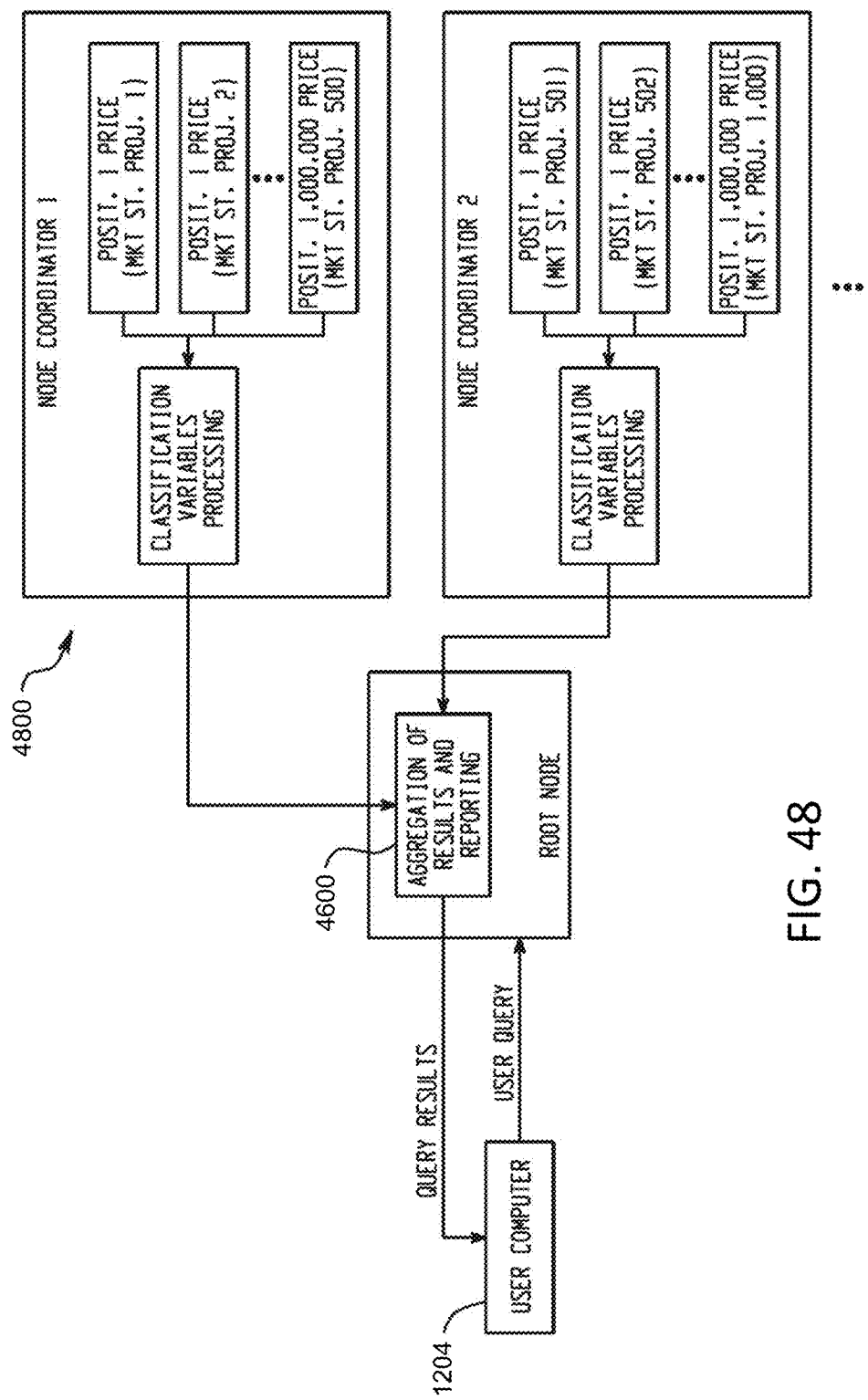
FIG. 48 is a process flow diagram depicting classification variable processing being performed at the node coordinators in order to provide query results to a user computer.

FIG. 48 depicts at 4800 classification variable processing being performed at the node coordinators in order to provide query results to a user computer. As part of the position evaluation information, classification variables are used to identify certain data items that the user might want to query upon (e.g., querying criteria). For example, a classification variable might be geography. Using the geography classification variable, a user can examine position evaluation information at a state level versus a national level. As another example, a classification variable might be industry sector, by which a user might want to examine position evaluation information of the computer industry in general or might want to drill down and examine position information associated with specific companies in the computer industry.

To assist in the classification variable processing, the node coordinators associate levels to the values within their respective position evaluation data. The node coordinators keep track that each position is associated with a particular level of a classification variable. Accordingly during the querying phase, a user query may indicate that the client wishes to have an accumulation based upon a particular classification variable and to be provided with descriptive statistics associated with that classification variable or a combination of the classification variables (e.g., cross-classification of variables, such as for this region provide a company-by-company breakdown analysis). The central coordinator receives from the node coordinators their respectively processed data and aggregates them.

If the user prefers information at a higher level for a query, then the node coordinators aggregate their respective detailed evaluation information to satisfy the first query. If the user provides a second query which is at a level of greater detail, then the node coordinators aggregate their detailed evaluation information at the more detailed level to satisfy the second query. At these different levels, a user can learn whether they are gaining or losing value.

For example, the user can determine that the user has an increased likelihood of a smaller value in a particular entity grouping, but only a reduced likelihood of a smaller value in a different entity grouping. The user can then generate a new query for greater detail about which specific entities have a smaller value within the particular entity grouping. Upon receiving this subsequent query, the node coordinators may process the position evaluation data associated with the entity grouping at a lower level of detail than the initial query which was at a higher entity grouping level.

Figure 49:
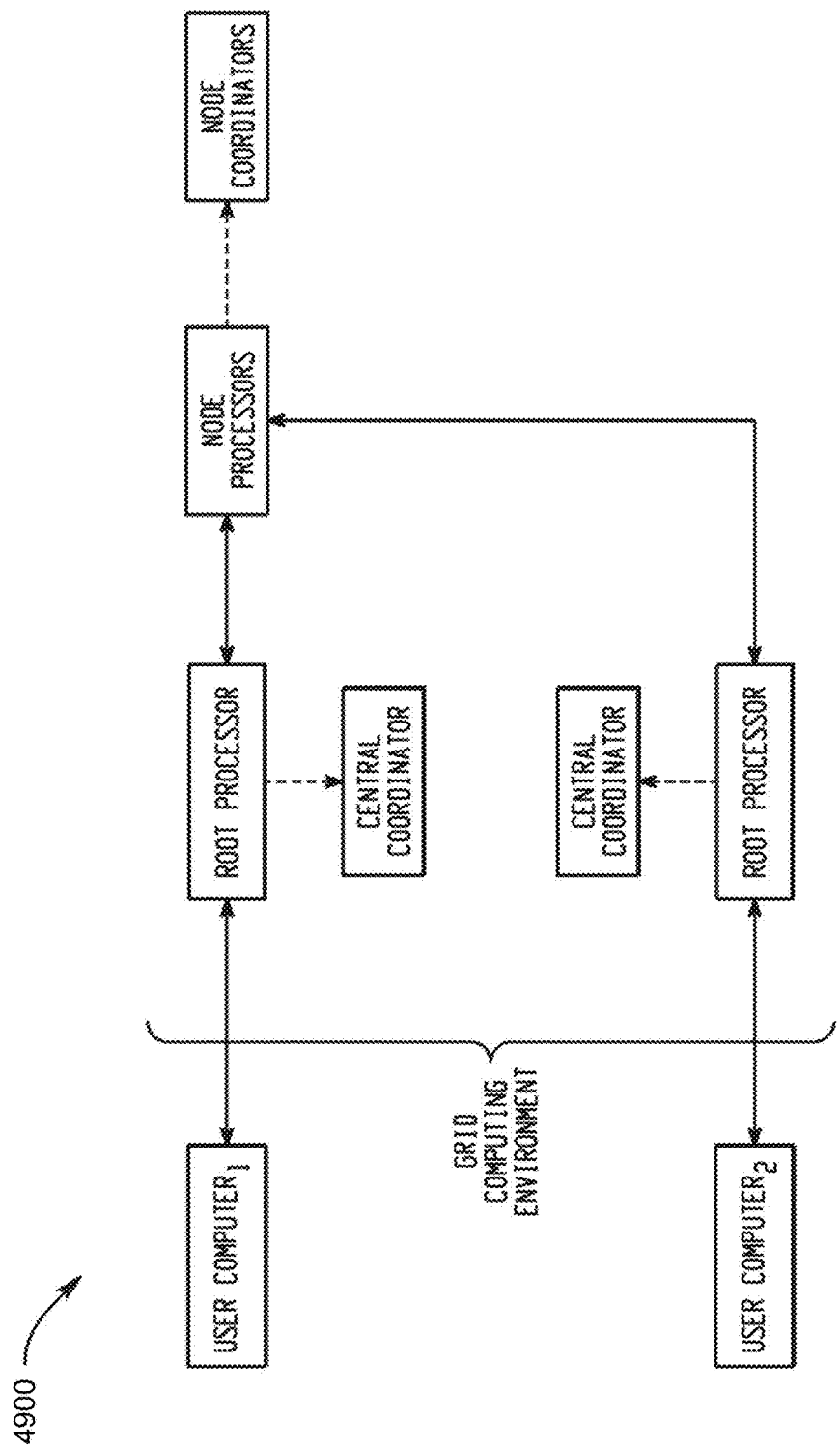
FIG. 49 and FIG. 50 are block diagrams depicting a multi-user environment involving a grid computing environment.
Figure 50:
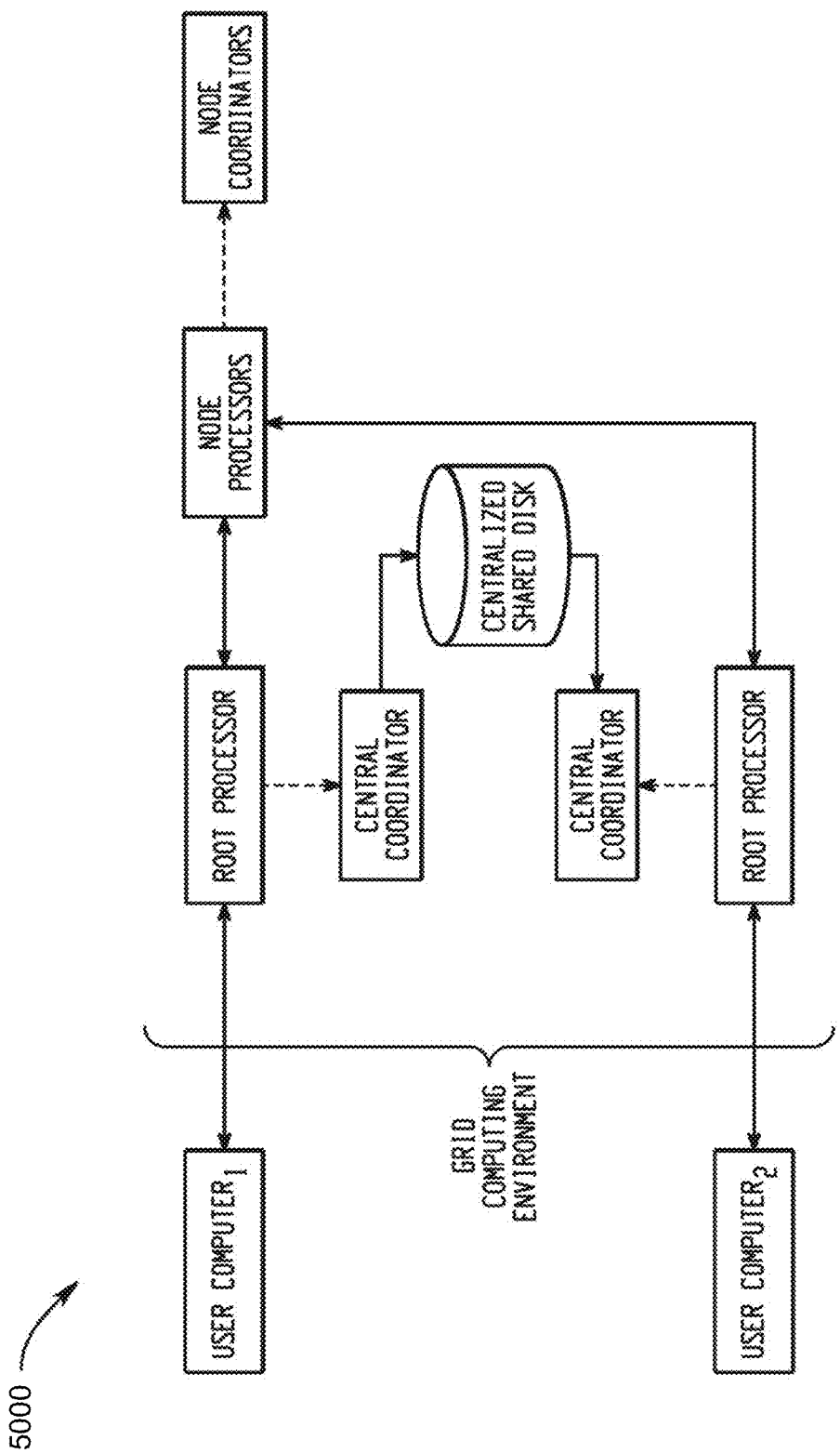

FIG. 49 depicts at 4900 a multi-user environment involving the grid computing environment. In such an environment, each user will receive its own central coordinator to handle its own queries and its own node coordinators. As shown at 5000 in FIG. 50, if another user is authorized to access the evaluation information results of another user, then the second central coordinator can access the position evaluation results of the first user. This can be facilitated if the results of the first user have been written to files. In this situation, the second user's central coordinator accesses the position evaluation information files to handle queries from the second user. It should be understood, that approaches for handling multi-user querying could include avoiding writing the information to non-volatile memory, but instead maintaining it in volatile memory of the grid and allowing the other user to access such content through its respective central coordinators.

Figure 51:
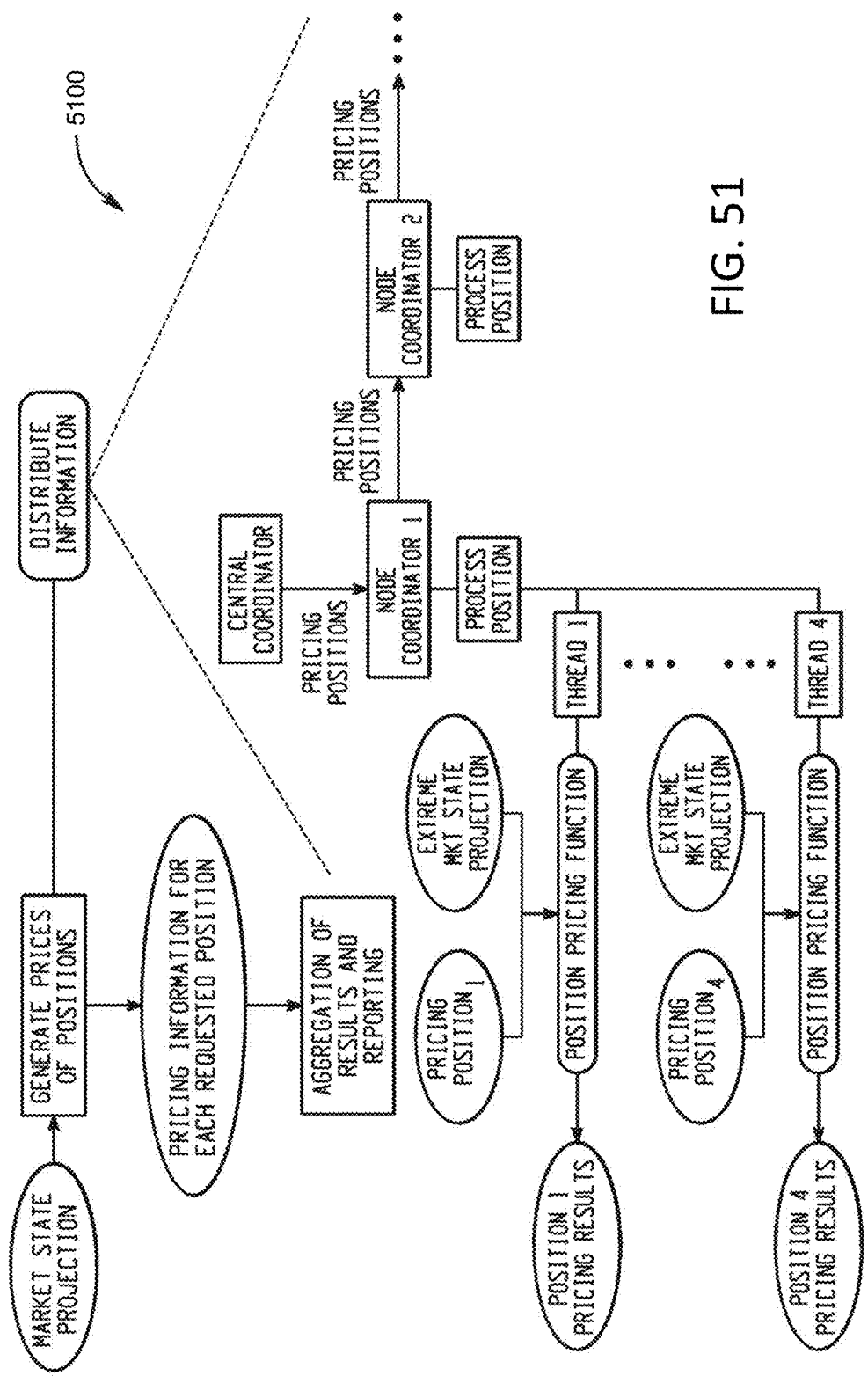
FIG. 51 and FIG. 52 depict an example for stress testing purposes.
Figure 52:
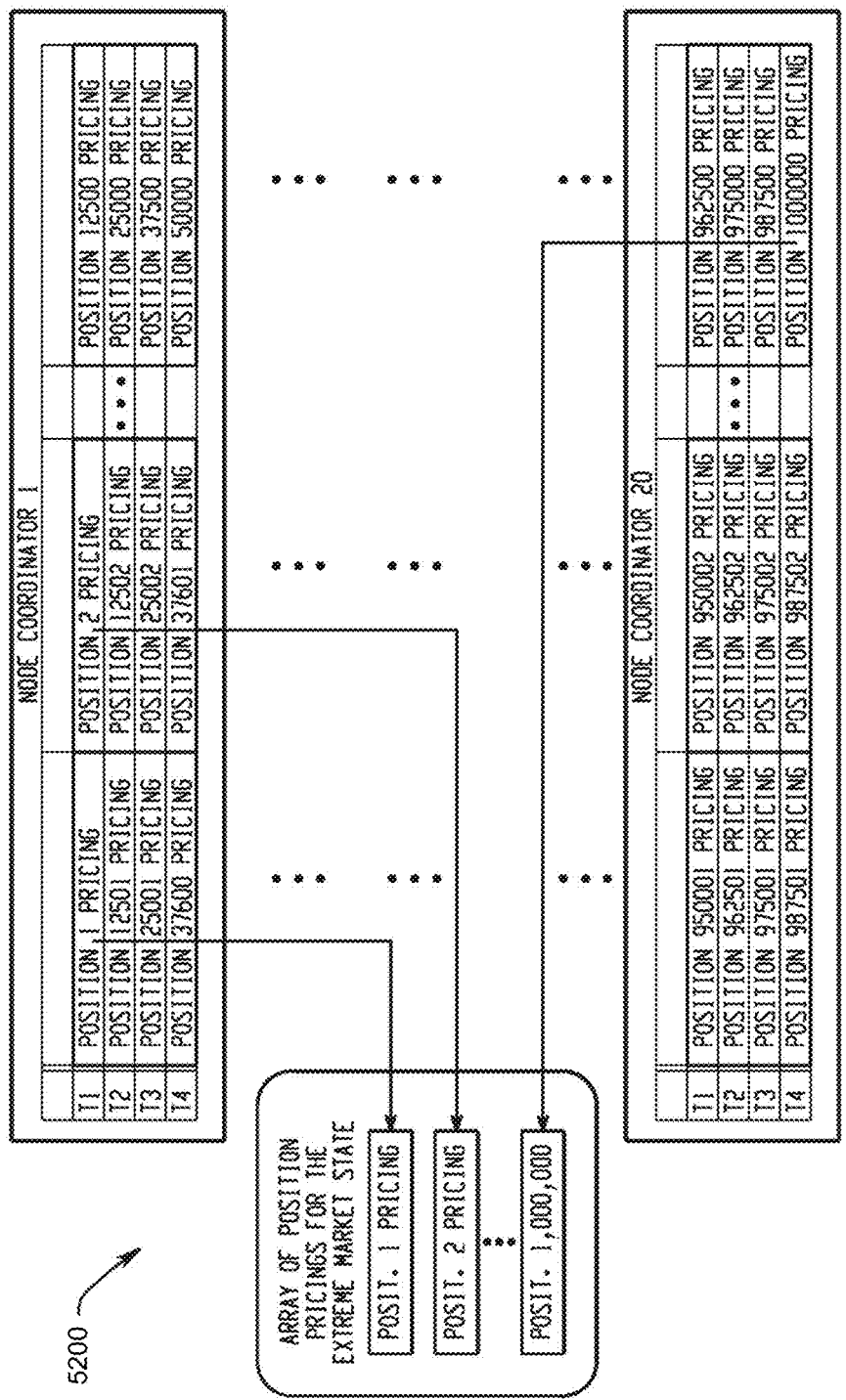

This written description uses examples to disclose the invention, including the best mode, and also to enable a person skilled in the art to make and use the invention. The patentable scope of the invention may include other examples. For example, the systems and methods described herein may be used for stress testing purposes as shown in FIG. 51. determine the stability of a given system or entity. Stress testing involves examining a state projection that is beyond normal operational capacity, often to a breaking point, and analyzing the position evaluation results. As shown at 5100 in FIG. 51, the grid computing environment processes only one state projection for the positions requested by a user. The extreme state projection and the different positions are distributed by the central coordinator to the node coordinators. Each thread of a node coordinator examines a different position with respect to the same state projection. The results of each thread are stored in the shared memory of its respective node. The central coordinator can then aggregate the results to satisfy user queries. It is noted that the non-stress testing examples described herein provides that each of the nodes processes the same positions, but for different state projections. In the stress testing approach depicted in FIG. 51, each of the nodes processes the same state project, but for different positions. This difference is further illustrated in the manner in which each node stores its results. FIG. 52 depicts at 5200 that the stress testing results are stored at each node. In this example, there are 1,000,000 positions and 1 state projection. If there are 20 nodes, then each node will process 50,0000 positions for the 1 state projection. Accordingly, each node will store 50,000 position evaluations. Still further, if there are 4 threads per node, then each thread will handle 12,5000 positions and will correspondingly store 12,500 position evaluations.

The examples of FIGS. 51 and 52 can perform stress testing in many different types of applications, such as to examine how various vehicle might react in certain crash scenarios, such as:

What happens if oil values rise by 200%?
What happens if a non-working population reaches 10%?
What happens if the overall vehicle values reduce by more than x % this year?
What happens if interest rates go up by at least y %?

As another example of the wide scope of the systems and methods disclosed herein, the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

As another example of the wide scope of the systems and methods disclosed herein, it should be understood that the techniques disclosed herein are not limited to possible change evaluation, but can also include any type of problem that involve large data sets and matrix decomposition. As another example, it should be understood that a configuration can be used such that a conventional approach is used to generate state projections (e.g., through use of a Dimensions product), but the position evaluation approaches disclosed herein are used. Correspondingly, a configuration can be used such that the state generation approach as disclosed herein can provide output to a conventional position evaluation application.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

What is claimed is:

1. An improved state projection generation system comprising:
 a grid computing environment including a central coordinator, a plurality of node coordinators in data communication with the central coordinator, and one or more compute nodes associated with each node coordinator and in data communication with a node coordinator;
 a non-transitory computer readable storage medium, comprising instructions that, when executed by the central coordinator, the plurality of node coordinators, or the one or more compute nodes cause the central coordinator, the plurality of node coordinators, or the one or more compute nodes to perform operations including:
  accessing, by the central coordinator, a multi-dimensional data set, wherein the multi-dimensional data set includes multiple observations with respect to a plurality of dimensions;
  generating a cross-product matrix for the multi-dimensional data set;
  decomposing, by the node coordinators, the cross-product matrix, wherein
  decomposing generates a full decomposed matrix;
 providing, by the central coordinator, different random vectors to the node coordinators for use in determining a plurality of state simulation matrices using the full decomposed matrix and the random vectors;
  computing, using the one or more compute nodes associated with each node coordinator, one or more state simulation matrices, wherein computing includes determining a product between the random vectors and the full decomposed matrix;
  identifying, by the central coordinator, position information corresponding to one or more positions to be evaluated;
  distributing, by the central coordinator, a position evaluation function to the plurality of node coordinators for use in evaluating the one or more positions by using the one or more state simulation matrices;
  generating position evaluations for the one or more positions, wherein generating includes using the position evaluation function, the position information, and the one or more state simulation matrices;
  receiving, by the central coordinator, a query, wherein the query corresponds to a request for evaluation of particular position information;
  identifying, by the central coordinator, a plurality of individual position evaluations for use in responding to the query;
  aggregating, at the central coordinator, the plurality of individual position evaluations, wherein aggregating includes the node coordinators retrieving a plurality of individual positions from shared memory, and wherein aggregating includes the node coordinators transmitting the retrieved plurality of individual positions to the central coordinator; and
  generating a response to the query using the aggregated plurality of individual position evaluations.

2. The system of claim 1, wherein generating the cross-product matrix for the multi-dimensional data set is performed using distributed computing and includes:
 partitioning, by the central coordinator, the multi-dimensional data into multiple data partitions;
 indicating, by the central coordinator, unique identifiers to the plurality of node coordinators, wherein a unique identifier allows a node coordinator to identify unique portions of the cross-product matrix that the node coordinator is assigned;
 using a wave distribution technique to distribute the multiple data partitions among the plurality of node coordinators, wherein the wave distribution technique includes the central coordinator distributing a first data partition to a first node coordinator and the first node coordinator distributing the first data partition to a second node coordinator, and wherein the wave distribution technique includes the central coordinator distributing a second data partition to a third node coordinator and the third node coordinator distributing the second data partition to a fourth node coordinator;
 generating, by the one or more compute nodes associated with each node coordinator, assigned unique portions of the cross-product matrix, wherein generating the assigned unique portions includes using one or more distributed data partitions; and
 storing, by the node coordinators or the one or more compute nodes associated with each node coordinators, the assigned unique portions of the cross-product matrix.

3. The system of claim 2, wherein storing the assigned unique portions of the cross-product matrix includes storing the assigned unique portions of the cross-product matrix to the shared memory.

4. The system of claim 2, wherein decomposing the unique portions of the cross-product matrix includes each node coordinator assigning separate decomposition tasks to the compute nodes associated with the node coordinators.

5. The system of claim 2, wherein the operations further include:
 storing the multi-dimensional data set as a data set matrix, wherein the data partitions correspond to unique rows of the data set matrix, and wherein the wave distribution technique includes distributing the unique rows of the data set matrix individually.

6. The system of claim 1, wherein decomposing generates decomposed matrix components, wherein decomposing includes distributing the decomposed matrix components among the plurality of node coordinators to provide the plurality of node coordinators each with the full decomposed matrix, wherein the full decomposed matrix includes each of the decomposed matrix components, and wherein distributing includes the node coordinators transmitting the decomposed matrix components between one another or to the central coordinator.

7. The system of claim 1, wherein each node coordinator and compute nodes associated with the node coordinator have an associated shared memory independent from other node coordinators and other compute nodes.

8. The system of claim 1, wherein generating position evaluations for the one or more positions is performed using distributed computing and includes:
  distributing the position information among the plurality of node coordinators;
  determining, by the one or more compute nodes associated with the node coordinators, a plurality of individual position evaluations, wherein an individual position evaluation is determined by a compute node applying the position evaluation function to an individual state simulation matrix and the position information; and
  storing, by the compute nodes associated with the node coordinators, the determined individual position evaluations to shared memory associated with the compute nodes.

9. The system of claim 1, wherein receiving a query includes receiving multiple unrelated queries and wherein generating responses to the unrelated queries does not require re-generation of the cross-product matrix, the full decomposed matrix, or the position evaluations for the one or more positions for generating responses to the unrelated queries.

10. The system of claim 1, wherein the operations further include:
  performing a statistical analysis on the aggregated plurality of individual position evaluations, wherein the response to the query indicates results of the statistical analysis, wherein performing the statistical analysis includes:
    determining a mean of the aggregated plurality of individual position evaluations;
    determining a distribution of the aggregated plurality of individual position evaluations; and
    delineating a portion of the distribution that includes 95% of the aggregated plurality of individual position evaluations and is centered around the mean.

11. An improved state projection generation method comprising:
  accessing, by a central coordinator of a grid computing environment, a multi-dimensional data set, wherein the multi-dimensional data set includes multiple observations with respect to a plurality of dimensions, and wherein the grid computing environment includes the central coordinator, a plurality of node coordinators, and one or more compute nodes associated with each node coordinator;
  generating a cross-product matrix for the multi-dimensional data set;
  decomposing, by the node coordinators, the cross-product matrix, wherein decomposing generates a full decomposed matrix;
  providing, by the central coordinator, different random vectors to the node coordinators for use in determining a plurality of state simulation matrices using the full decomposed matrix and the random vectors;
  computing, using the one or more compute nodes associated with each node coordinator, one or more state simulation matrices, wherein computing includes determining a product between the random vectors and the full decomposed matrix;
  identifying, by the central coordinator, position information corresponding to one or more positions to be evaluated;
  distributing, by the central coordinator, a position evaluation function to the plurality of node coordinators for use in evaluating the one or more positions by using the one or more state simulation matrices;
  generating position evaluations for the one or more positions, wherein generating includes using the position evaluation function, the position information, and the one or more state simulation matrices;
  receiving, by the central coordinator, a query, wherein the query corresponds to a request for evaluation of particular position information;
  identifying, by the central coordinator, a plurality of individual position evaluations for use in responding to the query;
  aggregating, at the central coordinator, the plurality of individual position evaluations, wherein aggregating includes the node coordinators retrieving a plurality of individual positions from shared memory associated with the compute nodes, and wherein aggregating includes the node coordinators transmitting the retrieved plurality of individual positions to the central coordinator; and
  generating a response to the query using the aggregated plurality of individual position evaluations.

12. The method of claim 11, wherein generating the cross-product matrix for the multi-dimensional data set is performed using distributed computing and includes:
  partitioning, by the central coordinator, the multi-dimensional data into multiple data partitions;
  indicating, by the central coordinator, unique identifiers to the plurality of node coordinators, wherein a unique identifier allows a node coordinator to identify unique portions of the cross-product matrix that the node coordinator is assigned;
  using a wave distribution technique to distribute the multiple data partitions among the plurality of node coordinators, wherein the wave distribution technique includes the central coordinator distributing a first data partition to a first node coordinator and the first node coordinator distributing the first data partition to a second node coordinator, and wherein the wave distribution technique includes the central coordinator distributing a second data partition to a third node coordinator and the third node coordinator distributing the second data partition to a fourth node coordinator;
  generating, by the one or more compute nodes associated with each node coordinator, assigned unique portions of the cross-product matrix, wherein generating the assigned unique portions includes using one or more distributed data partitions; and
  storing, by the node coordinators or the one or more compute nodes associated with each node coordinators, the assigned unique portions of the cross-product matrix.

13. The method of claim 12, wherein storing the assigned unique portions of the cross-product matrix includes storing the assigned unique portions of the cross-product matrix to the shared memory.

14. The method of claim 12, wherein decomposing the unique portions of the cross-product matrix by each node coordinator assigning separate decomposition tasks to the compute nodes associated with the node coordinators.

15. The method of claim 12, further comprising:
  storing the multi-dimensional data set as a data set matrix, wherein the data partitions correspond to unique rows of the data set matrix, and wherein the wave distribution technique includes distributing the unique rows of the data set matrix individually.

16. The method of claim 11, wherein decomposing generates decomposed matrix components, wherein decomposing includes distributing the decomposed matrix components among the plurality of node coordinators to provide the plurality of node coordinators each with the full decomposed matrix, wherein the full decomposed matrix includes each of the decomposed matrix components, and wherein distributing includes the node coordinators transmitting the decomposed matrix components between one another or to the central coordinator.

17. The method of claim 11, wherein each node coordinator and compute nodes associated with the node coordinator have an associated shared memory independent from other node coordinators and other compute nodes.

18. The method of claim 11, wherein generating position evaluations for the one or more positions is performed using distributed computing and includes:
   distributing the position information among the plurality of node coordinators;
   determining, by the one or more compute nodes associated with the node coordinators, a plurality of individual position evaluations, wherein an individual position evaluation is determined by a compute node applying the position evaluation function to an individual state simulation matrix and the position information; and
   storing, by the compute nodes associated with the node coordinators, the determined individual position evaluations to shared memory associated with the compute nodes.

19. The method of claim 11, wherein receiving a query includes receiving multiple unrelated queries and wherein generating responses to the unrelated queries does not require re-generation of the cross-product matrix, the full decomposed matrix, or the position evaluations for the one or more positions for generating responses to the unrelated queries.

20. The method of claim 11, further comprising:
   performing a statistical analysis on the aggregated plurality of individual position evaluations, wherein the response to the query indicates results of the statistical analysis, and wherein performing the statistical analysis includes:
      determining a mean of the aggregated plurality of individual position evaluations;
      determining a distribution of the aggregated plurality of individual position evaluations; and
      delineating a portion of the distribution that includes 95% of the aggregated plurality of individual position evaluations and is centered around the mean.

21. A non-transitory computer readable storage medium for an improved state projection generation comprising instructions that, when executed by a central coordinator, a plurality of node coordinators, or one or more compute nodes of a grid computing environment cause the grid computing environment to perform operations including:
   accessing, by the central coordinator, a multi-dimensional data set, wherein the multi-dimensional data set includes multiple observations with respect to a plurality of dimensions;
   generating a cross-product matrix for the multi-dimensional data set;
   decomposing, by the node coordinators, the cross-product matrix, wherein decomposing generates a full decomposed matrix;
   providing, by the central coordinator, different random vectors to the node coordinators for use in determining a plurality of state simulation matrices using the full decomposed matrix and the random vectors;
   computing, using the one or more compute nodes associated with each node coordinator, one or more state simulation matrices, wherein computing includes determining a product between the random vectors and the full decomposed matrix;
   identifying, by the central coordinator, position information corresponding to one or more positions to be evaluated;
   distributing, by the central coordinator, a position evaluation function to the plurality of node coordinators for use in evaluating the one or more positions by using the one or more state simulation matrices;
   generating position evaluations for the one or more positions, wherein generating includes using the position evaluation function, the position information, and the one or more state simulation matrices;
   receiving, by the central coordinator, a query, wherein the query corresponds to a request for evaluation of particular position information;
   identifying, by the central coordinator, a plurality of individual position evaluations for use in responding to the query;
   aggregating, at the central coordinator, the plurality of individual position evaluations, wherein aggregating includes the node coordinators retrieving a plurality of individual positions from shared memory, and wherein aggregating includes the node coordinators transmitting the retrieved plurality of individual positions to the central coordinator; and
   generating a response to the query using the aggregated plurality of individual position evaluations.

22. The non-transitory computer readable storage medium of claim 21, wherein generating the cross-product matrix for the multi-dimensional data set is performed using distributed computing and includes:
   partitioning, by the central coordinator, the multi-dimensional data into multiple data partitions;
   indicating, by the central coordinator, unique identifiers to the plurality of node coordinators, wherein a unique identifier allows a node coordinator to identify unique portions of the cross-product matrix that the node coordinator is assigned;
   using a wave distribution technique to distribute the multiple data partitions among the plurality of node coordinators, wherein the wave distribution technique includes the central coordinator distributing a first data partition to a first node coordinator and the first node coordinator distributing the first data partition to a second node coordinator, and wherein the wave distribution technique includes the central coordinator distributing a second data partition to a third node coordinator and the third node coordinator distributing the second data partition to a fourth node coordinator;
   generating, by one or more compute nodes associated with each node coordinator, assigned unique portions of the cross-product matrix, wherein generating the assigned unique portions includes using one or more distributed data partitions; and
   storing, by the node coordinators or the one or more compute nodes associated with each node coordinators, the assigned unique portions of the cross-product matrix.

23. The non-transitory computer readable storage medium of claim 22, wherein storing the assigned unique portions of the cross-product matrix includes storing the assigned unique portions of the cross-product matrix to the shared memory.

24. The non-transitory computer readable storage medium of claim 22, wherein decomposing the unique portions of the cross-product matrix includes each node coordinator assigning separate decomposition tasks to the compute nodes associated with the node coordinators.

25. The non-transitory computer readable storage medium of claim 22, wherein the operations further comprise:
   storing the multi-dimensional data set as a data set matrix, wherein the data partitions correspond to unique rows of the data set matrix, and wherein the wave distribution technique includes distributing the unique rows of the data set matrix individually.

26. The non-transitory computer readable storage medium of claim 21, wherein each node coordinator and compute nodes associated with the node coordinator have an associated shared memory independent from other node coordinators and other compute nodes.

27. The non-transitory computer readable storage medium of claim 21, wherein decomposing generates decomposed matrix components, wherein decomposing includes distributing the decomposed matrix components among the plurality of node coordinators to provide the plurality of node coordinators each with a full decomposed matrix, wherein the full decomposed matrix includes each of the decomposed matrix components, and wherein distributing includes the node coordinators transmitting the decomposed matrix components between one another or to the central coordinator.

28. The non-transitory computer readable storage medium of claim 21, wherein generating position evaluations for the one or more positions is performed using distributed computing and includes:
   distributing the position information among the plurality of node coordinators;
   determining, by the one or more compute nodes associated with the node coordinators, a plurality of individual position evaluations, wherein an individual position evaluation is determined by a compute node applying the position evaluation function to an individual state simulation matrix and the position information; and
   storing, by the compute nodes associated with the node coordinators, the determined individual position evaluations to shared memory associated with the compute nodes.

29. The non-transitory computer readable storage medium of claim 21, wherein receiving a query includes receiving multiple unrelated queries and wherein generating responses to the unrelated queries does not require re-generation of the cross-product matrix, the full decomposed matrix, or the position evaluations for the one or more positions for generating responses to the unrelated queries.

30. The non-transitory computer readable storage medium of claim 21, wherein the operations further comprise:
   performing a statistical analysis on the aggregated plurality of individual position evaluations, wherein the response to the query indicates results of the statistical analysis, wherein performing the statistical analysis includes:
      determining a mean of the aggregated plurality of individual position evaluations;
      determining a distribution of the aggregated plurality of individual position evaluations; and
      delineating a portion of the distribution that includes 95% of the aggregated plurality of individual position evaluations and is centered around the mean.

* * * * *